US012482332B1

(12) United States Patent
Parker et al.

(10) Patent No.: US 12,482,332 B1
(45) Date of Patent: Nov. 25, 2025

(54) SYSTEMS AND METHODS FOR OPERATING AN OPTICAL SCANNER BASED ON CONVEYANCE SPEED OF PHYSICAL MEDIA ELEMENTS

(71) Applicant: Jackpocket LLC, New York, NY (US)

(72) Inventors: Eric Parker, Wellington, FL (US); James Mansour, Austin, TX (US); Milan Smart, Austin, TX (US); Cameron Navarre, Austin, TX (US); Elias Bachaalany, Fidar (LB); Imad Maalouf, Awkar (LB)

(73) Assignee: Jackpocket LLC, Boston, MA (US)

( * ) Notice: Subject to any disclaimer, the term of this patent is extended or adjusted under 35 U.S.C. 154(b) by 0 days.

(21) Appl. No.: 19/194,965

(22) Filed: Apr. 30, 2025

(51) Int. Cl.
G07F 17/42 (2006.01)
G06K 7/10 (2006.01)
G07F 17/32 (2006.01)

(52) U.S. Cl.
CPC ......... G07F 17/42 (2013.01); G06K 7/10712 (2013.01); G07F 17/329 (2013.01)

(58) Field of Classification Search
CPC .. G07F 17/42; G07F 17/10712; G07F 17/329; G06K 7/10712
See application file for complete search history.

(56) References Cited

U.S. PATENT DOCUMENTS 2,248,191 A   7/1941   Pratt
4,765,842 A   8/1988   Sanders et al.
5,253,383 A   10/1993  Clark
5,355,543 A   10/1994  Cameron et al.
5,402,549 A   4/1995   Forrest
5,497,525 A   3/1996   Woodgate
5,577,287 A   11/1996  Olson
5,907,882 A   6/1999   Tyree
8,192,268 B1  6/2012   Karpe
8,210,921 B1  7/2012   Karpe
8,856,999 B2  10/2014  Sciuto
(Continued)

FOREIGN PATENT DOCUMENTS

EP   0749767 A1   12/1996
EP   0824944 A1   2/1998
(Continued)

Primary Examiner — Werner G Garner
(74) Attorney, Agent, or Firm — Bookoff McAndrews, PLLC

(57) ABSTRACT

Systems and methods for mechanically processing physical media elements, e.g., automatically scratching scratch-off lottery tickets, may include receiving a batch of tickets at an input chute of a scratching system. Tickets may be serially fed through the scratching system that includes a series of roller scratching mechanisms. Pressure rollers may be individually adjustable to set a pressure of the scratching mechanisms. One or more scanners may obtain information from the tickets before and/or after scratching. A pair of parallel plates may be used to form a feed path to guide tickets through the system. A vacuum manifold may isolate some elements of the system from debris, and remove the debris from the system via negative pressure. One or more presence sensor may detect presence of a current ticket to control operation of feed motors. Various functions or elements of the system may be distributed over a plurality of removable modules.

20 Claims, 29 Drawing Sheets

(56) References Cited

U.S. PATENT DOCUMENTS

| | | |
|---|---|---|
| 8,992,727 B2 | 3/2015 | Laghi |
| 9,044,787 B1 | 6/2015 | Stewart |
| 9,433,854 B1 | 9/2016 | D'Alessandro |
| 9,630,216 B1 | 4/2017 | Preston |
| 9,818,264 B2 | 11/2017 | Karpe |
| 11,278,789 B1 | 3/2022 | Patel et al. |
| 2004/0162131 A1 | 8/2004 | Shuster |
| 2006/0033261 A1* | 2/2006 | Hilbert .................. B65H 5/00 271/256 |
| 2006/0189373 A1 | 8/2006 | Shuster |
| 2007/0037499 A1 | 2/2007 | Burbridge |
| 2017/0372557 A1 | 12/2017 | Karpe |
| 2021/0252378 A1 | 8/2021 | Dekel |

FOREIGN PATENT DOCUMENTS

| | | |
|---|---|---|
| EP | 2181738 A1 | 5/2010 |
| FR | 2756496 A1 | 6/1988 |
| IT | RM20090668 A1 | 6/2011 |
| IT | BS20100063 A1 | 10/2011 |
| IT | 1395025 B1 | 9/2012 |
| IT | 1396837 B1 | 12/2012 |
| WO | 2011148238 A1 | 12/2011 |

* cited by examiner

SYSTEMS AND METHODS FOR OPERATING AN OPTICAL SCANNER BASED ON CONVEYANCE SPEED OF PHYSICAL MEDIA ELEMENTS

TECHNICAL FIELD

Various embodiments of the present disclosure relate generally to systems and methods for manipulating physical media elements, and more particularly to systems and methods for mechanically scratching scratch-off lottery tickets, and integrating the same into an online interaction.

BACKGROUND

Scratch-off lottery tickets are a popular form of lottery game that allow players to scratch off a coating on the ticket to reveal hidden text or numbers that may correspond to a prize. Scratch-off tickets often include a paper ticket coated in part by a layer of material such as latex that covers or obscures the hidden text or numbers. Conventionally, players purchase scratch-off tickets in person, manually scratch off the coating, and physically present the scratched ticket to collect any winnings. The physical and in-person nature of such activities may be difficult to adapt to an electronic or online setting. Scratch-off games and the like, as a physical medium, may have difficulty benefiting from the availability, scalability, and other advantages of such electronic integration.

The present disclosure is directed to addressing one or more challenges, such as those referenced above. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one aspect, a scraper system for scraping an input media, the scraper system may include: two or more adjustable roller mechanisms operatively connected in series, each adjustable roller mechanism respectively including: a stationary roller including a scraper; a first adjustment mechanism; a second adjustment mechanism; and an adjustable roller operatively engaged with the stationary roller and configured to press an input media against the scraper, the adjustable roller including: a first end operatively connected to the first adjustment mechanism; and a second end operatively connected to the second adjustment mechanism; wherein: the first adjustment mechanism is operable to independently adjust a first height of the first end of the adjustable roller relative to a first end of the stationary roller, thereby adjusting a first pressure applied by the adjustable roller to the input media; and the second adjustment mechanism is operable to independently adjust a second height of the second end of the adjustable roller relative to a second end of the stationary roller, thereby adjusting a second pressure applied by the adjustable roller to the input media.

In a further aspect, an adjustable roller system may include: a first adjustment mechanism; a second adjustment mechanism; and an adjustable roller, including: a first end operatively connected to the first adjustment mechanism; and a second end operatively connected to the second adjustment mechanism; wherein: the first adjustment mechanism is operable to independently adjust a first height of the first end of the adjustable roller; and the second adjustment mechanism is operable to independently adjust a second height of the second end of the adjustable roller.

In another aspect, an adjustment mechanism for independently adjusting a height of at least one end of an adjustable roller may include: an adjustment block including a cavity, a slot, and a vertical channel extending from the slot to the cavity; a mounting block received in the cavity such that rotation of the mounting block is inhibited by the adjustment block, the mounting block including a mount configured to rotationally support a respective end of the adjustable roller; and a pin positioned in the vertical channel and engaged with the mounting block via a threaded connection, the adjustment block configured to hold the pin vertically captive in the vertical channel, such that the threaded connection between the pin and the mounting block is configured to translate rotation of the pin into vertical motion of the mounting block to adjust a height of the mount for supporting the respective end of the adjustable roller.

In some aspects, the techniques described herein relate to a ticket tracking system for tracking tickets conveyed by a ticket-processing device, including: an encoder roller configured to rotate with a ticket as the ticket is conveyed past the encoder roller, and to determine a conveyance speed of the ticket based on a rotational speed of the rotation of the encoder roller; and at least one scanner configured to scan a surface of the ticket, as the ticket is conveyed past the at least one scanner, at a rate based on the determined conveyance speed of the ticket.

In some aspects, the techniques described herein relate to a computer-implemented method of tracking a ticket conveyed by a ticket-processing device, including: determining, via an encoder roller, a conveyance speed of the ticket based on a rotational speed of the encoder roller, the encoder roller configured to rotate as a ticket is conveyed past the encoder roller; and operating at least one scanner to scan a surface of the ticket as the ticket is conveyed past the at least one scanner at a rate based on the determined conveyance speed of the ticket.

In some aspects, the techniques described herein relate to a ticket-processing device, including: an encoder roller configured to rotate with a ticket as the ticket is conveyed past the encoder roller, and to determine a conveyance speed of the ticket based on a rotational speed of the rotation of the encoder roller; and at least one scanner configured to scan a surface of the ticket, as the ticket is conveyed past the at least one scanner, at a rate based on the determined conveyance speed of the ticket.

In some aspects, the techniques described herein relate to a scraper system, including: a first module that includes a roller scraper mechanism configured to process media items; a second module that is configured to receive a batch of the media items and serially convey the media items to the first module; and a third module configured to receive processed media items from the first module; wherein the second and third modules are removably connected to the first module.

In some aspects, the techniques described herein relate to a system for processing physical media representing entries into a game of chance, the system including: a plurality of modules aligned to convey a physical media therethrough, the plurality of modules including: at least one module configured to remove a first physical media from a set of one or more physical media in an input area, at least one module configured to remove material from the physical media using a scratching assembly, and at least one module configured to capture information revealed by removing material from the physical media.

In some aspects, the techniques described herein relate to a system for obtaining evaluation information on a ticket for a game of chance, the system including: an input module configured to remove a single ticket from an input area; a scratching module configured to remove a layer of material from the single ticket, the scratching module being downstream of the input module and configured to receive a ticket from the input module; and a scanning module configured to scan information on the ticket revealed by the scratching module, the scanning module being downstream of the scratching module and configured to receive a ticket from the scratching module, wherein each module further includes a motor operatively connected to at least one roller for conveying a ticket through a feed path of the respective module.

In some aspects, the techniques described herein relate to a roller scraper, including: a cylindrical roller configured to rotate about a roller axis; a first scraper that is positioned on a surface of the cylindrical roller and that has a shape that spirals about the roller axis in a first direction over a first portion of an axial extent of the cylindrical roller; and a second scraper that is positioned on the surface of the cylindrical roller and that has a shape that spirals about the roller axis in a second direction, opposite to the first direction, over a second portion of the axial extent of the cylindrical roller.

In some aspects, the techniques described herein relate to a method of producing a roller scraper, including: wrapping a first linear member in a spiral shape around a first axial portion of a cylinder; and wrapping a second linear member in a spiral shape around a second axial portion of the cylinder, a direction of the spiral shape of the second linear member being opposite to a direction of the spiral shape of the first linear member.

In some aspects, the techniques described herein relate to a method of operating a roller scraper, including: rotating a cylinder of the roller scraper about a roller axis, such that a first scraper and a second scraper of the roller scraper are configured to scrape a surface off from media passing by the roller scraper, wherein: the first scraper is positioned on a surface of the cylinder and has a shape that spirals about the roller axis in a first direction over a first portion of an axial extent of the cylinder; and the second scraper is positioned on the surface of the cylinder and has a shape that spirals about the roller axis in a second direction, opposite to the first direction, over a second portion of the axial extent of the cylinder.

In some aspects, the techniques described herein relate to a roller scraper, including: a cylindrical roller configured to rotate about a roller axis; a scraping surface that extends over at least a portion of an axial extent of the cylindrical roller and about a circumference of the cylindrical roller, wherein the scraping surface includes a knurled surface formed by a plurality of protrusions.

In some aspects, the techniques described herein relate to a method of producing a roller scraper, including: knurling a surface of a cylinder to form a plurality of protrusions that define a scraping surface of the cylinder; wherein the scraping surface extends over at least a portion of an axial extent of the cylinder and about a circumference of the cylinder.

In some aspects, the techniques described herein relate to a method of operating a roller scraper, including: rotating a cylinder of the roller scraper about a roller axis, such that a scraping surface of the cylinder formed by a plurality of protrusions is configured to scrape a surface off from media passing by the roller scraper, wherein: the scraping surface extends over at least a portion of an axial extent of the cylinder and about a circumference of the cylinder; and the plurality of protrusions are arranged in a spiral pattern about the cylinder.

In some aspects, the techniques described herein relate to a vacuum manifold for a scraping system, including: a chamber that includes: an open end configured to operatively engage with a bottom surface of a feed plate of the scraping system, the feed plate having at least one aperture exposing at least one scraping portion of the scraping system, the open end configured to receive debris from the at least one scraping portion; and an aperture configured to connect to a negative pressure source and covey the debris out from the scraping system.

In some aspects, the techniques described herein relate to a method of operating a vacuum manifold of a scraping system, including: receiving debris from a scraping assembly of the scraping system via an open end of a chamber of the vacuum manifold, wherein the open end is operatively engaged with a bottom surface of a feed plate of the scraping assembly, the feed plate having at least one aperture exposing at least one scraping portion of the scraping assembly; and operating a negative pressure source operatively connected to an aperture in the chamber so as to convey the debris out from the scraping system.

In some aspects, the techniques described herein relate to a scraping system, including: a scraper assembly that includes a feed plate and at least one feed roller, the feed plate having at least one aperture exposing at least one scraping portion of the scraper assembly; and a vacuum manifold that includes a chamber having: an open end configured to operatively engage with a bottom surface of the feed plate, the open end configured to receive debris from the at least one scraping portion; and an aperture configured to connect to a negative pressure source and covey the debris out from the scraping system.

In some aspects, the techniques described herein relate to a feed system for processing discrete media elements, including: a pair of plates that, in a processing region: are at least substantially parallel with each other and define a feed path for the media elements therebetween; and include at least one set of apertures that provide access into the feed path; an inlet that leads into the feed path and that is formed by an angled mouth leading into the feed path; and at least one set of rollers positioned so as to operatively engage with media elements in the feed path via the at least one set of apertures.

In some aspects, the techniques described herein relate to a method of operating a feed system for processing discrete media elements, including: serially introducing discrete media elements into an inlet formed by an angled mouth that leads into a feed path formed between a pair of at least substantially parallel plates; and conveying the discrete media elements along the feed path by operating at least one set of rollers positioned so as to operatively engage with media elements in the feed path via at least one set of apertures in the pair of plates that provide access into the feed path.

In some aspects, the techniques described herein relate to a scraper system for processing discrete media elements, including: a feed system that includes: a pair of plates that, in a processing region: are at least substantially parallel with each other and define a feed path for the media elements therebetween; and include at least one set of apertures that provide access into the feed path; an inlet that leads into the feed path and that is formed by an angled mouth leading into the feed path; and at least one set of rollers positioned so as to operatively engage with media elements in the feed path via the at least one set of apertures; a scraper assembly that includes at least one scraper operable to scrape a layer of material off from the media elements, the at least one scraper configured to operatively engage with the media elements via the at least one set of apertures; and a manifold configured to capture debris scraped away from the media elements and exiting the feed path via the at least one set of apertures.

In some aspects, the techniques described herein relate to a feed system for processing discrete media elements, including: a first presence sensor configured to detect a presence of a media element at an inlet of a feed path; at least one roller operable to convey a next media element located at the inlet into the feed path; at least one feed motor configured to operate the at least one roller in response to detection of the presence of the media element at the inlet via the first presence sensor; at least one cutter mechanism operable to scrape a layer of material off of a conveyed media element in the feed path; at least one cutter motor configured to operate the at least one cutter mechanism in response to the detection of the presence of the media element at the inlet via the first presence sensor; and a second presence sensor configured to detect a presence of a media element at a location near to and downstream of a first cutter mechanism of the at least one cutter mechanism; wherein the at least one cutter motor and the at least one feed motor are configured to continue operating the at least one cutter mechanism and the at least one roller until after the presence of the media element at the location near to and downstream of the first cutter mechanism is no longer detected by the second presence sensor.

In some aspects, the techniques described herein relate to a feed assembly for moving discrete media through a module of a scratching system, the feed assembly including: a first motor; a first roller; and a first presence sensor, wherein the first presence sensor is configured to detect a presence of discrete media at a first position withing the module, and wherein the first motor is configured to operate the first roller in response to detection of discrete media by the first presence sensor to move the discrete media through a feed path of the module.

In some aspects, the techniques described herein relate to a scratching system for processing discrete media, the scratching system including: a plurality of modules; one or more motors within each module; one or more rollers within each module operatively connected to at least one of the one or more motors within each respective module; and one or more presence sensors within each module operatively connected to at least one of the one or more motors within each respective module, the one or more presence sensors being configured to detect the presence of discrete media, wherein the one or more presence sensors are configured to operate at least one of the one or more motors in the respective modules in response to detection of discrete media within the respective modules.

In some aspects, the techniques described herein relate to a method of operating a scratching system, including: conveying a ticket, one at a time, from an input area of the scratching system into a feed path of the scratching system; operating a plurality of scratching assemblies positioned in series along the feed path to scratch off a layer of material from the ticket, wherein each scratching assembly includes a scraper roller and a pressure roller, the pressure roller and scraper roller configured to rotate parallel to each other in opposite directions, with the feed path positioned therebetween; and operating a scanner to obtain information revealed on the ticket after scratching the ticket.

In some aspects, the techniques described herein relate to a method for processing a ticket for an entry into a game of chance by a scratching system having a plurality of modules, the method including: separating, by a first module, the ticket from a set of tickets in an input area of the first module; processing, by a second module, the ticket to reveal information on the ticket; and obtaining, by a third module, information revealed on the ticket.

In some aspects, the techniques described herein relate to a method of obtaining a ticket for an entry into a game of chance, the method including: separating the ticket from a set of tickets by using a first roller operatively attached to a first motor to convey the ticket through a gate configured to limit a flow of tickets to one ticket; scraping material off the ticket using a scraper attached to a second roller operatively attached to a second motor; and scanning information on the ticket.

In some aspects, the techniques described herein relate to a method for adjusting a pressure profile exerted on input media by a scratching assembly, the method including: rotating a pin of an adjustment mechanism; wherein the adjustment mechanism is configured so that rotation of the pin causes a threaded end of the pin to thread into or out from a threaded hole of a mounting block connected to an end of a roller, such that rotation of the pin causes a corresponding vertical motion of the mounting block and results in a vertical adjustment of the end of the roller, the vertical adjustment adjusting a pressure profile exerted by the roller on the input media.

In some aspects, the techniques described herein relate to a method for adjusting a pressure profile of a scratching mechanism having a roller for exerting pressure on input media, the method including: rotating a rotating member of a first adjustment mechanism operatively connected to a first end of the roller to adjust a vertical position of the first end of the roller; and rotating a rotating member of a second adjustment mechanism operatively connected to a second end of the roller to adjust a vertical position of the second end of the roller, wherein, the first adjustment mechanism and second adjustment mechanism further include: a vertically movable member connected to a respective end of the roller; and a stationary member configured to convert rotation of the rotating member into vertical motion of the vertically movable member.

In some aspects, the techniques described herein relate to a method of removing material from input media passing through a scraping assembly, the method including: independently positioning a first end of an adjustable roller of at least one of a plurality of scratching mechanisms to a first position relative to a respective stationary roller; independently positioning a second end of the adjustable roller to a second position relative to the respective stationary roller; and conveying the input media between the adjustable roller and the stationary roller of each of the plurality of scratching mechanisms, the plurality of scratching mechanisms positioned in series and configured, via the independent positioning of the respective ends of the respective adjustable rollers, to scratch different portions of the input media to thereby remove the material from the input media.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
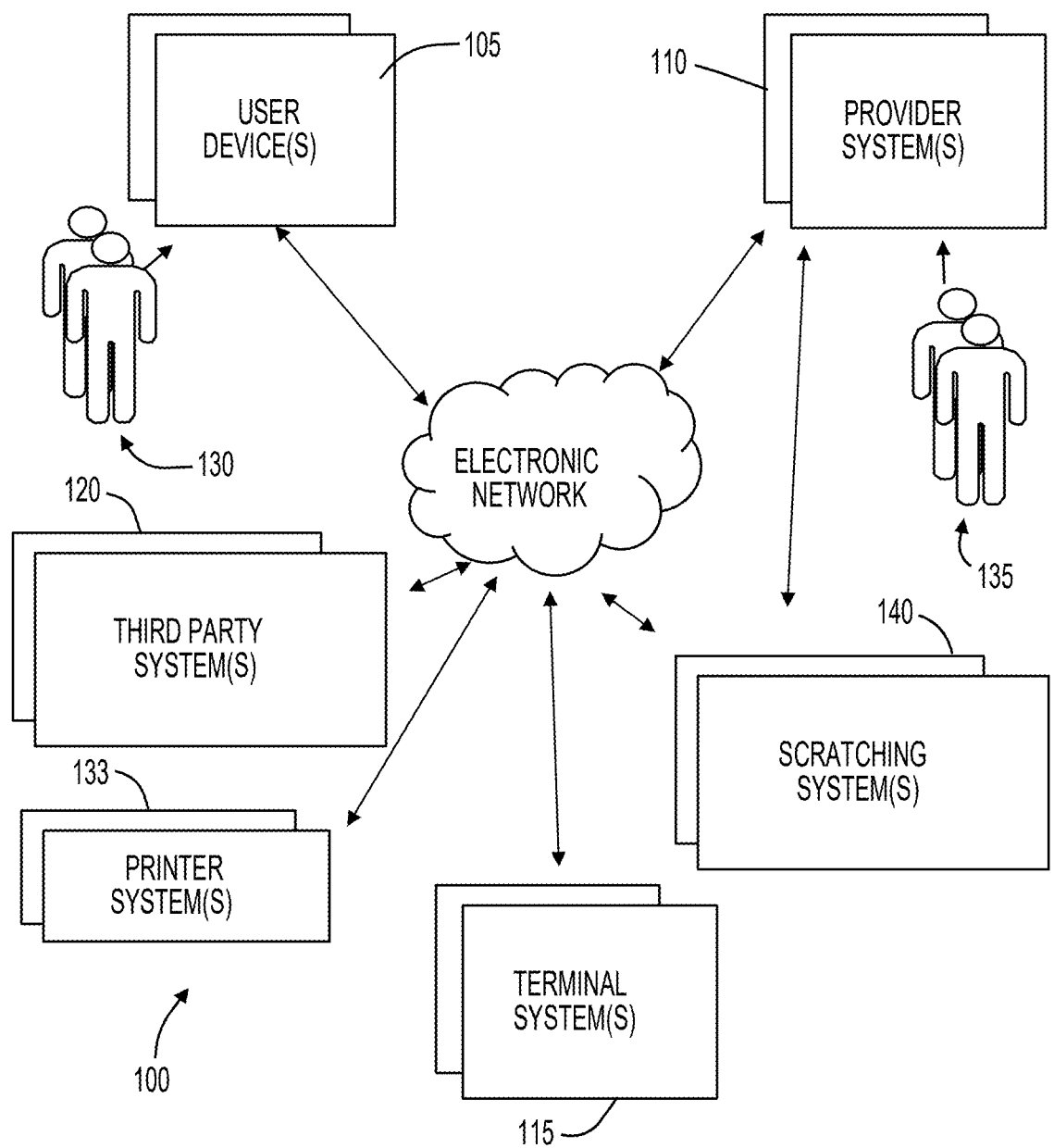
FIG. 1 depicts an environment for providing an online service, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Terms like "retailer," "merchant," "vendor," "seller," or the like generally encompass a person and/or entity that may be involved in the providing and/or sale of goods or services, and in particular of entries into an activity such as a game of chance. A "game of chance" generally encompasses an activity where a participant, e.g., a customer, player, or the like, must pay for a chance at winning, e.g., a wager, ticket, entry, or the like. The term "provider" generally encompasses a person and/or entity that facilitates, runs, services, supports, licenses, or oversees an activity, e.g., a game of chance. A provider may provide, for example, one or more of a retailer with entries (e.g., lottery tickets), means to provide entries to customers (e.g., a ticket printer, terminal, etc.), funds and/or prizes to distribute to winners, either directly or indirectly, or the like. It should be understood that, in some circumstances, a retailer may be incorporated into or act as an intermediary for a provider.

A provider may desire to provide, operate, and/or execute an activity via an electronic medium. For instance, the provider may desire to benefit from the scalability, availability, and ease-of use of electronic (e.g., online) and/or remote interaction. For example, the provider may desire to offer a game of chance that may be played remotely, e.g., on a player's computing device such as a mobile phone. However, the physical nature of some activities, as well as technical limitations, regulations, or the like may inhibit the implementation of the activity in an electric medium. Scratch-off lottery tickets have conventionally been considered an inherently physical medium. Interactions such as manually scratching a ticket and physically presenting a scratched ticket may not be easily adaptable into an electronic (e.g., online) environment and/or remote interaction. Accordingly, improvements in technology relating to providing an activity associated with a physical document, such as a game of chance, would be beneficial.

In the following description, systems and methods are disclosed that relate to manipulating physical media elements (e.g., mechanically scratching scratch-off lottery tickets), and integrating the same into an online interaction such as a purchase or redemption. In an exemplary use case, a provider may host an online service, e.g., a web application or platform. One or more players may access the online service, e.g., via a website, mobile application, or the like. For instance, a player may select a game for which they desire to purchase a physical ticket. Once a scratched ticket in the player's selected game is available, the provider may update the user via the online service. The player may then interact with the online service, e.g., to reveal a result of the scratched ticket, to redeem the scratched ticket, etc.

In another exemplary use case, the provider may aggregate selections, e.g., from one or multiple users, for a particular game into a set. The provider may obtain a batch of unscratched tickets for the set. Identifying information for a first and last ticket in the batch may be obtained, e.g., via a scanner, in order to identify endpoints of the batch, confirm a sufficient number of tickets are available for the set, confirm that the tickets in the batch all pertain to the selected game, or the like. Images and identifiers for each ticket in the batch may be obtained, and such data may be matched to (e.g., associated with) a respective one of the aggregated selections in the set. Each ticket in the batch may be processed, e.g., scratched via a scratching system. The identifier of each ticket may be re-obtained during processing, e.g., to track a status of the ticket. Images and identifiers of each processed ticket may be obtained, and such data may be matched with the respective selections. The images of the processed tickets may include ticket information revealed by the processing, e.g., a previously hidden code or text that was revealed via scratching. The ticket information for each ticket may be provided to a terminal system configured to obtain redemption information. The provider may provide the redemption information for each processed ticket to the online service. In some instances, the provider may parse the redemption information, obtain or reserve redemption funds, associate the redemption information with the respective selection from the set, etc. The provider may update the online service to indicate to the player that their respective selection is ready to be revealed. Upon an interaction from the player, e.g., via a "Scratch Now" button, the online service may output the image of the processed ticket associated with the player's selection that was obtained during the processing. Upon further interaction, e.g., via a "Redeem Now" button, or along with the response to the previous interaction, the online service may output the redemption information for the processed ticket associated with the player's selection that was obtained via the terminal system. Automatically or in response to a user interaction, the online service may release any redemption funds to an account associated with the player.

In a further exemplary use case, processing a batch of tickets may include providing the batch to an input chute of a scratching system. A presence sensor at the bottom of the chute may sense a presence of the batch, and cause one or more feed motor to activate and operate drive rollers configured to convey tickets along a feed path. A first feed motor may be positioned at the bottom of the chute, and configured to operatively engage with a bottom-most ticket in the batch and covey the ticket toward a gate that is sized to limit passage to a single ticket at a time, and that leads into the feed path.

The feed path may be defined, at least in part, by one or more pairs of substantially parallel plates. The inlet into the feed path may include a concave angled opening, e.g., to funnel a conveyed ticket into the feed path between the plates. The plates may include one or more sets of apertures that provide access to the feed path for one or more other elements such as the drive rollers. For example, a roller encoder downstream of the inlet may include a roller positioned to engage with a ticket passing by. The roller encoder may be configured to determine a conveyance speed of the ticket, and may cause the first feed motor to halt, whereby the clutched roller enables the bottom-most ticket to be removed from the chute without conveying a next ticket. The determined conveyance speed may be used to set one or more parameters of one or more scanner configured to scan or obtain imaging of top and/or bottom surfaces of the ticket as it passes by. Further presence sensors, e.g., fork sensors, may be used to signal a start of operation for the one or more scanners.

The feed path may include separate pairs of plates for various stages of processing, e.g., a first pair for removal from the chute, a second pair for scanning the ticket, a third pair for scratching the ticket, etc. Different presence sensors positioned at an upstream location of different pairs of plates may be used to control or operate feed motors associated with that pair of plates. The third pair of plates may include, for example, a set of apertures for drive rollers operatively engaged with respective feed motors, a set of apertures for idler rollers, e.g., that may guide tickets along the feed path, a set of apertures for cutting or scraping mechanisms, a set of apertures for a brush, etc. Apertures in a pair of plates may have a flanged edge, e.g., on a downstream side, e.g., to inhibit a leading edge of a ticket from catching on an edge of an aperture. Springs for the idler rollers may cause the idler rollers to be configured to push passing tickets against the drive rollers.

One or more scraper mechanisms, e.g., positioned in series along the feed path, may be configured to scrape a layer of material off from tickets conveyed along the feed path. Subsequent scraper mechanisms, in various embodiments, may scrape different portions of a ticket, and/or may re-scrape previous portions, e.g., to reduce a risk of missing material that is desirably scraped away.

In some embodiments, a scraper mechanism may include a scraper roller and a pressure roller. A cutter motor may be configured to drive the scraper roller, and the pressure roller may be mounted to an adjustment mechanism that is operable to independently adjust a height of the pressure roller relative to the scraper roller, e.g., to adjust a pressure exerted on a ticket passing between the rollers. In some embodiments, the adjustment mechanism may be manually operated. In some embodiments, the adjustment mechanism may be automatic, e.g., based on a preset profile for a particular game, with feedback from operation of one or more cutter motors, etc. The scraper roller may include, for example, one or more knurled members coiled around a cylinder, e.g., so that transverse force, lateral force, and combinations thereof are applied to scrape material off a passing ticket.

A vacuum manifold engaged with, for example, the third pair of plates, may be operatively connected to a negative pressure source to draw debris from the scraping of material off from tickets away from the feed path. In some embodiments, the vacuum manifold may include one or more troughs configured to fit around one or more elements, e.g., drive rollers, idler rollers, etc., e.g., in order to isolate such elements from debris. The manifold may be configured to engage with a pair of plates without fasteners, e.g., via magnetic connection.

In some embodiments, the scraper system may be formed from a plurality of removable modules, e.g., a first module that includes the chute and at least one pre-scraping scanner, a second module that includes the scraping mechanisms, vacuum manifold, and the brush, and a third module that includes a post-scraping scanner and an outlet. However, it should be understood that any suitable distribution of elements across any suitable number of modules may be used. Each module may include, for example, a mechanism for locating the module relative to an adjacent module such as a locating pin and corresponding hole on the adjacent module. Each module may include a contact for communicating one or more of power or data to an adjacent module. Each module may include a locking mechanism configured to enable the module to be fixed to an adjacent module, e.g., an active locking element and/or a passive locking receiver.

In the following description, embodiments will be described with reference to the accompanying drawings. As will be discussed in more detail below, in various embodiments, systems and methods for enabling electronic interaction with activities associated with a physical document are described. Although several examples and embodiments below pertain to providing games of chance, it should be understood that the techniques and technologies disclosed herein may be adapted to any suitable activity associated with a physical document. For example, the techniques and technologies disclosed herein may be adapted to physical ballots for an election, physical citations for legal code enforcement, physical tickets for a concert or event, gift cards with a scratch-to-reveal code region, etc.

FIG. 1 depicts an exemplary environment 100 that may be utilized with techniques presented herein. One or more user device 105, one or more provider system 110, one or more terminal system 115, and one or more third party system 120 may communicate over an electronic network 125. Each user device 105 may be associated with a respective user 130, and each provider system 110 may be associated with a respective provider 135. As will be discussed in further detail below, one or more scratching systems 140 may be associated with a provider 135. In some embodiments, the scratching system 140 may communicate with one or more other elements of the environment 100. In some embodiments, the scratching system 140 may be an un-networked device.

The systems and devices of the computing environment 100 may communicate in any suitable arrangement. As will be discussed herein, systems and/or devices of the computing environment 100 may communicate and/or operate in order to, for example, operate a game of chance in a manner that provides electronic interaction in association with physical tickets for the game of chance. In another aspect, elements of the environment 100 may operate and/or cooperate to process physical media elements, e.g., scratch a layer of material off a ticket to reveal hidden information. Further, it should be understood that the techniques and technologies discussed herein may be adapted to any suitable activity associated with a physical document.

The user device 105 may be a computer system such as, for example, a desktop computer, a mobile device, etc. In an exemplary embodiment, the user device 105 is a cellphone, or the like. In some embodiments, the user device 105 may include one or more electronic application(s), e.g., a program, plugin, etc., installed on a memory of the user device 105. In some embodiments, the electronic application(s) may be associated with one or more of the other components in the computing environment 100. For example, the electronic application(s) may include user authentication tools, a digital wallet of the user, an application that provides access to an online portal, website, or the like for a game of chance, e.g., hosted by the provider system 110, or the like. In some embodiments, the user device 105 may include a position sensor (not shown) or the like configured to determine a location of the user device, e.g., via global positioning, or may be configured to use or provide access to other data usable to determine the location of the user device 105, e.g., via IP address data, cell tower data, or the like The provider system 110 may include, for example, one or more server systems, management consoles, or the like. In some embodiments, the provider system 110 may store a database that includes, for example, user data, records associated with tickets, orders, requests, purchases, redemptions, or the like for one or more game of chance. In some embodiments, the provider system 110 may include or access one or more services or applications, such as a secure financial transaction process, a tool to validate an identity and/or location of a user 130, or the like. For instance, the provider system 110 may operate in conjunction with a terminal system 115, a third party system 120, or the like. In an example, the provider system 110 may host an online service accessible via the user device 105. The online service may enable validation of a user's identity and/or location, may associate a user account with a user financial account (such as may be managed by the third party system 120). The online service may provide a portal or the like at which the user 130 is able to request one or more tickets for one or more games of chance.

The online service may be configured to update a status of a request of a user 130. For example, a user 130 may request one or more tickets, and the online service may indicate that the request is in process or that the ticket(s) are being obtained. The online service may update the 130 to indicate that the tickets are available to scratch, have been scratched, have been revealed, have been redeemed, etc. In some instances, such updates may occur automatically, e.g., in response to a status of another element of the environment 100. In some instances, such updates may occur in response to a user interaction, e.g., a request to scratch a ticket. However, it should be understood that the status of the request may not align with an actual status of a ticket. For instance, in some embodiments, tickets may be scratched before the online service shows the tickets as available to scratch. This may help ensure that the information from a scratched ticket is available to the online service when a request to interact with the ticket is received from a user. In other words, the provider 135 may pre-process physical media so that revealed information is pre-cached, and then use the online service to provide a pseudo-interaction for the user 130.

In various embodiments, the terminal system 115 generally encompasses a computer system configured to interact with physical media elements. For example, the terminal system 115 may be associated with a game of chance and configured to evaluate a processed ticket. In a particular example, scratching a ticket may reveal ticket information (e.g., hidden text or numbers, a barcode, etc.), that may be provided to the terminal system 115 to determine result or evaluation information, e.g., whether the ticket is a winner and if so to what extent. In some embodiments, the terminal system 115 may include or be configured to receive data from a scanner or the like usable to scan physical media elements, e.g., to obtain data indicative of the ticket information. In some embodiments, the ticket information includes the result information. In some embodiments, the terminal system 115 transmits a request for such information to a third party system 120, e.g., along with providing the ticket information to the third party system 120. In various embodiments, the terminal system 115 may be configured to output the result information in one or more mediums, e.g., visually on a display, a printed media generated by a printer, an electronic communication, etc.

The third party system 120 may be associated with, for example, one or more of a financial institution, a lottery provider, an identity verification entity, etc. For a financial institution, the third party system may include, for example, a computer system associated with one or more of a banking institution, a credit card institution, or the like. The third party system 120 may be configured to store or access financial data related to one or more of the user 130, the provider 135, the lottery provider, or the like. The third party system 120 may be configured to facilitate and/or execute financial transactions by and/or between one or more persons and/or entities utilizing the computing environment 100. Financial data may include, for example, account information, authentication information, transaction information, or the like. For a lottery provider, the third party system 120 may include a computer system for verifying and/or tracking ticket information, reward information, or other information or data associated with a game of chance. For instance, the third party system 120 may cooperate with the terminal system 115 to determine the reward information of a ticket based on the ticket information for that ticket. For an identity verification entity, the third party system 120 may include a computer system that stores or has access to identifying information and/or credentials for users 130, user devices 105, etc., and may be configured to respond to requests, e.g., from the provider system 110 or the like, to verify an identity, age, location, etc., of a user 130.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

The scratching system 140 may be configured to serially mechanically process physical media elements. In an example, the scratching system 140 may be configured to receive a batch of scratch-off lottery tickets, and serially process each ticket to scrape a layer of material off each ticket to reveal hidden information. In some embodiments, the scratching system 140 may be in electronic communication with one or more other elements from the environment 100. For example, in some embodiments, the scratching system 140 may be equipped to obtain ticket information and/or reward information from a ticket, e.g., before and/or after processing, and may be configured to transmit such obtained information to other devices, e.g., the provider system 110.

In some embodiments, the scratching system 140 may be configured to determine a status of a received batch of tickets before commencing processing of the batch. For example, upon receiving a batch of tickets, the scratching system 140 may be configured to detect a presence of the batch and/or a quantity of tickets in the batch, and may communicate with another device, e.g., the provider system 110, to determine whether the entire batch has been matched to various user requests, and thus is ready to be processed. In some embodiments, the scratching system 140 may be configured to automatically process received media without communication with other devices. In some embodiments, the scratching system 140 may be configured to transmit information obtained from processed media to another device. In some embodiments, the scratching system 140 may be configured to receive removable memory or the like, e.g., a memory card storing information from an associated batch of processed media, whereby the removable memory may be transferred to another device. Further details of the scratching system are discussed below.

In examples, the input media may be a lottery ticket (e.g., a scratch-off ticket, or the like), a piece of paper, a card, plastic, cardboard, or the like. The media may include a coating or layer of material overtop at least a portion of a main body. The layer of material, e.g., latex, foil, a plastic or other thin film, or the like, may obscure information, such that removal of the layer from the surface of the media reveals textual and/or numerical characters on the surface of the input media. However, it should be understood that the foregoing is an illustrative example only, and that any suitable type of media with a coating that is removable via manual processing to reveal any suitable information may be used.

Although depicted as separate components in FIG. 1, it should be understood that a component or portion of a component may, in some embodiments, be integrated with or incorporated into one or more other components. For example, a portion of the provider system 110 may be provided to the user device 105 as an electronic portal via the electronic application. At least a portion of a third party system 120 may be integrated into the provider system 110, or vice versa. Any suitable arrangement of the various systems and devices of the computing environment 100 may be used.

Figure 2:
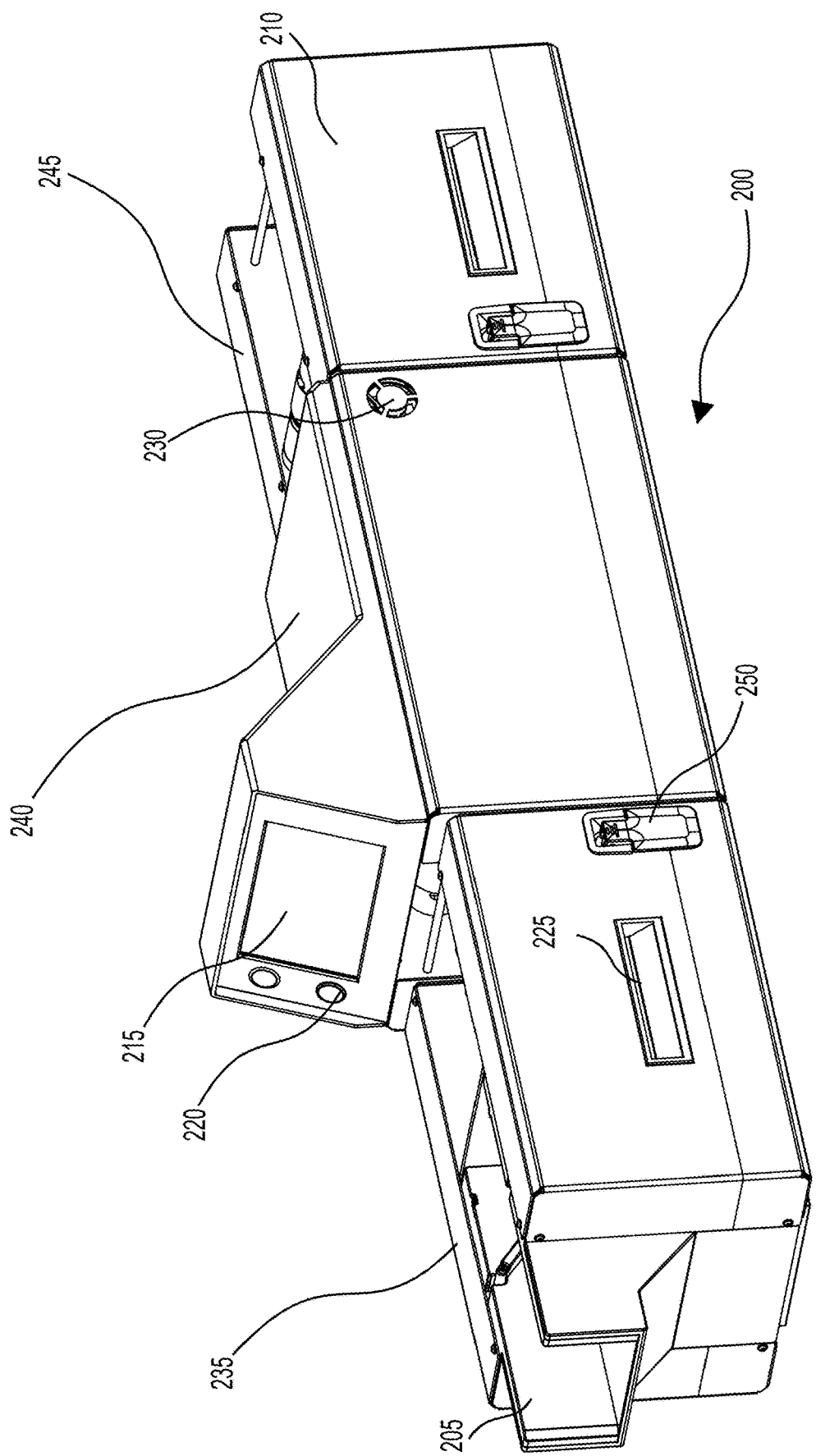
FIG. 2 depicts a perspective view of a scratching system, according to one or more embodiments.

FIG. 2 depicts a perspective view of an exemplary embodiment of a scratching system 200. The scratching system 200 includes an input chute 205, at least one housing 210 that houses various internal elements discussed in further detail below, a display 215, a user input element 220, one or more handle element 225, one or more vent 230, and an outlet (not shown, see FIG. 18 below). In this embodiment, the scratching system 200 is formed from a plurality of modules 235, 240, 245 that are fixed to each other via locking mechanisms 250, as discussed in further detail below. In this embodiment, module 235 is configured as a feed module, input module, and/or scan module, module 240 is configured as a processing or scratching module, and module 245 is configured as a further feed module, output or exit module, and/or further scan module. However, it should be understood that, in various embodiments, any suitable number, type, distribution, order, or arrangement of modules may be used. In some embodiments, a scratching system may be formed as a whole, e.g., as one unitary module. In some embodiments, different modules may be spaced apart from each other, e.g., such that media to be processed is serially introduced to different modules, one after the other.

Figure 3:
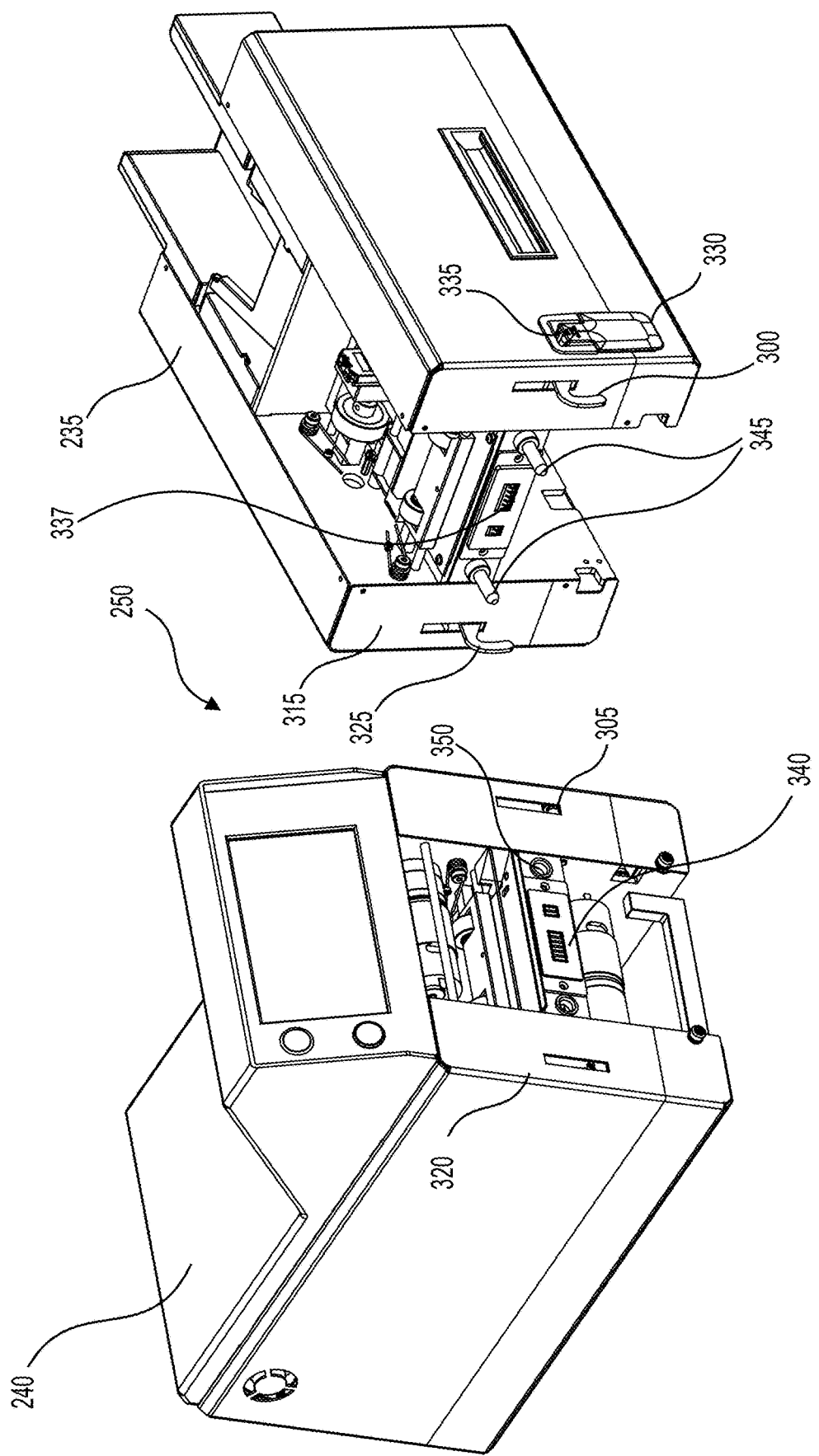
FIG. 3 depicts a perspective view of a locking mechanism to affix together different modules of a scratching system, according to one or more embodiments.

FIG. 3 is a perspective view illustrating a locking mechanism 250 operable to fix the scanning module 235 to the scratching module 240. The locking mechanism 250 includes one or more latch assembly 300 and one or more keyway 305. The latch assembly 300 and keyway 305 are positioned on ends of opposing modules to be fixed together. In this embodiment, the latch assembly 300 is positioned on a downstream end 315 of the scanning module 235, and the keyway is positioned on an upstream or front end 320 of the scratching module. However, any suitable arrangement may be used in various embodiments.

The latch assembly 300, in each case, includes a latch 325, a handle 330, and a mount 335. The mount 335 is positioned on a side of the scanning module 235, and the handle 330 is supported on the mount 335 so as to be rotatable. The latch 325 is operatively connected to the handle 330, such that the latch 325 is configured to move between the locked position shown in FIG. 3 and an unlocked position (not shown in FIG. 3, see, e.g., below in FIG. 17A) in which the latch 325 is at least partially rotated in toward the scanning module 235. The keyway 305 is positioned on the upstream end 320 of the scratching module 240 so that the keyway 305 is aligned with the latch 325 when the upstream end 320 of the scratching module 240 is positioned abutting the downstream end 315. An inside of the keyway 305 is shaped such that the latch 325, in the closed position, latches onto the keyway 305 to fix the scanning module 235 with the scratching module 240. The latch 325 and keyway 305 may be configured such that moving the latch 325 toward the locked position when the modules 235 and 240 are aligned draws the modules toward each other, e.g., to facilitate alignment and connection.

As illustrated in FIG. 3, the ends 315 and 320 of the modules 235 and 240 further include electronic contacts 337 and 340, respectively, that are positioned so that they abut each other and form an electronic connection when the modules 235 and 240 are fixed together. In some embodiments, the electronic contacts 337 and 340 include pin contacts that, for example, facilitate forming and breaking data and/or power connections between the modules 235 and 240 without requiring connection or disconnection of cables. However, any suitable electronic contact mechanism may be used in various embodiments. In an example, the electronic contacts 337 and 340 may include connectable cables, sockets, or the like.

Additionally, the ends 315 and 320 of the modules 235 and 240 further include alignment pins 345 and alignment holes 350, respectively. The alignment holes 350 are configured to receive the alignment pins 345 to facilitate aligning the modules 235 and 240 with each other when connecting them together.

Figure 4A:
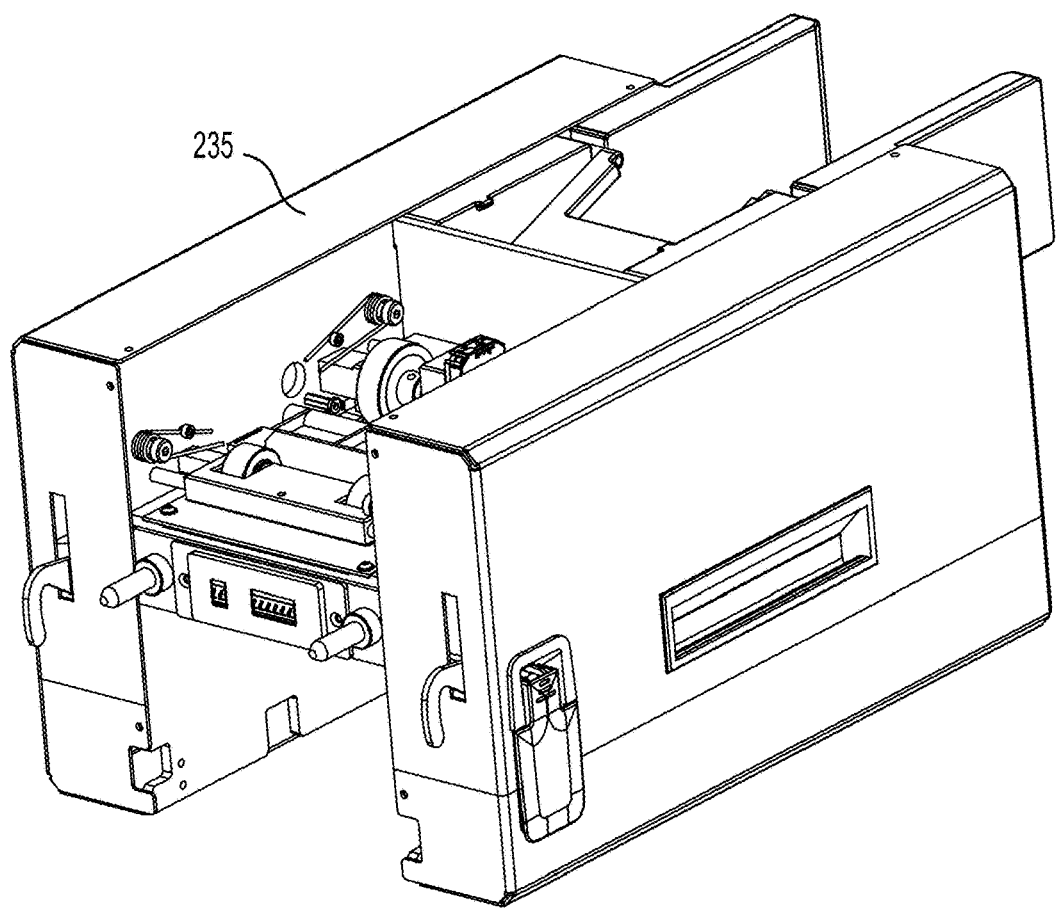
FIGS. 4A-C depict perspective, rear, and side views, respectively, of a scanning module of a scratching system, according to one or more embodiments.
Figure 4B:
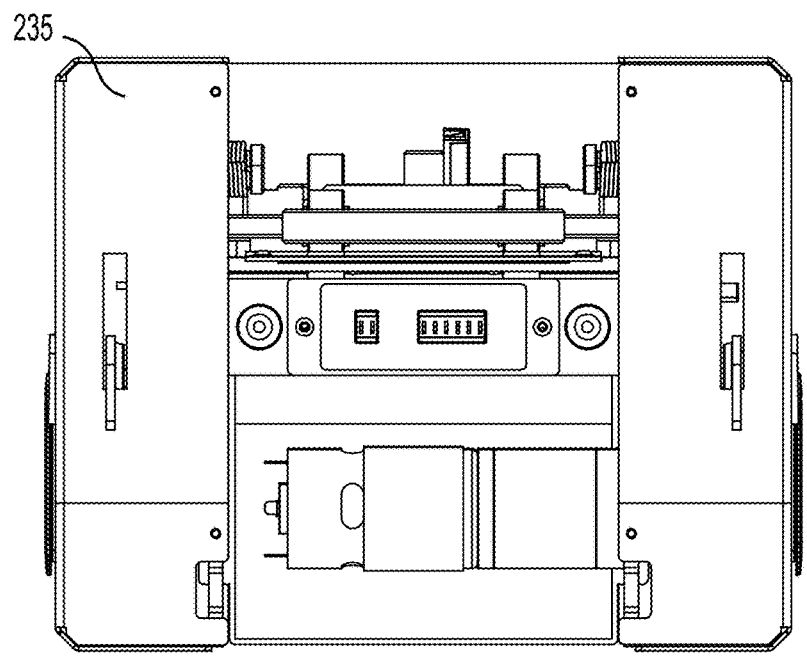
Figure 4C:
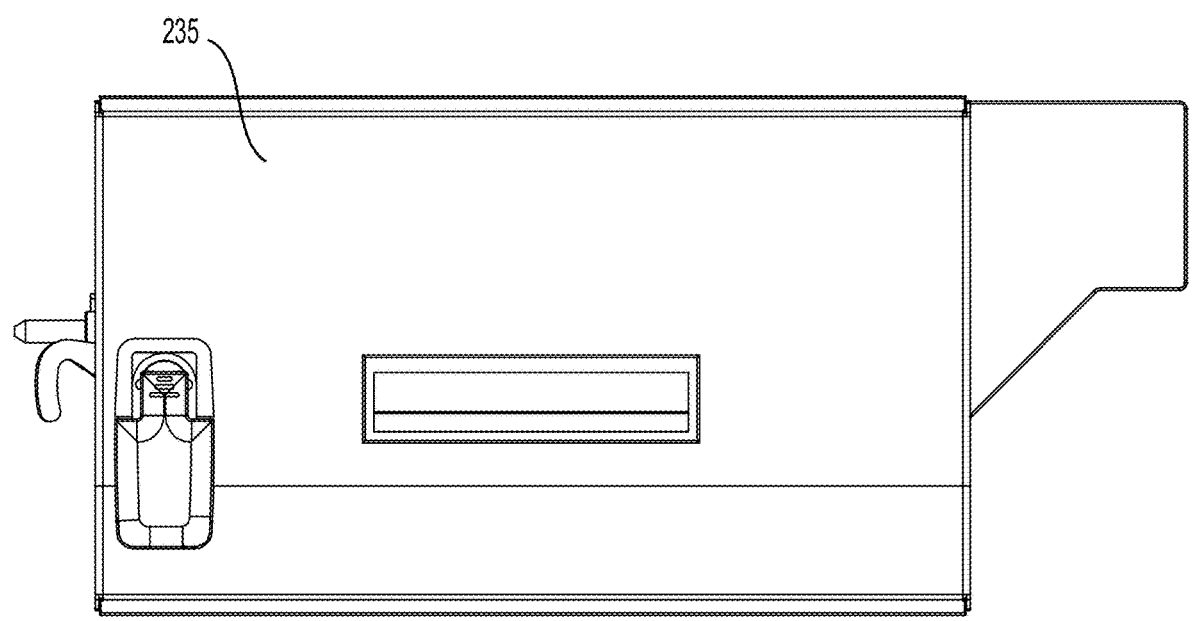
Figure 5:
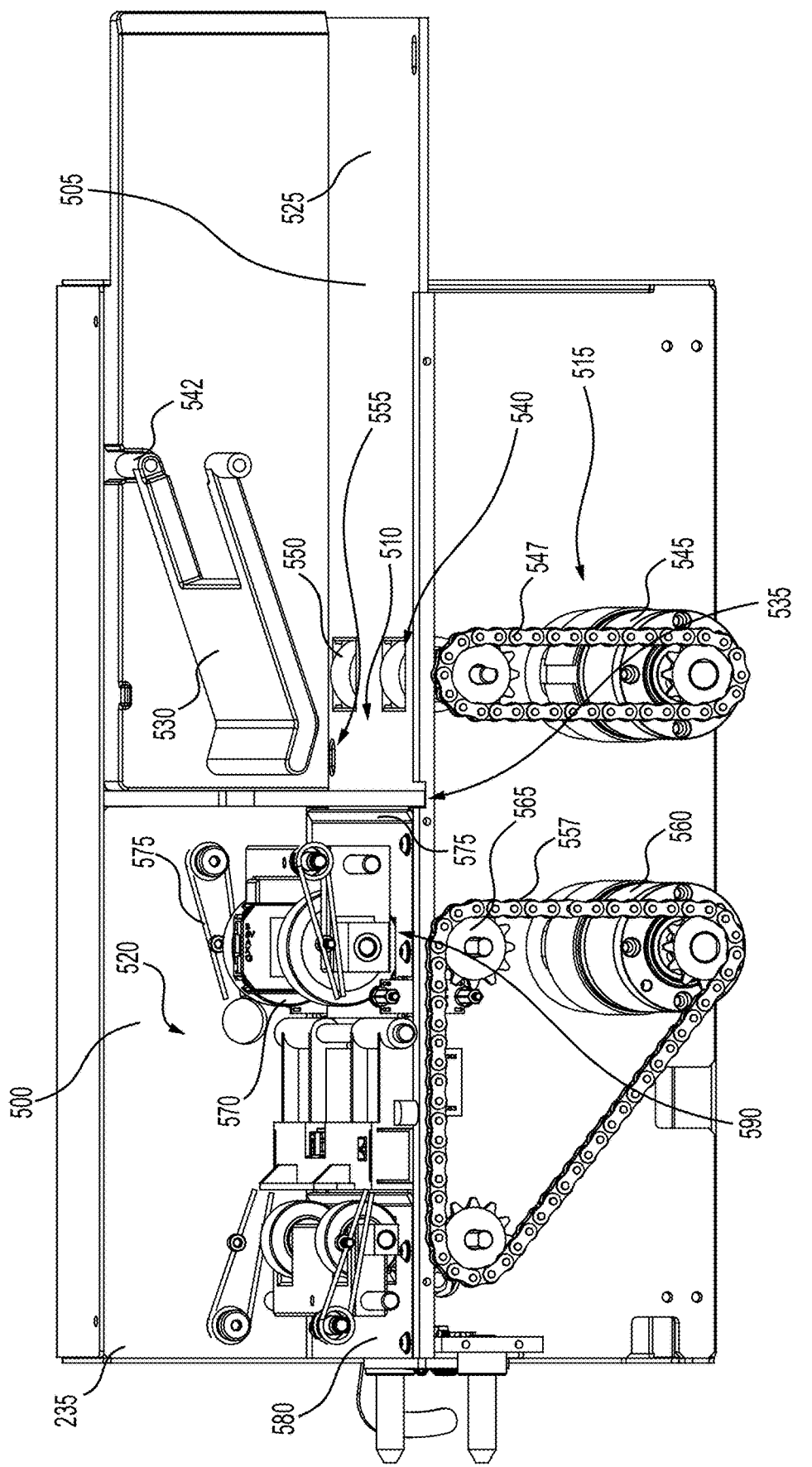
FIG. 5 depicts a side perspective view of the scanning module of FIGS. 4A-C with a portion of its housing removed to show an interior thereof, according to one or more embodiments.

FIG. 4A-C depict perspective, rear, and side views, respectively, of the scanning module 235, and FIG. 5 depicts a side perspective view of the scanning module 235 with a portion of the housing 500 removed to show an interior of the scanning module 235. As illustrated in FIG. 5, the scanning module 235 further includes an input chute 505, a feed path 510, a feed assembly 515, and a scanner assembly 520.

The input chute 505 includes a base 525, a rotating tongue 530, and a ticket gate 535. The base 525 is configured to receive a batch of physical media elements, e.g., scratch-off tickets, and includes one or more apertures 540 that provide access for the feed assembly 515 as discussed below. The rotating tongue 530 is rotatable about a mount 542 such that an end of the tongue 530 is biased toward the base 525, e.g., via a weight of the tongue 530, via a spring, or the like. With a batch of tickets received on the base 525, the tongue 530 presses the batch against the base 525, e.g., to facilitate engagement of the feed assembly 515. The ticket gate 535 forms a gap at the bottom of an upstream wall of the input chute 505, and is sized so only a single physical media element is able to pass through the ticket gate 535 at a time. Further, the ticket gate 535 provides access for the exiting ticket out from the input chute 505 (e.g., by sliding along the base 525 as conveyed by the feed assembly 515), and into the feed path 510.

The feed assembly 515 includes a first feed motor 545, a clutched roller 550, a first presence sensor 555, at least one further feed motor 560, at least one feed roller 565, at least one idler roller 570, and at least one roller spring 575.

In this embodiment, the first feed motor 545 and at least one the further feed motor 560 are high power TT motors, e.g., motors with an integrated gearbox to reduce motor speed and increase torque. However, in various embodiments, any suitable motor may be used. The first feed motor 545 may be operatively connected to the clutched roller 550 via a feed belt or chain 547. The clutched roller 550 may extend into the input chute 505 via an aperture 540 in the base 525, and may be configured to operatively engage with a bottom-most ticket in a batch received in the input chute 505. The presence sensor 555 may be configured to detect a presence of a ticket in the input chute 505, and the first feed motor 545 may be configured to operate the clutched roller 550 in response to such detection. In various embodiments, the presence sensor 555 may include an infrared sensor, a pressure sensor, a thru-beam sensor, or any other suitable type of sensor.

In various embodiments, when one element is discussed as being configured to operate another, to cause a particular action, etc., it should be understood that such actions may be performed via a controller, onboard computer, printed-circuit-board, etc. For example, in some embodiments, the scanning module 235 may include an onboard controller. In another example, another module may include a controller configured to transmit instructions and/or receive data from other modules, e.g. via the electronic contacts 337 and 340, or the like. In some embodiments, however, some elements may operate or communicate without a controller. For example, a presence sensor may be operatively connected to a drive motor or the like.

The clutched roller 550 may thus be operated to draw the bottom-most ticket out of the input chute 505 via the ticket gate 535 and into the feed path 510. The at least one further feed motor 560 is operatively connected to the at least one further feed roller 565 via a further feed belt or chain 557. The at least one further feed motor 560 may also be configured to operate the at least one further drive roller 565 in response to the presence detection of the presence sensor 555, e.g., to convey the ticket along the feed path 510.

The feed path 510 includes at least one pair of plates 580. Each pair of plates 580 includes an inlet 585 and one or more apertures 590. The inlet 585 is located on an upstream edge of each pair of plates 580, and is formed by an angled mouth configured to guide an entering ticket into a portion of the feed path 510 between the pair of plates 580. The apertures 590 are configured to provide access for the one or more further drive roller 565 into the feed path 510, e.g., to convey tickets therethrough, and to provide access for the one or more idler rollers 570 into the feed path 510, e.g., to guide a ticket along the feed path 510.

In some embodiments, each idler roller 570 is positioned on a first plate of the pair of plates 580 so as to be opposite a respective further drive roller 565 on the other plate, e.g., so that the feed path 510 passes between the idler roller 570 and the further drive roller 565. Each idler roller 570 may be associated with a respective roller spring 575. The roller spring 575 may be configured to bias the associated idler roller 570 toward the opposing further drive roller 565, e.g., so that a passing ticket is pushed against the further drive roller 565 to facilitate being conveyed along the feed path 510.

Figure 6A:
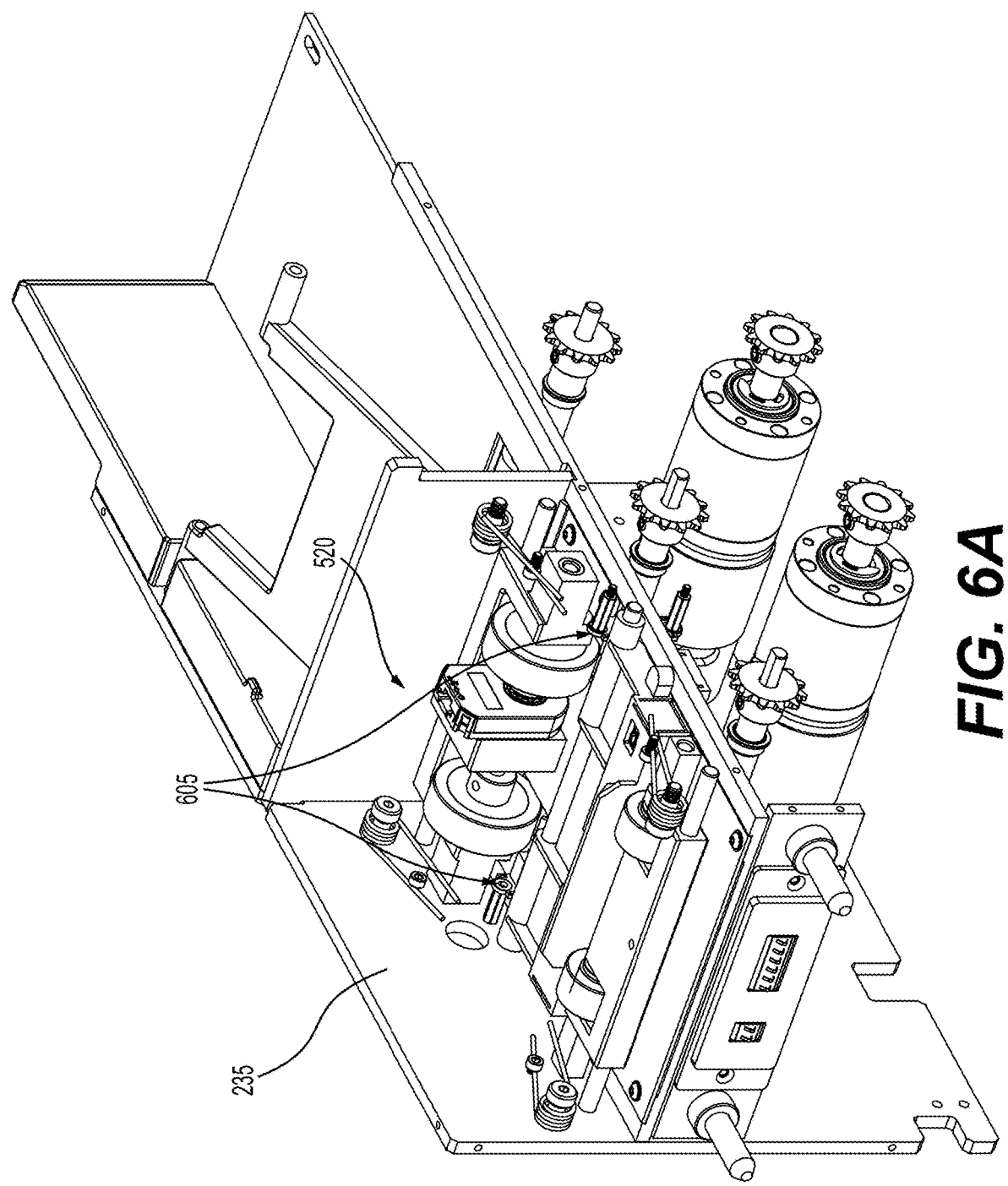
FIGS. 6A and 6B depict perspective and section views, respectively, of the scanning module of FIG. 5 with feed belts removed, according to one or more embodiments.
Figure 6B:
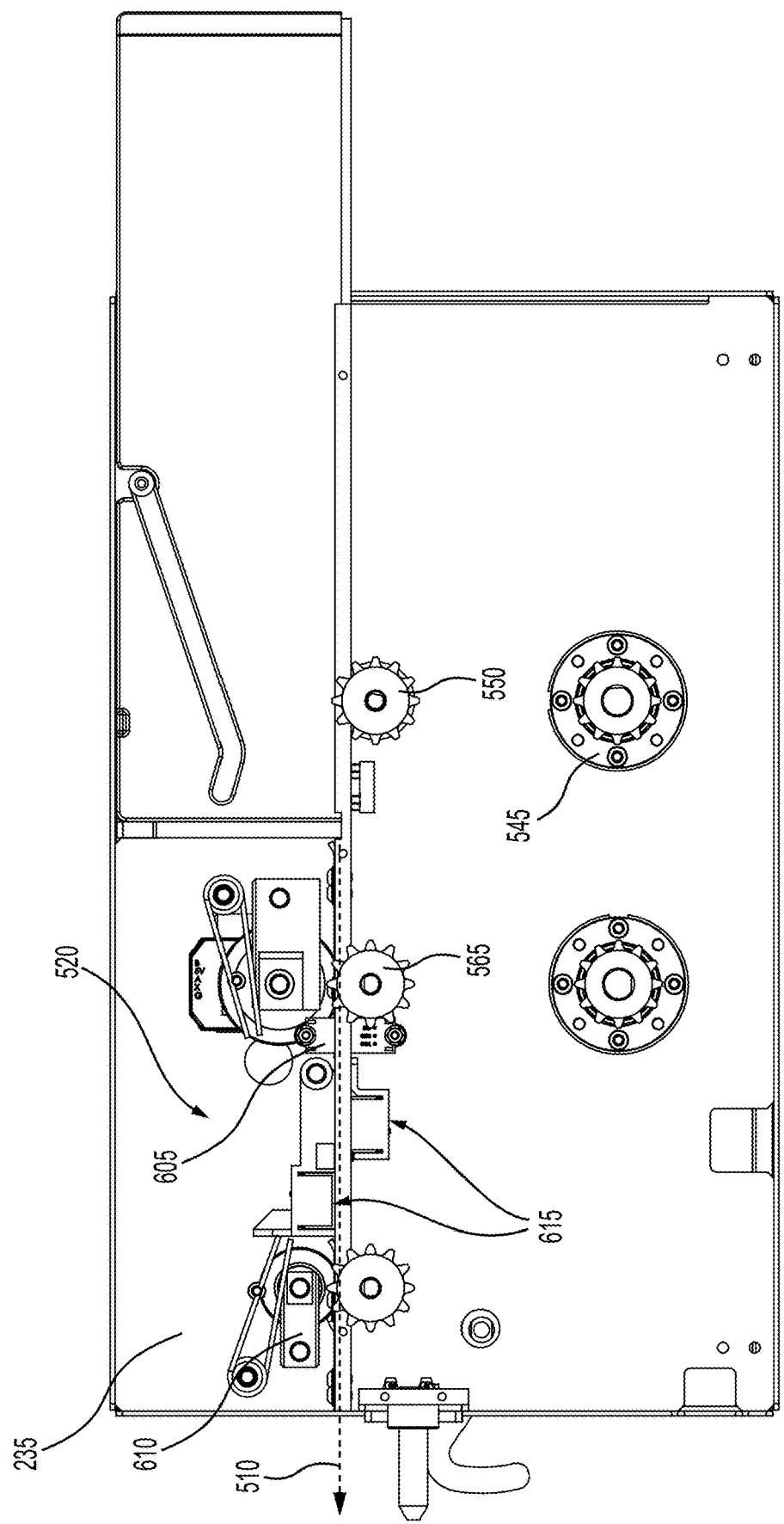

FIGS. 6A and 6B depict perspective and section views, respectively, of the scanning module 235 with the feed belts or chains 547 and 557 removed to provide a clearer view of the scanner assembly 520. The scanner assembly 520 includes at least one further presence sensor 605, a speed sensor 610, and at least one scanner 615. The speed sensor 610 may be configured to determine a conveyance speed of a ticket in the feed path 510. Further, in some embodiments, the speed sensor 610 may also operate as a presence sensor, e.g., to detect when a ticket exiting the input chute 505 has entered the feed path 510.

In some embodiments, the detection of the presence of the ticket in the feed path 510 by the speed sensor 610 may be configured to cause the first feed motor 545 to de-activate. De-activating the first feed motor 545 enables the ticket that has entered the feed path 510 to continue to be conveyed by the at least one further drive roller 565 without additional tickets being drawn out from the input chute 505 and interfering with the current ticket. In other words, the intermittent de-activation of the clutched roller 550 based on the presence of a ticket in the feed path 510 as detected by the speed sensor 610 may facilitate conveying tickets out from the input chute 505 serially, and without interfering with each other.

Figure 7:
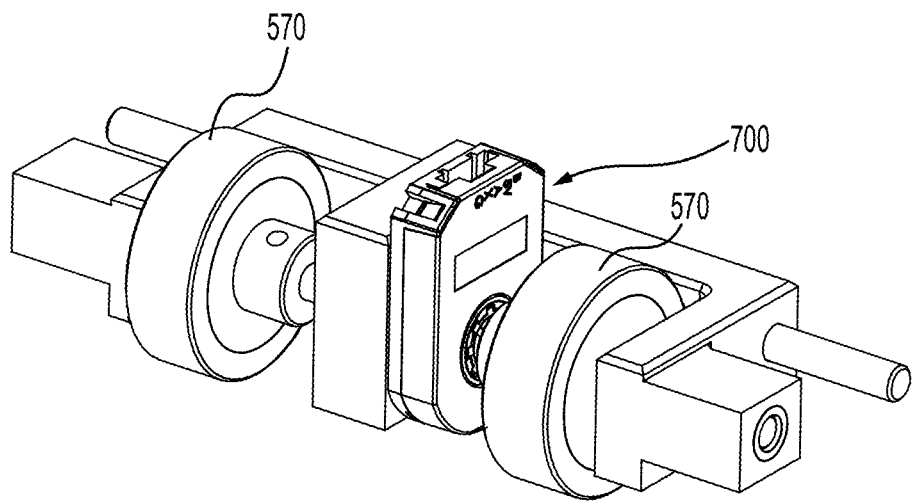
FIG. 7 depicts a perspective view of a rotary encoder, according to one or more embodiments.

In some embodiments, the speed sensor 610 includes a rotary encoder. FIG. 7 depicts a perspective view of an exemplary embodiment of a rotary encoder 700 that is mounted between a pair of idler rollers 570. As a ticket passes by the rotary encoder 700, the rotary encoder 700 may roll along with the ticket, whereby a sensed rotation speed of the rotary encoder 700 may be used to determine the conveyance speed of the ticket.

Returning to FIGS. 6A and 6B, the at least one scanner 615 may be configured to operate with reference to the determined conveyance speed of the current ticket. As illustrated in FIG. 6B, in this embodiment, the scanner assembly 520 includes a respective scanner 615 positioned to scan opposite faces of the ticket. In various embodiments, the at least one scanner 615 may include, for example, a barcode reader, a camera, or any other suitable type of imaging sensor.

The at least one further presence sensor 605 may be configured to detect a presence of the current ticket along the feed path 510 proximate to the at least one scanner 615. In some embodiments, the at least one scanner 615 may be configured to activate in response to the presence detection of the at least one further presence sensor 605. As illustrated in FIG. 6B, the at least one further presence sensor 605 may include a pair of fork sensors. However, any suitable presence sensor may be used in various embodiments.

Figure 8A:
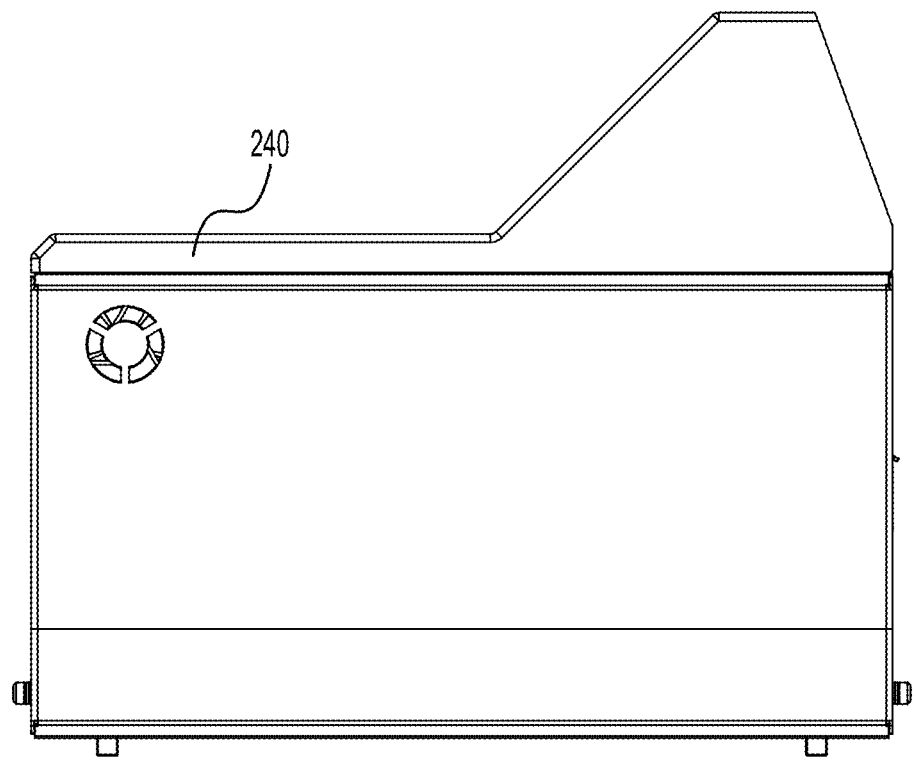
FIGS. 8A-C depict side, rear, and perspective views, respectively, of a scratching module of a scratching system, according to one or more embodiments.
Figure 8B:
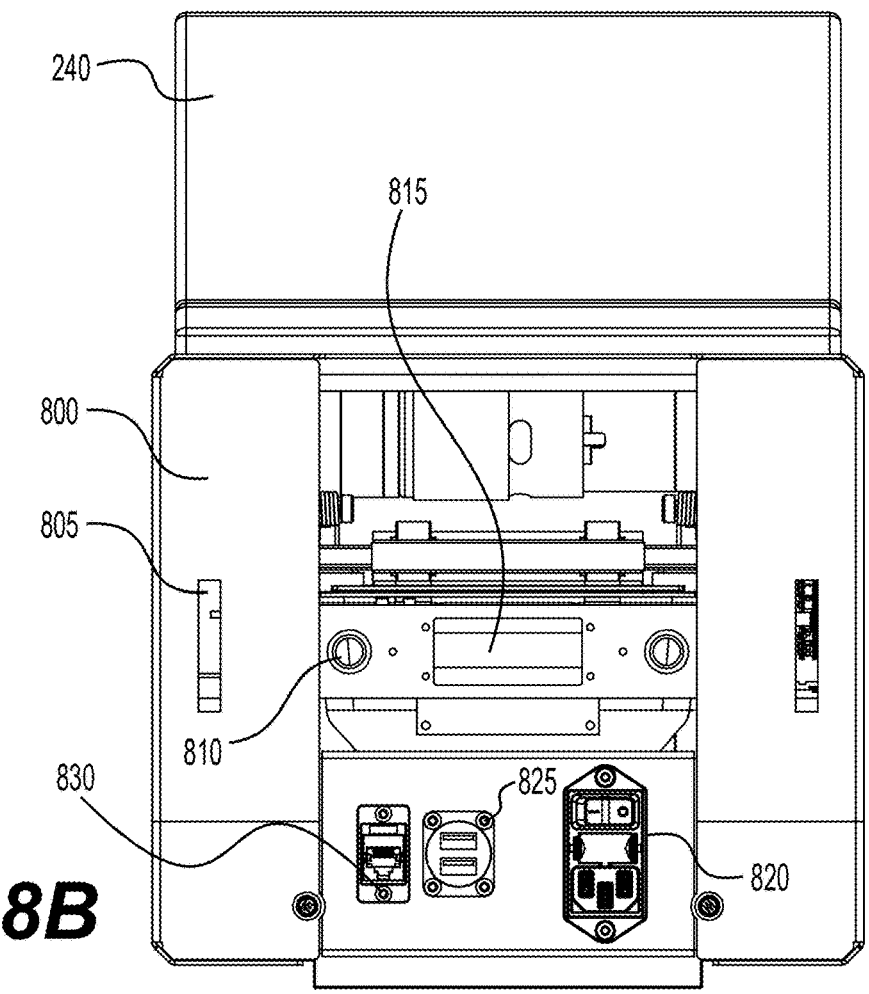
Figure 8C:
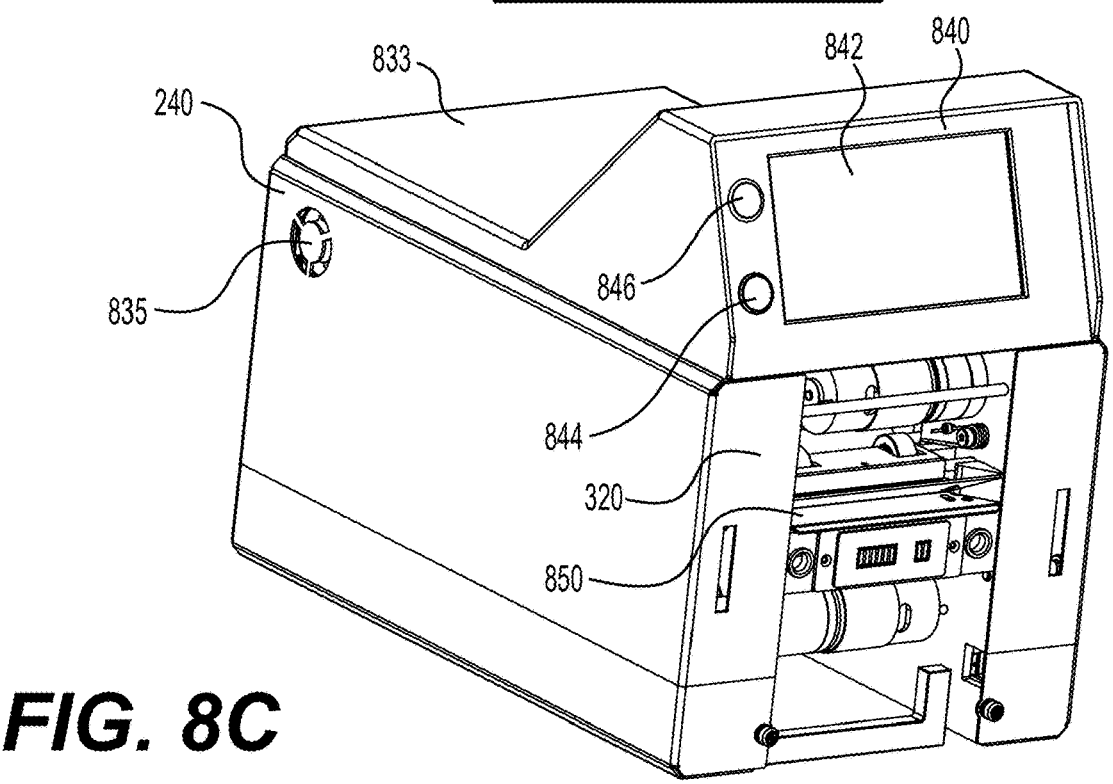

FIGS. 8A-C depict side, rear, and perspective views, respectively, of the scratching module 240. As illustrated in the rear view of FIG. 8B, the back 800 of the scratching module 240 includes keyways 805 for connecting to the exit module 245, as well as alignment holes 810 and electronic contacts 815 associated with such connection. Further, the back 800 includes a power connection port 820, a data connection port 825, and a network connection port 830 configured to connect the scratching system 200 to power, a data source and/or a computer system, and the electronic network 125, respectively.

Turning to the perspective view of FIG. 8C, the scratching module 240 further includes a top cover 833, a vent 835, an interface 840, and the upstream end 320. In some embodiments, the top cover 833 may be removable or openable, e.g., to provide access to inside of the scratching module 240. In some embodiments, the top cover 833 may be removably affixed to the scratching module 240 without fasteners, e.g., via one or more magnets integrated into the top cover 833 and positioned to adhere magnetically to the scratching module 240. In some embodiments, the top cover 833 may include an anti-tamper device, e.g., a breakable seal, a sensor, or the like configured to determine and/or indicate whether the top cover 833 has been opened. In some embodiments, the top cover 833 may include a noise dampening material.

The interface 840 includes a display 842, a button 844, and an indicator 846. The display 842, in some embodiments, may be a touch-screen display configured to receive touch-based user interaction. The display 842 may be configured to output operating information of the scratching system 200, e.g., status (e.g., idle, running, etc.), operating parameters (e.g., status or characteristics of one or more feed motor, status of one or more sensor, progress or location of a current ticket, whether tickets are detected in the input chute, average, current, or predicted ticket or batch processing time, ticket or batch processing statistics, network connectivity, etc.), ticket information, e.g., from one or more scanners, or the like. The display 842 may also include a user interface to set one or more parameters of the scratching system, e.g., motor speed(s), delay(s) between sensor detection and motor operation or de-activation, halt conditions, etc. The display 842 may also be configured to output information related to a fault or error, e.g., detection of a jammed ticket in the feed path, a halted motor, a lack of available tickets, a mismatch between a number of tickets detected as processed and a number of tickets set for a batch, a detection, e.g., via one or more scanner, of a ticket not matching a ticket in a current batch, a duplicate ticket, or the like. The button 844 may be configured to cause a reset of the scratching system 200 and/or jog one or more feed motors or cutter motors, e.g., to attempt to clear a jam. The indicator 846 may be configured to activate to indicate an occurrence of a fault or other issue requiring review or manual intervention. The front end 320 further includes an inlet 850 positioned to align with the feed path 510 of the scanning module 235.

Figure 8D:
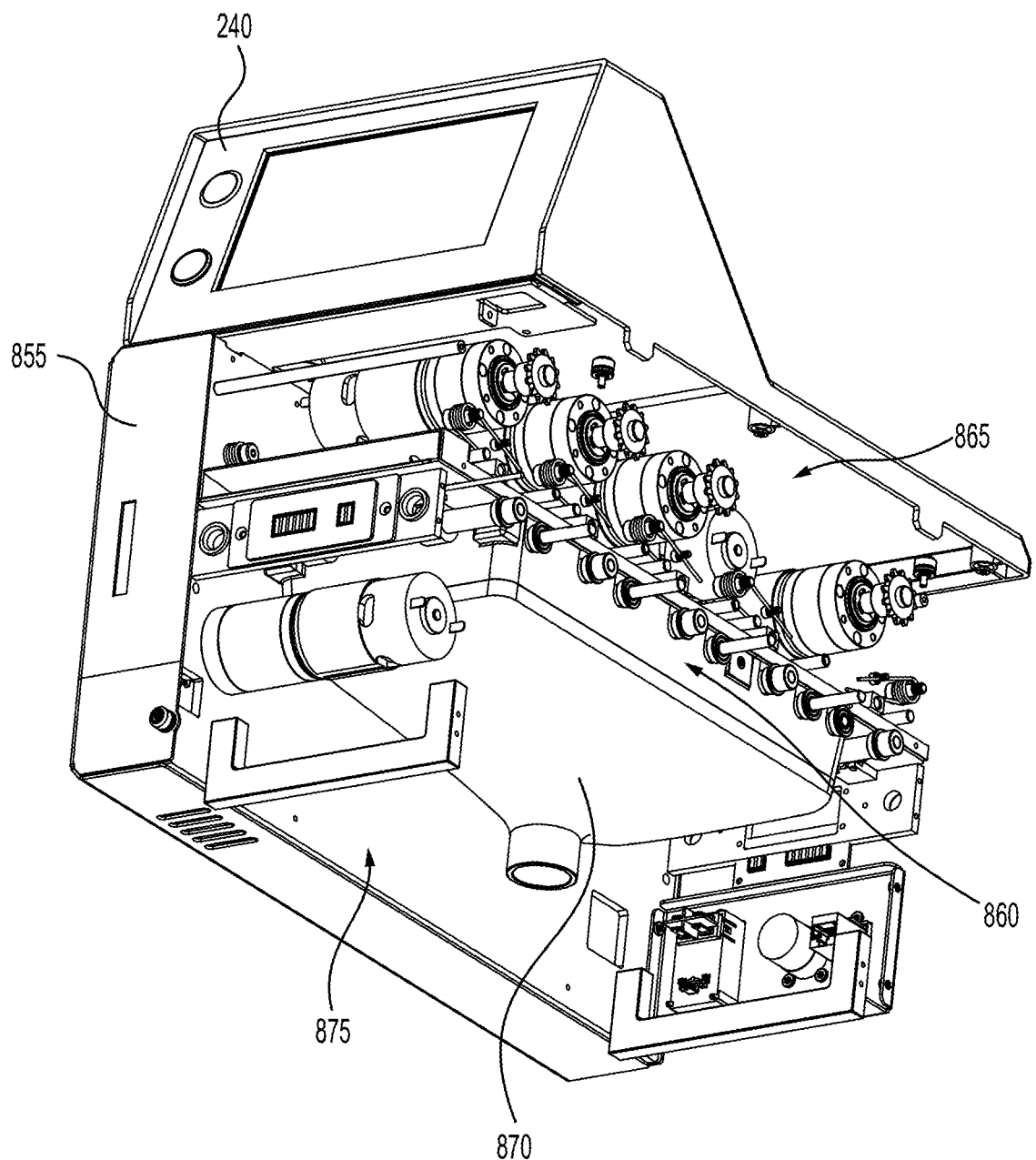
FIGS. 8D and 8E depict perspective and side views, respectively of the scratching module of FIGS. 8A-C with a side panel of its housing removed to show an interior thereof, according to one or more embodiments.
Figure 8E:
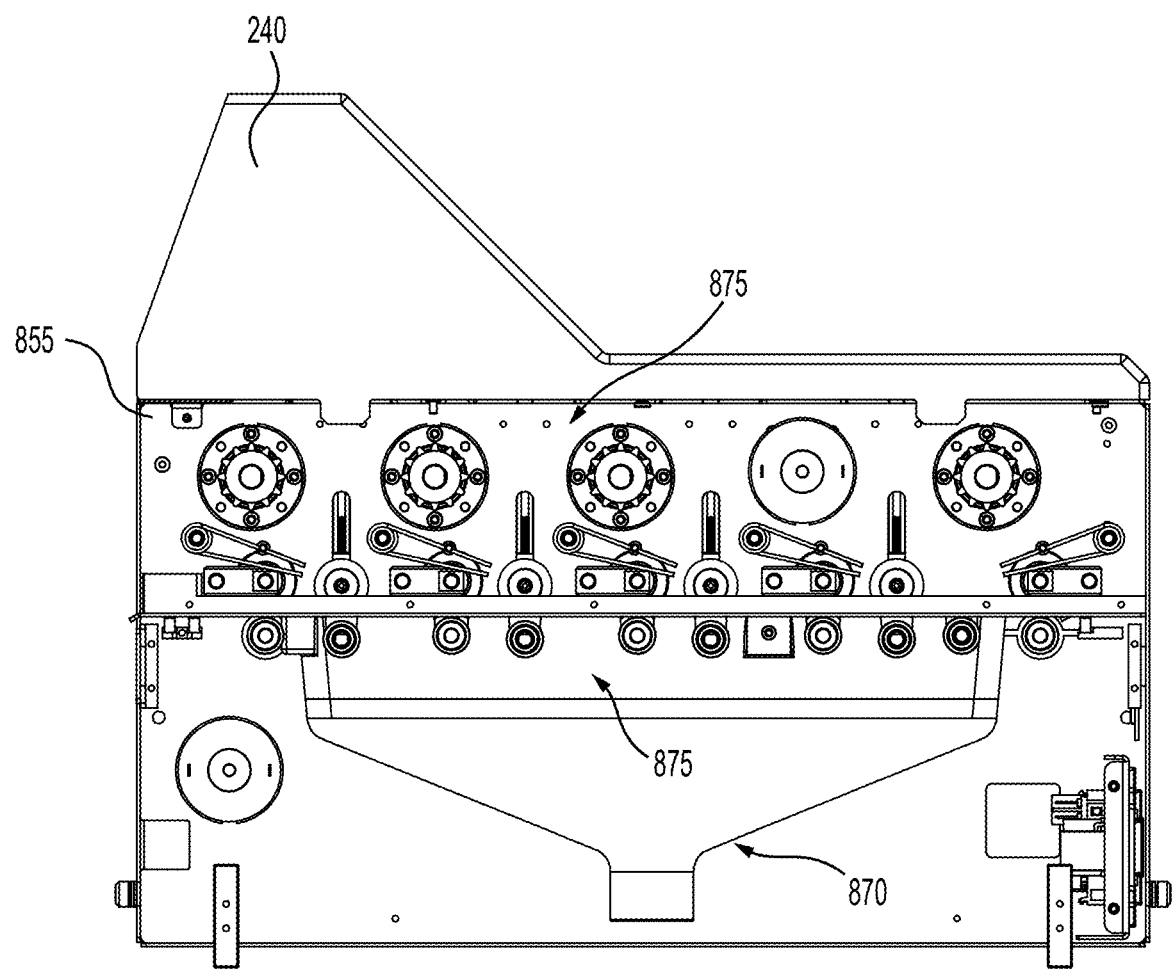

FIGS. 8D and 8E depict perspective and side views, respectively of the scratching module 240 with a side panel of housing 855 removed to illustrate inside of the scratching module 240. In some embodiments, at least portions of the housing 855 may include noise-damping material.

As illustrated in FIGS. 8D and 8E, the scratching module 240 further includes a feed assembly 860, a scratching assembly 865, a vacuum manifold 870, and a controller portion 875. The feed assembly 860, scratching assembly 865, and vacuum manifold 870 are discussed in further detail below. In some embodiments, the controller portion 875 houses control hardware and software configured to control various elements of the scratching system 200. For example, in some embodiments, the controller portion 875 may include a printed circuit-board, a single board computer system, or the like that is operatively connected to elements in the scratching module 240 and configured to operatively connect to the other modules 235 and 245 via electronic contacts 340 and 815. For example, a controller in the controller portion 875 may receive presence data from one or more sensors, and transmit control signals to one or more feed motors, cutter motors, or the like based on the received data.

Figure 9A:
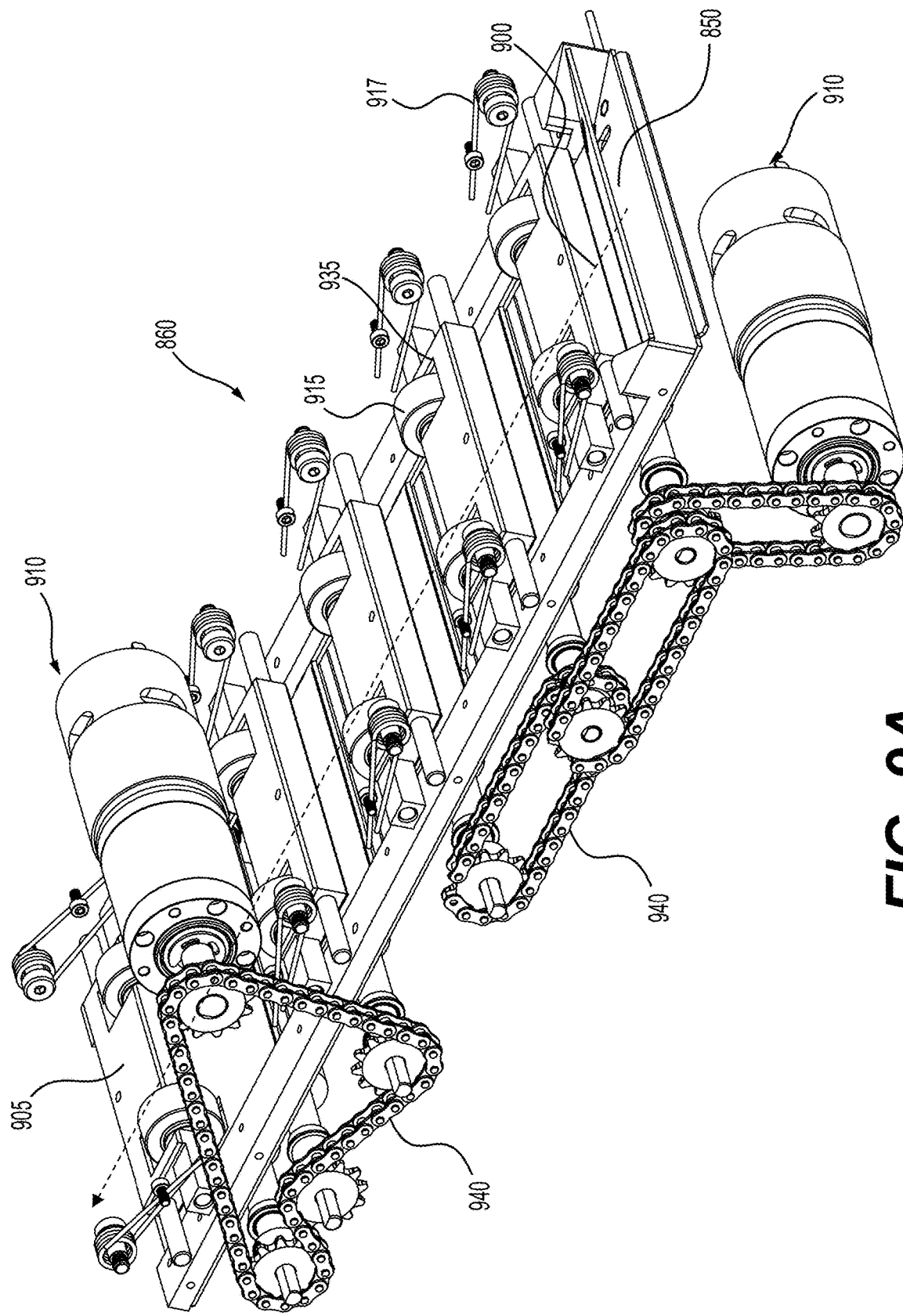
FIGS. 9A and 9B depict top perspective and bottom perspective views, respectively, of a feed assembly of a scratching system, according to one or more embodiments.
Figure 9B:
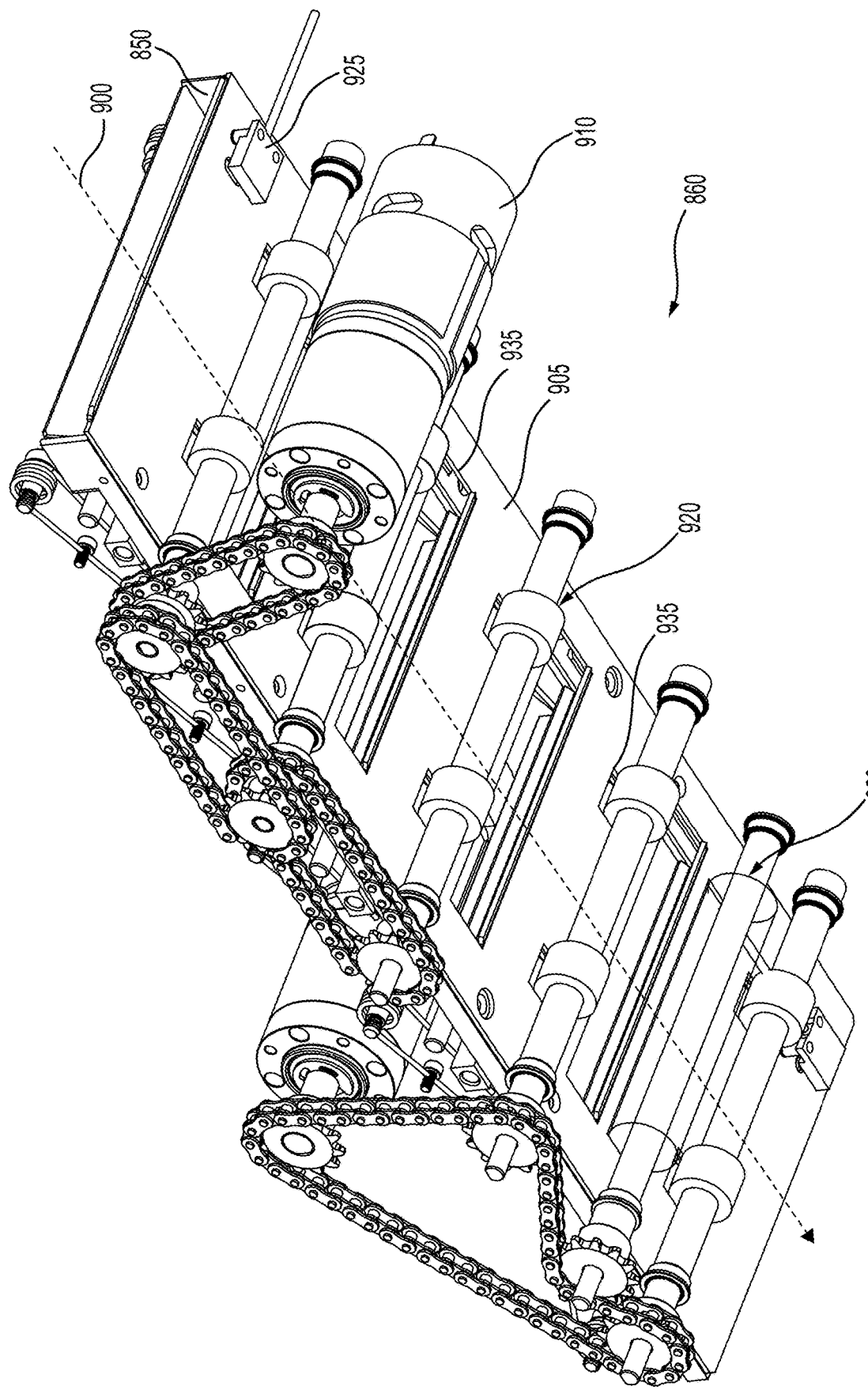

FIGS. 9A and 9B depict top perspective and bottom perspective views, respectively, of the feed assembly 860 of the scratching module 240. The feed assembly 860 includes the inlet 850, a feed path 900 formed by a pair of plates 905, one or more feed motors 910, one or more idler rollers 915, one or more driver rollers 920, one or more presence sensor 925, and a brush 930.

As discussed above, in this embodiment the inlet 850 is a mouth that narrows vertically into the feed path 900 between the pair of plates 905. The pair of plates 905 include various apertures 935 that provide access for other elements of the feed assembly 860. Further aspects of the pair of plates 905 are discussed below. The one or more drive rollers 920 are operatively connected to the one or more feed motors 910, e.g., by drive belts 940. Similar to the driver rollers and idler rollers in the scanning module 235, each drive roller 920 is positioned opposite a respective idler roller 915 that is pressed against the drive roller 920 via a roller spring 917. The brush 930 is operatively engaged with a furthest downstream of the feed motors 910, e.g., via a corresponding drive belt 940.

Figure 10A:
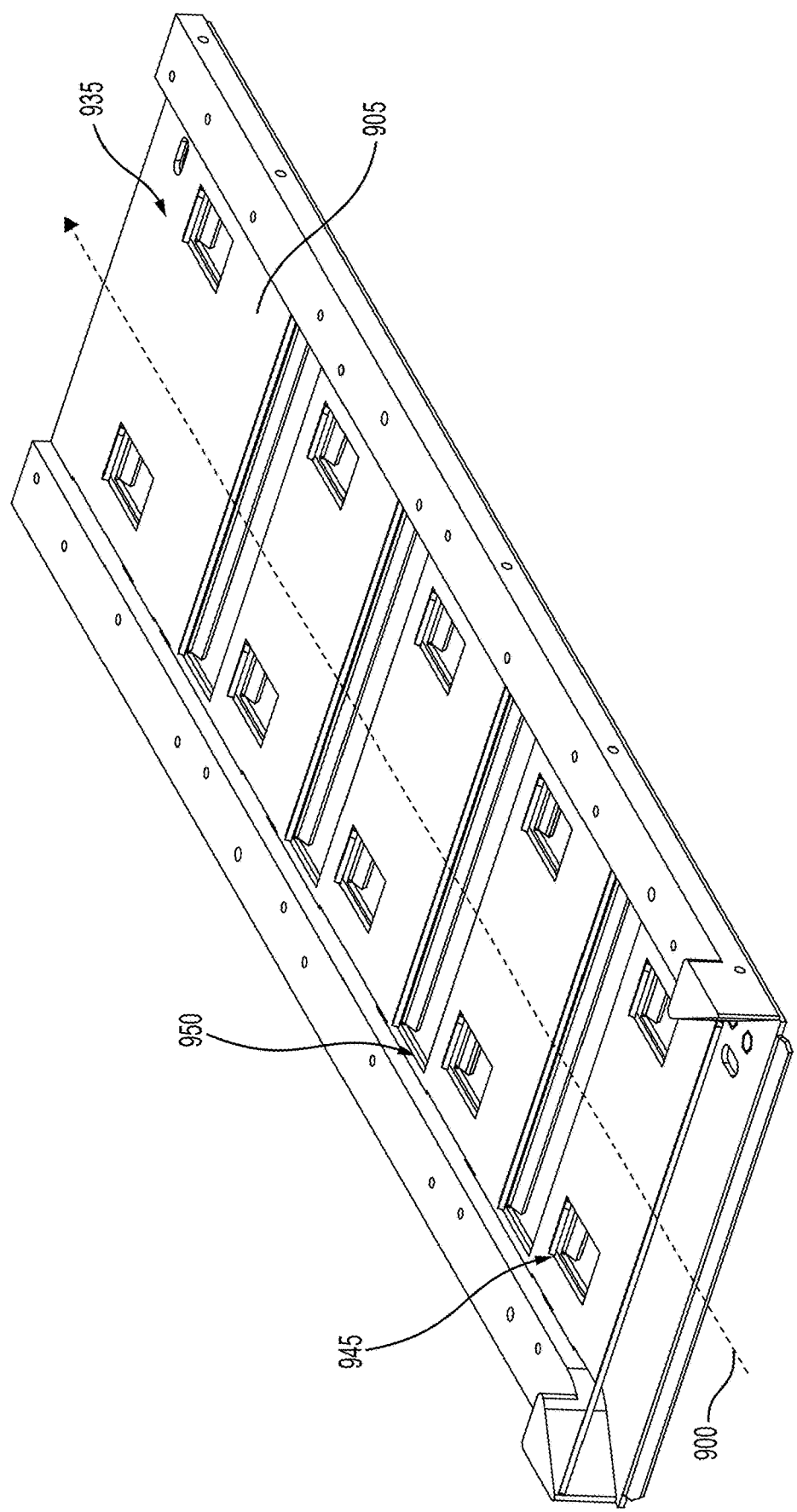
FIGS. 10A and 10B depict top and bottom perspective views, respectively, of a pair of plates from the feed assembly of FIGS. 9A and 9B, according to one or more embodiments.
Figure 10B:
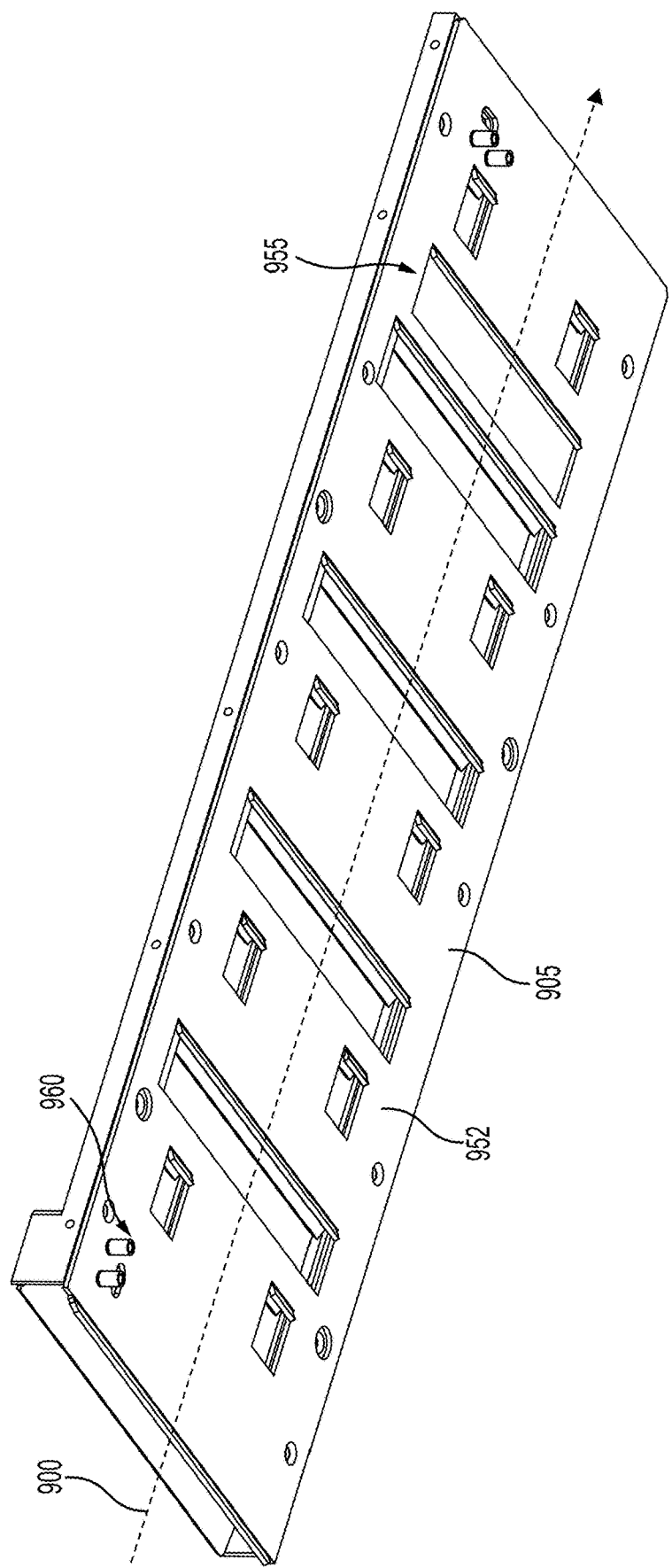

FIGS. 10A and 10B depict top and bottom perspective views, respectively, of the pair of plates 905 with other elements of the scratching assembly 865 removed. The pair of plates 905 may be substantially parallel with each other, and may be spaced apart by a distance corresponding to a loose sliding fit with a thickness of the tickets to be processed. In an example, the distance between the pair of plates 905 may be about 75 mm.

As illustrated in FIGS. 10A and 10B, the apertures 935 in the pair of plates 905 include feed apertures 945 that provide access for pairs of idler rollers 915 and drive rollers 920 (not shown) into the feed path 900, and scratching apertures 950 that provide access for scraper mechanism as discussed in further detail below. As shown in FIG. 10B, a bottom plate 952 of the pair of plates 905 includes a brush aperture 955 that provides access for the brush 930 (not shown). In this embodiment, each of the scratching aperture 950 as well as the brush aperture 955 is associated with a respective set of feed apertures 945. This arrangement may facilitate conveying tickets along the feed path 900. Further, the drive apertures 945 downstream of the brush aperture 955 may facilitate conveying processed tickets out of the scratching module 240 and into the exit module 245.

As illustrated in FIG. 10B, the bottom plate 952 further includes sensor mounts 960 for the one or more presence sensor 925 (not shown). The sensor mounts 960 provide access into the feed path 900, e.g., so that the one or more presence sensor 925 have visibility of passing tickets.

Figure 10C:
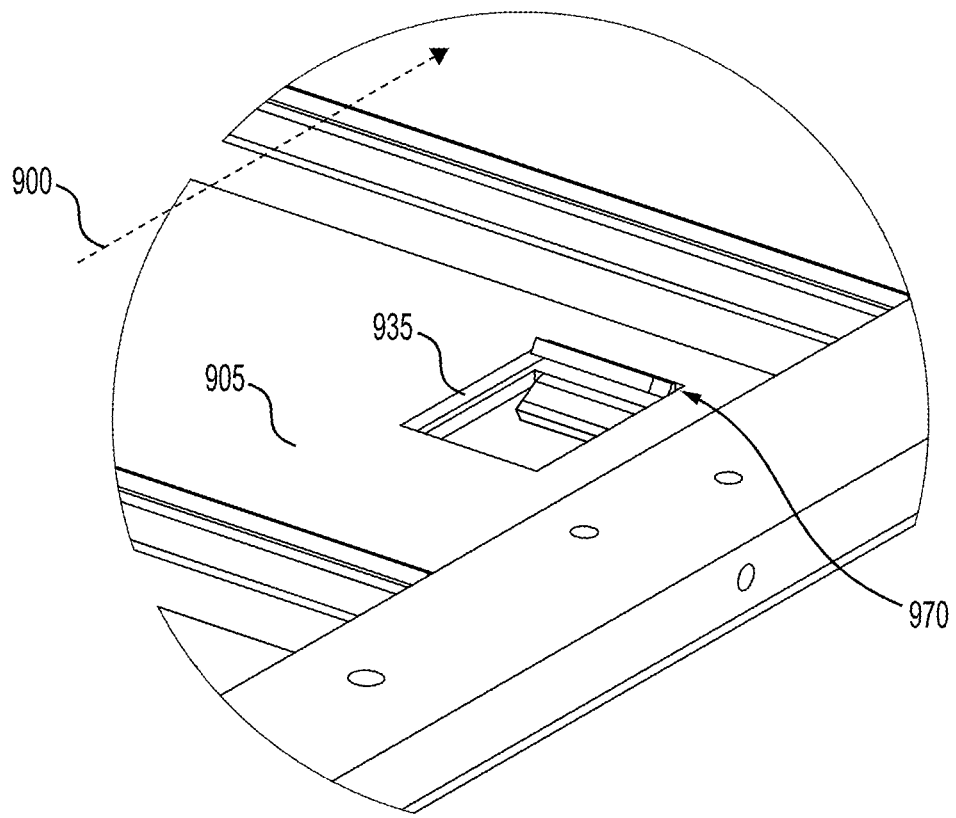
FIG. 10C depicts a detail perspective view of an aperture in the pair of plates from FIGS. 10A and 10B, according to one or more embodiments.

FIG. 10C depicts a detail perspective view of one of the apertures 935 in the pair of plates 905. As illustrated in FIG. 10C, a downstream edge includes flanges 970 angled away from the feed path 900, e.g., to form a mouth leading downstream into the feed path 900. Such a flanged edge may inhibit a leading edge of a passing ticket from catching on an edge of an aperture 935, and instead guide the leading edge back into the feed path 900.

Figure 11A:
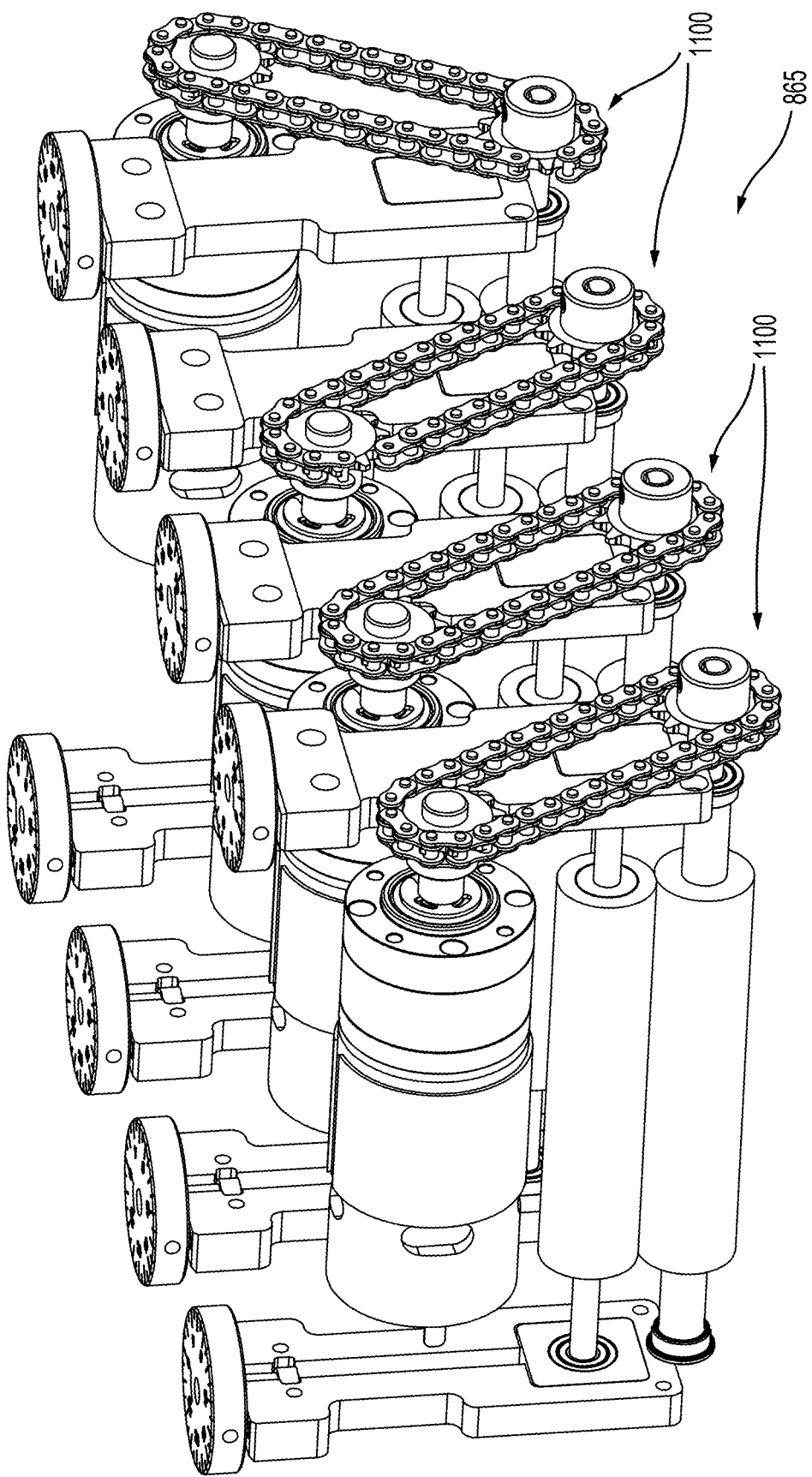
FIGS. 11A and 11B depict perspective and rear views, respectively, of a scratching assembly of a scratching system, according to one or more embodiments.
Figure 11B:
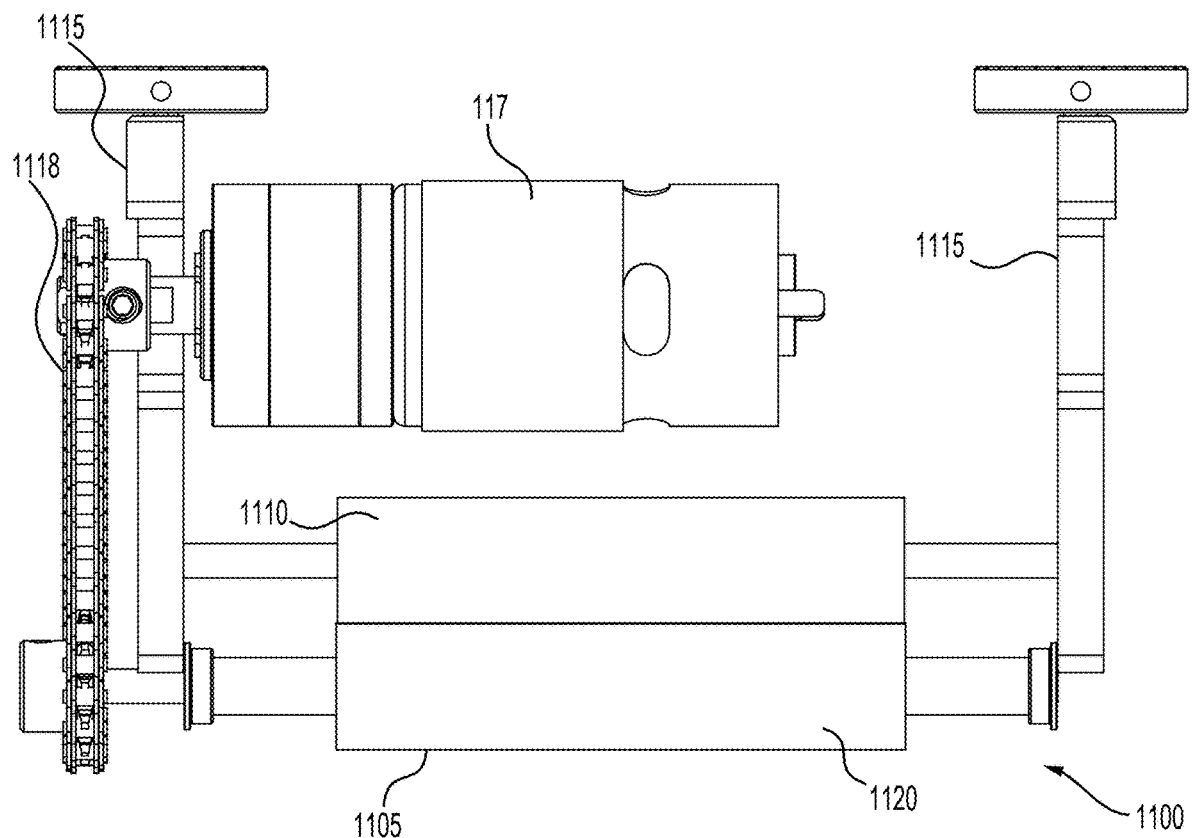

FIGS. 11A and 11B depict perspective and rear views, respectively, of the scratching assembly 865 of a scratching system 200. As illustrated in FIG. 11A, the scratching assembly 865 includes a plurality of scratching mechanisms 1100 positioned in series. In this embodiment, the scratching system 200 includes four scratching mechanisms 1100 positioned in series. However, it should be understood that any suitable number of scratching mechanisms may be used in various embodiments. In some embodiments, the inclusion of multiple scratching mechanisms may facilitate a more complete scraping of a ticket. In some embodiments, different scratching mechanisms may be configured to operate on different portions of a passing ticket, as discussed in further detail below. In some embodiments, different scratching mechanisms are configured to provide at least partial redundancy of a preceding scratching assembly.

As illustrated in FIG. 11B, each scratching mechanism 1100 includes a stationary roller 1105, an adjustable roller 1110, a pair of adjustment mechanisms 1115, and a cutter motor 117. The stationary roller 1105 may include at least one scraper 1120 configured to remove a layer of material from a surface of a ticket, for example, as the ticket is moved along the feed path 900. The stationary roller 1105 may be formed from rigid material, e.g., a metal such as steel, or the like. Further details of the scraper 1120 are discussed below. In addition, as discussed in further detail below, the pair of adjustment mechanisms 1115 are operable to adjust a height of the adjustable roller 1110 relative to the stationary roller 1105, and thereby a pressure exerted by the scratching mechanism 1100 on tickets passing therethrough. The cutter motor 117 may be operable, e.g., via a drive belt or chain 1118 or the like, to drive rotation of the stationary roller 1105. The adjustable roller 1110 may, in some embodiments, be formed from a compliant material, e.g., a rubber or the like. Such compliance may facilitate the adjustable roller 1110 biasing media toward the stationary roller 1105 as the media passes between.

Figure 11C:
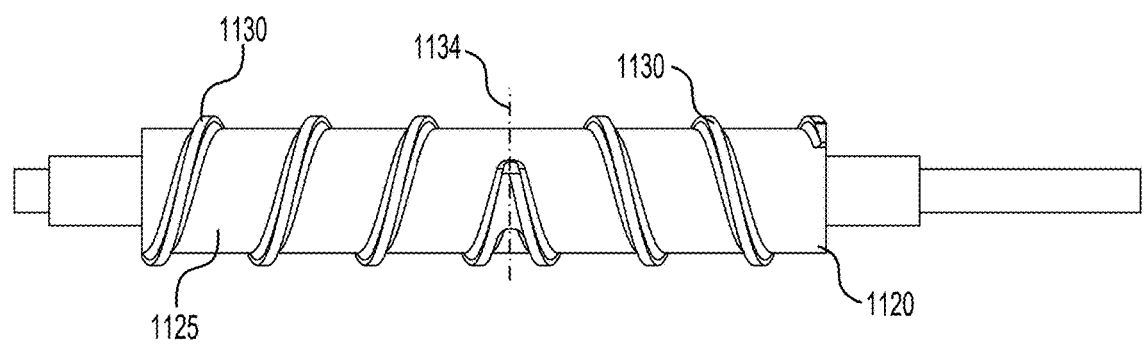
FIG. 11C depicts a top detail view of an exemplary embodiment of a scraper from the scratching assembly of FIGS. 11A and 11B.

FIG. 11C depicts a top detail view of an exemplary embodiment of the scraper 1120. As illustrated in FIG. 11C, in this embodiment, the scraper 1120 includes a cylinder 1125 and a pair of scraper members 1130 that spiral around a surface 1132 of the cylinder 1125 in opposite directions, e.g., so that spiral shapes of the scraper members 1130 mirror each other about a center 1134 of the cylinder 1125. The scraper members 1130 may include a knurled surface configured to facilitate scraping of material. The spiral shapes result in forces exerted by the scraper 1120 on an engaged ticket that are transverse to a direction of the feed path 900, axial to the feed path 900, and combinations thereof. Further, the spiral shapes of the scraper members 1130 may cause removed material to be moved out and away from the passing ticket. The opposing spirals of the scraper members 1130 may reduce net lateral forces acting on a passing ticket, e.g., the lateral outward force of one spiral shape is at least substantially balanced by the other, such that a risk and/or magnitude of force pushing the ticket to the side is reduced.

Figure 11D:
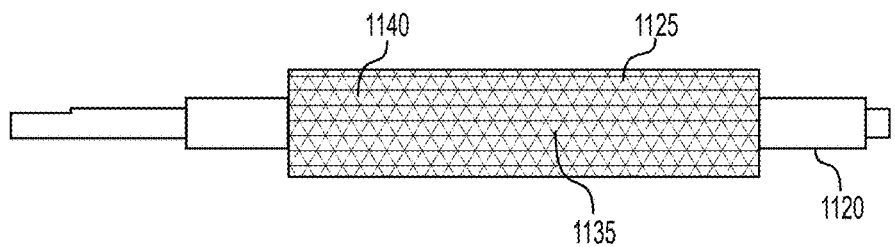
FIG. 11D depicts a top detail view of another exemplary embodiment of a scraper from the scratching assembly of FIGS. 11A and 11B.

FIG. 11D depicts a top detail view of another exemplary embodiment of the scraper 1120. As illustrated in FIG. 11D, in this embodiment, the scraper 1120 includes a cylinder 1125 that includes a knurled surface 1135 that extends around a circumference of the cylinder 1125. In some embodiments, the knurled surface 1135 is formed by a series of protuberances that are patterned both along an axial extent of the cylinder 1125 and along the circumference of the cylinder. In an example, each protuberance 1140 may have an at least partially pointed shape. In some embodiments, the knurled surface may have a knurl pitch that is larger than, e.g., two times, three times, five times, etc., a knurl depth. In an example, the knurl pitch may be about 1 millimeter, about 1.5 millimeters, about 2 millimeters, etc., and the knurl depth may be about 0.25 millimeters, 0.5 millimeters, 1 millimeter, etc. In some embodiments, the cylinder 1125 may be formed from or include a steel material such as a high-speed steel. In some embodiments, at least a portion of the cylinder 1125, e.g., the knurled surface 1135 may have been treated with a surface treatment, e.g., a hardening treatment. For instance, in some embodiments, the knurled surface may have been treated with a plasma nitride surface treatment, and may have a hardness of about 70 HRC.

Figure 11E:
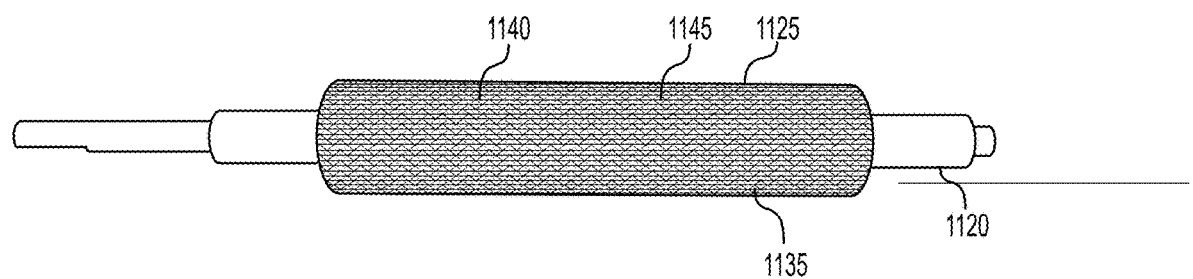
FIG. 11E depicts a top detail view of a further exemplary embodiment of a scraper from the scratching assembly of FIGS. 11A and 11B.

FIG. 11E depicts a top detail view of a further exemplary embodiment of the scraper 1120. As illustrated in FIG. 11D, in this embodiment, the knurled surface 1135 includes a series of protuberances 1145 arranged in a spiral pattern around the cylinder 1125. The spiral pattern enables the scraper 1120 to exert scraping forces on input media that are axial to the scraper 1120, transverse, and combinations thereof, which may improve efficiency of scraping relative to a unidirectional scraper. In the embodiment illustrated in FIG. 11D, each protuberance 1145 has a frustum-like shape with a rhomboid base. Such a shape may facilitate scraping away material while also inhibiting damaging of the underlying surface of the media. However, it should be understood that this shape is exemplary only, and that any suitable protuberance shape may be used.

Since each scratching mechanism 1100 includes a respective scraper 1120, the scraping of material (e.g., latex or the like) may be distributed amongst multiple scratching mechanism 1100, reducing the load on and/or pressure needed for operation of each individual scratching mechanism 1100, which may increase longevity of the scrapers 1120. In examples, the scraper members 1130 and/or the cylinder 1125 may include a metal (e.g., steel or the like).

Figure 12:
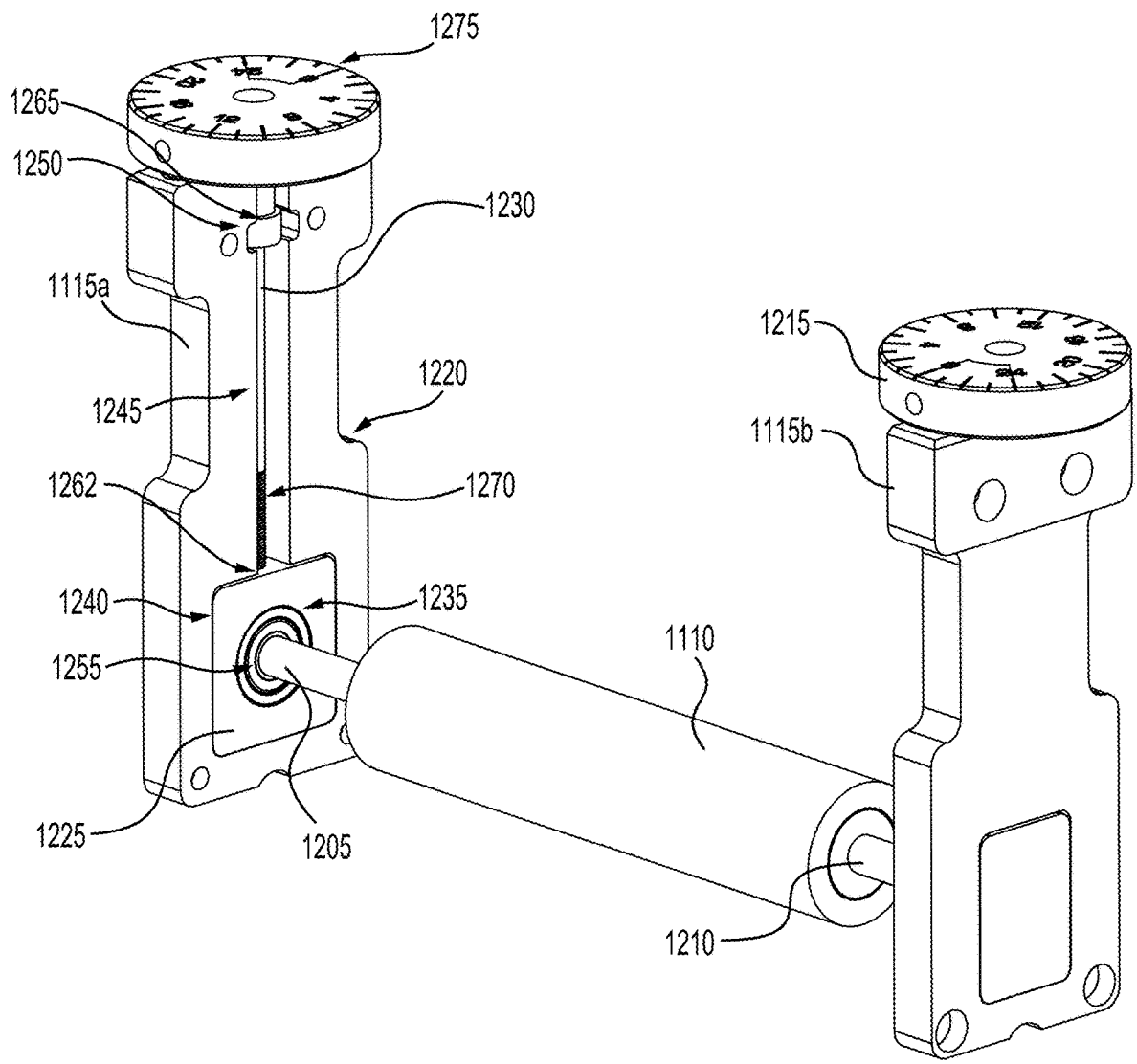
FIG. 12 depicts a perspective view of a pair of adjustment mechanisms of a scratching assembly, according to one or more embodiments.

FIG. 12 depicts a perspective view of a pair of adjustment mechanisms 1115 engaged with an adjustable roller 1110. As illustrated, the adjustable roller 1110 may include a first end 1205 operatively connected to a first adjustment mechanism 1115a, and a second end 1210 operatively connected to a second adjustment mechanism 1115b. In this embodiment, each of the pair of adjustment mechanisms is operable to independently adjust a height of the adjustable roller 1110 relative to the stationary roller 1105 (FIG. 11C), e.g., to adjust a pressure exerted on a ticket passing between the rollers 1105 and 1110. In some embodiments, the pair of adjustment mechanisms 1115 may be manually operable.

For example, in this embodiment, each adjustment mechanism 1115 includes a knob 1215, an adjustment block 1220, a mounting block 1225, a pin 1230, and a bearing 1235. The adjustment block 1220 includes a cavity 1240 configured to receive the mounting block 1225 and in communication with a channel 1245. The channel 1245 includes a slot 1250 proximate to a top portion of the adjustment block 1220. The mounting block 1225 includes a lateral hole 1255 and a threaded hole 1262. The lateral hole 1255 is located on a lateral side of the mounting block 1225, and is configured to receive the bearing 1235, which rotationally supports a respective end of the adjustable roller 1110. The threaded hole 1262 is located on a top surface of the mounting block 1225 facing the channel 1245.

In some embodiments, a shape of the mounting block 1225 is configured to key into a shape of the cavity 1240. For example, in some embodiments, the mounting block 1225 and adjustment block 1220 might include a complementary structure such as bevels or lips. Such a complementary fit, for example, may prevent or inhibit the mounting block 1225 from twisting, e.g., in response to a twisting action of the pin 1230 into or out of the mounting block as discussed in further detail below.

The pin 1230 is configured to be received in the channel 1245, with a top end 1265 of the pin 1230 having a complementary shape with and fitted into the slot 1250, such that the pin 1230 is vertically captive in the adjustment block 1220. The pin 1230 further includes a threaded end 1270 that is configured to be threaded into the threaded hole 1262. The knob 1215 is operationally engaged to the top end 1265 of the pin 1230.

In various embodiments, each of the knobs 1215 may be operable to independently adjust a height of a respective end of a corresponding adjustable roller 1110. In various implementations, each knob 1215 may include graduated markings 1275 corresponding to different adjustment positions.

Figure 13:
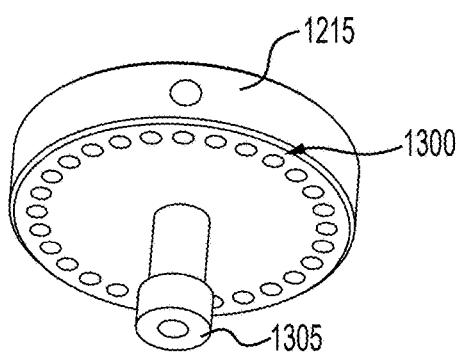
FIG. 13 depicts a perspective view of a knob of an adjustment mechanism of a scratching assembly, according to one or more embodiments.

FIG. 13 depicts a perspective view of a knob 1215. As illustrated, an underside of the knob 1215 includes a plurality of circumferentially distributed notches 1300 and a collar 1305 configured to receive the top end 1265 of the pin 1230.

Figure 14:
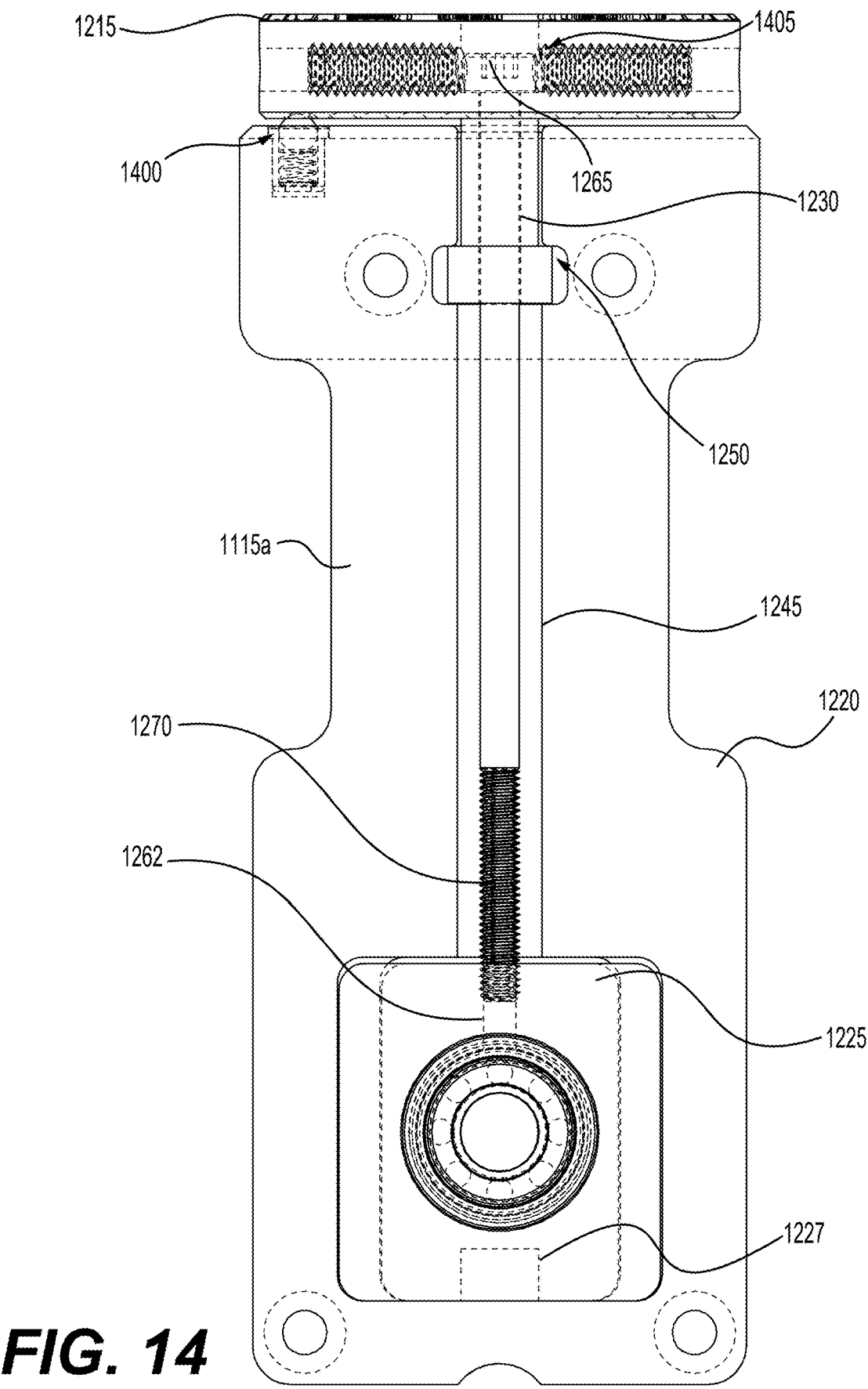
FIG. 14 depicts a cross-section view of an adjustment mechanism of a scratching assembly, according to one or more embodiments.

FIG. 14 depicts a cross-section view of the adjustment mechanism 1115a. As illustrated in FIG. 14, the adjustment mechanism 1115a further includes a spring plunger 1400 and one or more set screws 1405. The set screws 1405 may be configured to affix the knob 1215 to the top end 1265 of the pin 1230. The spring plunger 1400 may be positioned in a top surface of the adjustment block 1220 and radially aligned, relative to the pin 1230, with the circumferentially distributed notches 1300 (FIG. 13) in the knob 1215. The pin 1230 may be configured to rotate within the channel 1245, e.g., so that rotating the knob 1215 causes the pin 1230 to rotate as well.

As such, in embodiments, the configuration of the spring plunger 1400 with the knob 1215 enables the knob 1215 to "click" into position as each respective notch 1300 aligns with the spring plunger 1400, enabling the spring plunger 1400 to at least partially extend into the respective notch 1300. Further rotation of the knob 1215 counters a spring force of the spring plunger 1400, pushing the spring plunger 1400 out from the notch and enabling the knob 1215 to continue to turn. Thus, in some embodiments, turning the knob 1215 may be operable to incrementally adjust the height of the corresponding end of the adjustable roller 1110. In examples, the incremental adjustments may be precise, or may be according to incremental measurements (e.g., a 1-millimeter adjustment, or the like). In examples, one or more predetermined or user selected (e.g., "favorite") settings may be set or indicated for the knobs 1260, e.g., via the graduated markings 1275 (FIG. 12).

In some embodiments, the mounting block 1225 may include a bottom cavity 1227 configured to receive a spring (not shown) positioned at the adjustment block 1220. Such a spring may bias the mounting block 1225 toward the pin 1230, e.g., to facilitate the translation of rotation of the knob 1215 to vertical motion of the mounting block 1225 as discussed below.

As discussed above, turning the knob 1215 is configured to cause rotation of the pin 1230. Such rotation causes the threaded end 1270 to engage with the threaded hole 1262 of the mounting block 1225. Since the pin 1230 is vertically captive due to the slot 1250, and since the mounting block 1225 is held rotationally captive by the adjustment block 1220, the rotating of the pin 1230 engages the threaded connection between the threaded end 1270 and the threaded hole 1262, causing the mounting block 1225 to move vertically. Since the mounting block 1225 is configured to support an end of the adjustable roller 1110, the rotation of the knob 1215 is thus operable to adjust the height of the adjustable roller 1110, and thus the pressure to be exerted by the adjustable roller 1110 on input media.

Returning to FIG. 12, with a respective one of the pair of adjustment mechanisms 1115 on each end of each adjustable roller 1110, it is possible to independently adjust the height of each end of the adjustable roller 1110, and thus adjust a pressure profile along the axis of the pair of adjustment mechanisms 1115 that is applied to media fed through the scratching mechanism 1100. In various embodiments, varying pressure profiles may correspond to different scratching mechanisms. For example, in embodiments with multiple scratching mechanisms 1100 operating in series, each scratching mechanism 1100 may have a distinct pressure profile, such as to be operable to scrape different portions of an input media, e.g., with different scraper members 1130 or different amounts of pressure, etc.

Figure 15:
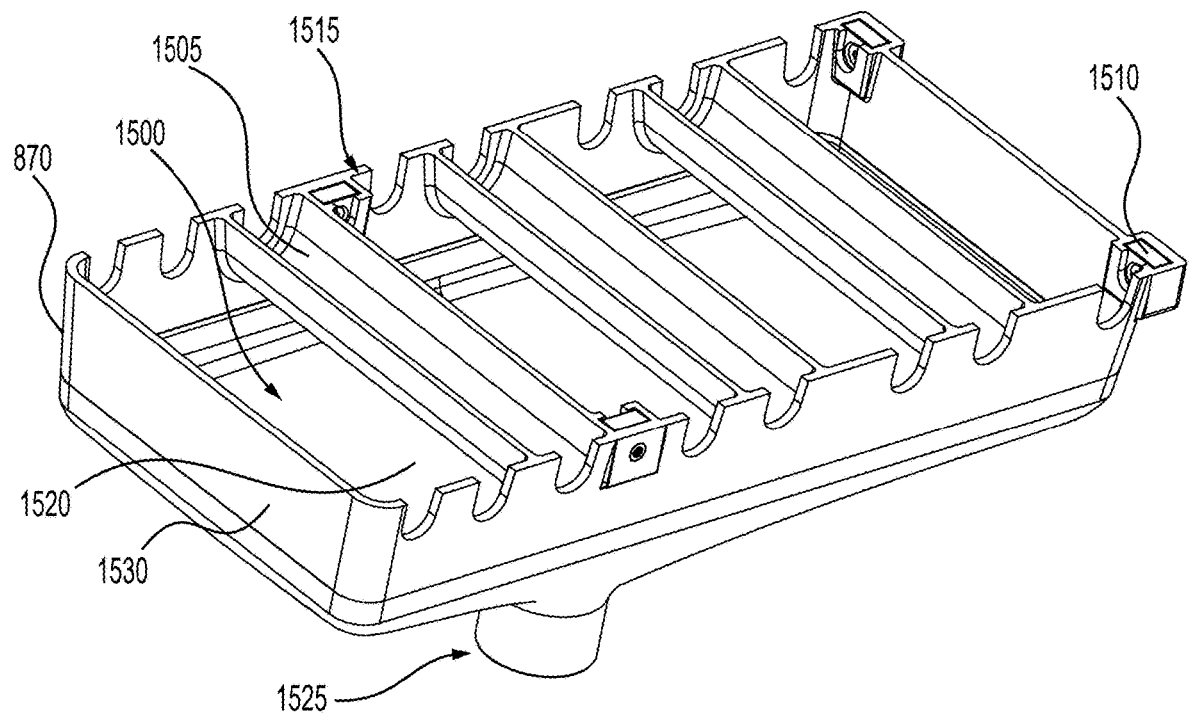
FIG. 15 depicts a perspective view of a vacuum manifold of a scratching system, according to one or more embodiments.

FIG. 15 depicts a perspective view of the vacuum manifold 870 from FIGS. 8A and 8B. In this embodiment, the vacuum manifold 870 includes a chamber 1500, one or more isolation members 1505, and one or more mounting members 1510.

The chamber 1500 includes an open end 1515, a bottom surface 1520, an aperture 1525, and at least one sidewall 1530. The open end 1515 is configured to operatively engage with a bottom surface of the bottom plate 952 of the feed assembly 860 (see FIG. 10B). For example, the open end 1515 may be configured to cooperate with one or more aperture 935 from the bottom plate 952 and/or other elements of the feed assembly 860, e.g., such that the chamber 1500 is configured to receive debris from the feed assembly 860. In some embodiments, the one or more aperture 935 exposes one or more of the brush 930 or the scraper member(s) 1130 of the feed assembly 860 to the chamber 1500.

The aperture 1525 may be positioned in the bottom surface 1520 of the chamber 1500. In some embodiments, the bottom surface 1520 has a concave shape, with the aperture 1525 located at a nadir of the bottom surface 1520. In this embodiment, the aperture 1525 is substantially vertically oriented. In some embodiments, the aperture 1525 is configured to receive a connection from a negative pressure source, e.g., a vacuum hose or the like, such that debris may be conveyed out from the scratching module 240. In embodiments, the at least one sidewall 1530 are configured to have a steep angle relative to the bottom surface 1520 and/or a smooth contour. Such a smooth and steep sidewall may facilitate directing debris ejected into the chamber down into the aperture 1525.

In some embodiments, the manifold 870 is configured to operatively engage with the bottom surface of the bottom plate 952 via a fastener-less connection. For example, in some embodiments, the mounting member 1510 may include at least one magnet positioned on a periphery of the open end 1515 of the chamber 1500. Such magnet(s) may be configured to removably mount the vacuum manifold 870 to the bottom surface of the bottom plate 952.

Each isolation member 1505 traverses across the open end 1515 of the chamber 1500, and is configured to isolate at least one portion of the feed assembly 860 from ejected debris and from the negative pressure source. For example, an isolation member 1505 may be configured to isolate a feed motor 910, a feed roller 565, or the like from debris and vacuum pressure. In the embodiment illustrated in FIG. 15, the isolation member 1505 includes a concave trough configured to fit around at least a portion of at least one feed roller 565.

Figure 16:
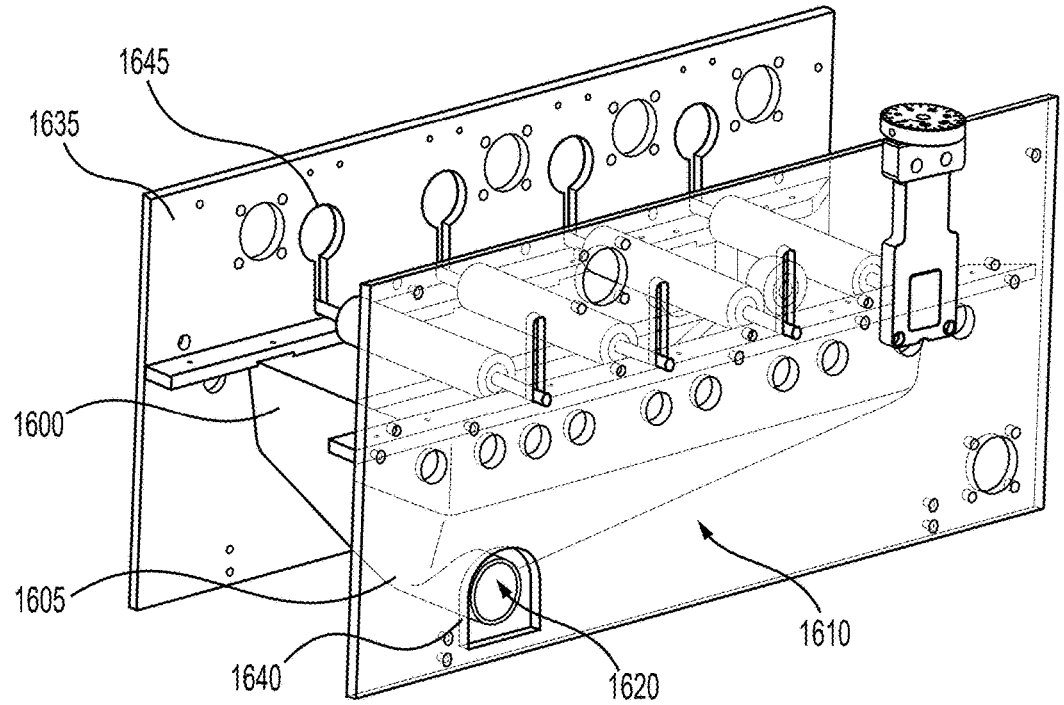
FIG. 16 depicts a perspective view of a vacuum manifold of a scratching system, according to one or more embodiments.

FIG. 16 depicts a perspective view of another embodiment of a vacuum manifold 1600. In this embodiment, the nadir 1605 of the bottom surface 1610 of the manifold 1600, and thus the aperture 1620, is located toward a downstream end 1625 of the vacuum manifold 1600. Such features may facilitate conveying debris down and into the aperture 1620. Further, in this embodiment, the aperture 1620 is substantially laterally oriented which, by being positioned at the nadir 1605, may facilitate evacuation of debris.

FIG. 16 additionally illustrates another embodiment of a housing 1635 for the scratching module 240. In this embodiment, the housing 1635 further includes one or more apertures, e.g., an aperture 1640 to provide access to the aperture 1620 of the manifold 1600, apertures 1645 to support the adjustment mechanisms 1115, route cable connections (not shown), etc.

Figure 17A:
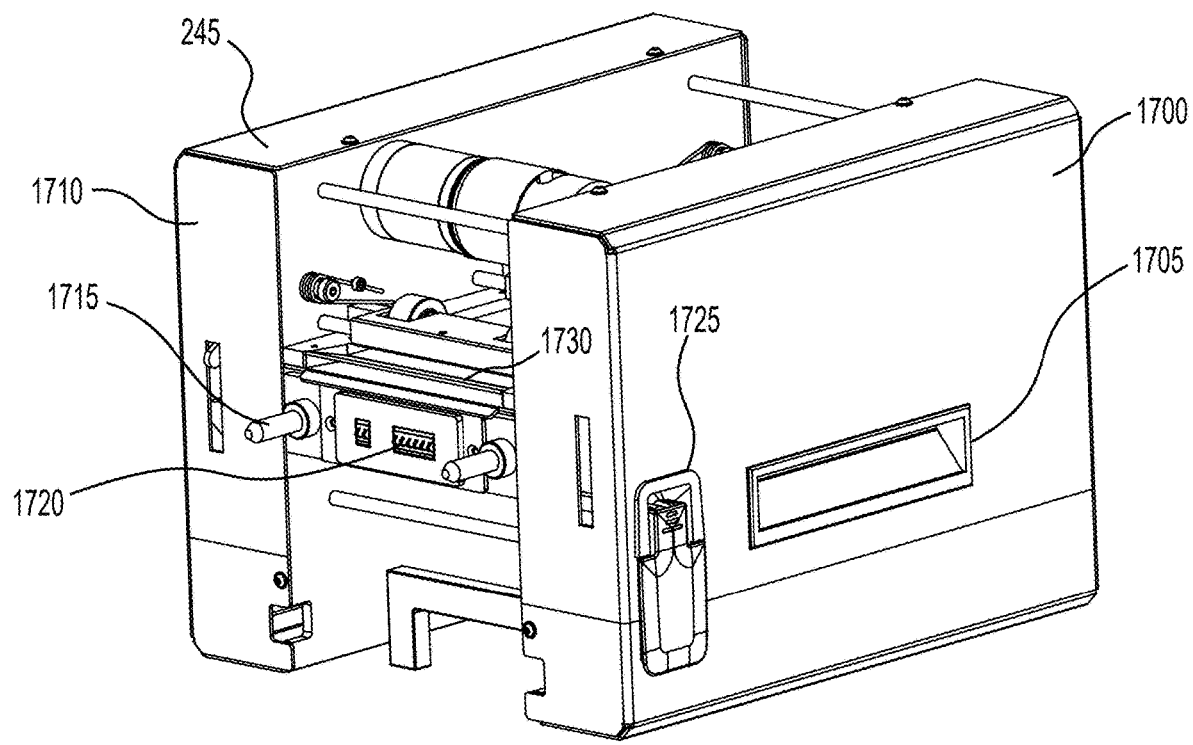
FIGS. 17A and 17B depict perspective and rear views, respectively, of an exit module of a scratching system, according to one or more embodiments.
Figure 17B:
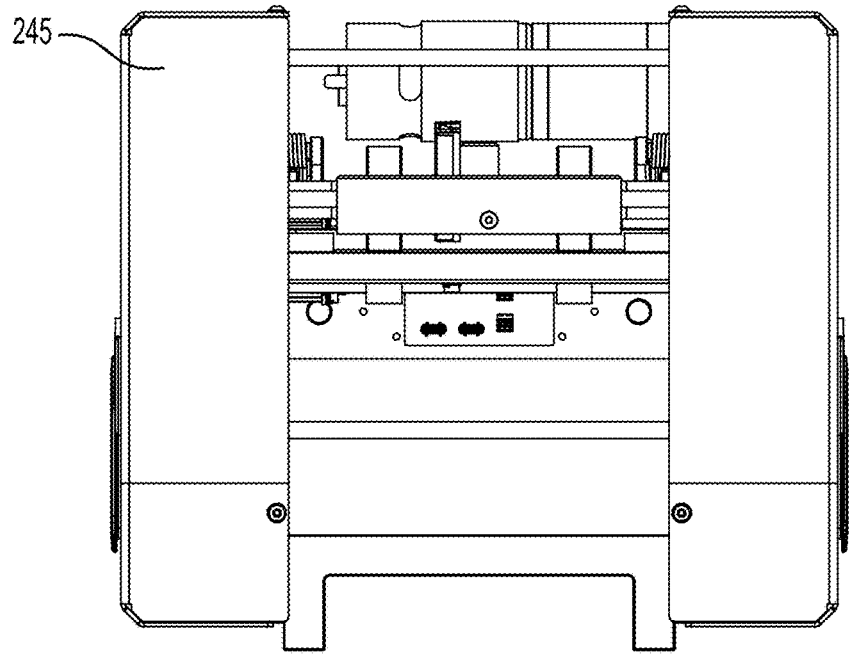

FIGS. 17A and 17B depict perspective and rear views, respectively of the exit module 245. As illustrated in FIG. 17A, the exit module includes a housing 1700 with a pair of handles 1705 on opposite sides. Further, an upstream end 1710 of the exit module 245 includes elements configured to cooperate with corresponding elements of the scratching module 240, e.g., alignment pins 1715, electronic contacts 1720, a locking mechanism 1725, etc. In embodiments, such elements have similar features as the corresponding elements in the scanning module 235. The perspective view of FIG. 17A also depicts a further inlet 1730 configured to receive media exiting the scratching module 240.

Figure 18:
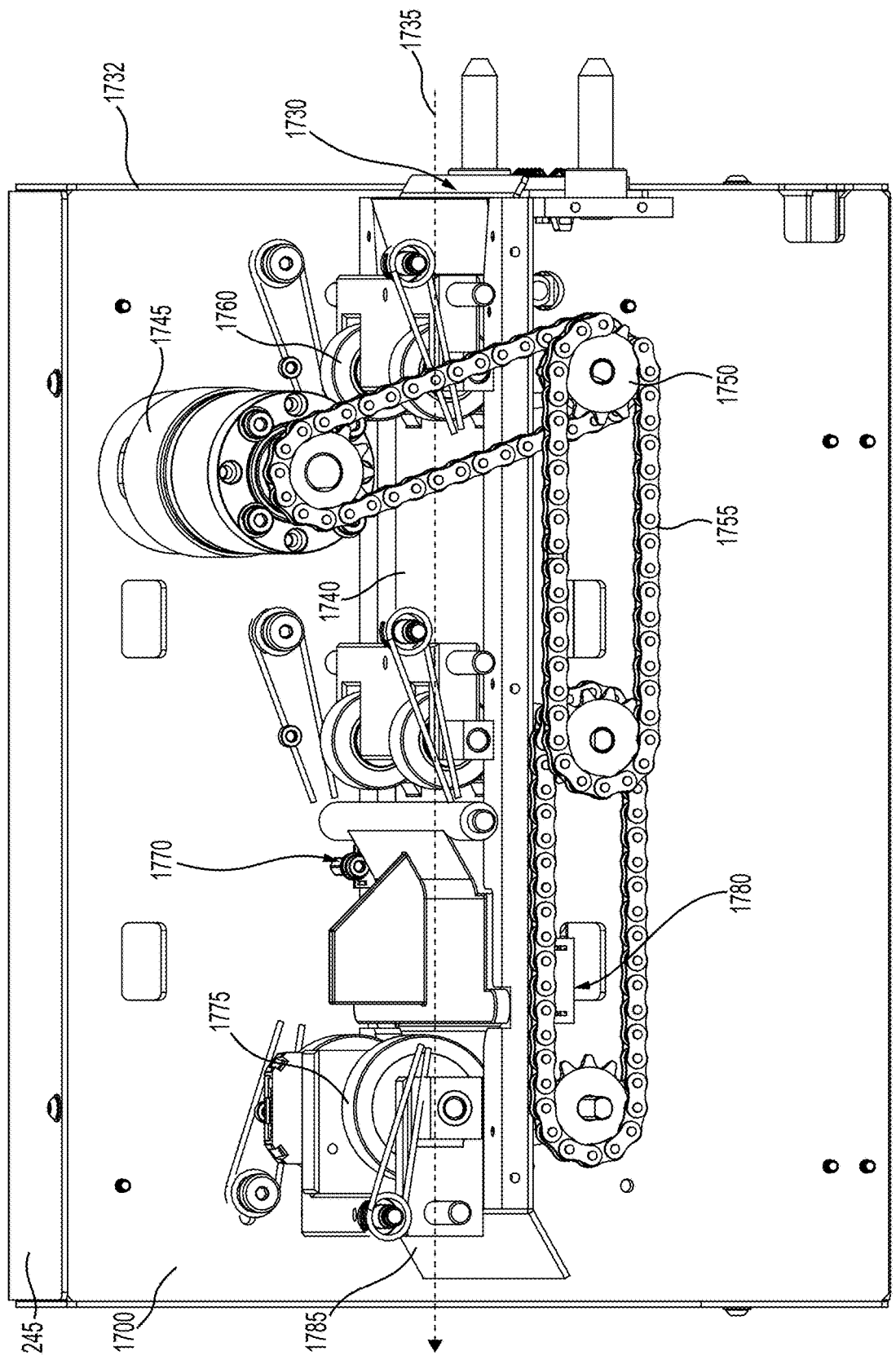
FIG. 18 depicts a side perspective view of the exit module of FIGS. 17A and 17B with a side panel of its housing removed to show an interior thereof, according to one or more embodiments.

FIG. 18 depicts a side perspective view of the exit module 245 with a side panel of the housing 1700 removed to show elements therein. Similar to the inlet 585 of the scanning module 235, the further inlet 1730 is located on an upstream edge 1732 of the exit module 245, and is formed by an angled mouth configured to guide an entering ticket into a portion of a feed path 1735 between a further pair of plates 1740.

Also similar to the scanning module 235, the exit module 245, as depicted in FIG. 18, further includes one or more feed motor 1745, one or more feed roller 1750, one or more drive belt or chain 1755, one or more idler roller 1760, one or more roller spring 1765, one or more presence sensor 1770, one or more further presence sensor 1775, and one or more scanner 1780. Such elements, in embodiments, have features similar to the corresponding elements of the scanning module 235.

In particular, the presence sensor 1770 may be a fork sensor, and the further presence sensor may be a rotary encoder configured to determine a conveyance speed of passing media, and transmit such conveyance speed to the scanner 1780. The scanner 1780 may be positioned so as to scan a scratched face of the media, e.g., on a bottom side of the feed path 1735. An exit ramp 1785 may be configured to deposit media exiting the exit module into a further element (not shown) such as a ticket bin or the like.

In the following method descriptions, certain acts may be described as performed by a particular device or element. However, it should be understood that such description is illustrative only, and that any suitable hardware and/or software may be used to execute the operations described herein. Moreover, while the methods below may be described as having certain steps in a certain order, it should be understood that such embodiments are exemplary only. In various embodiments, steps may be added, omitted, rearranged, or modified in any suitable manner consistent with this disclosure.

Figure 19:
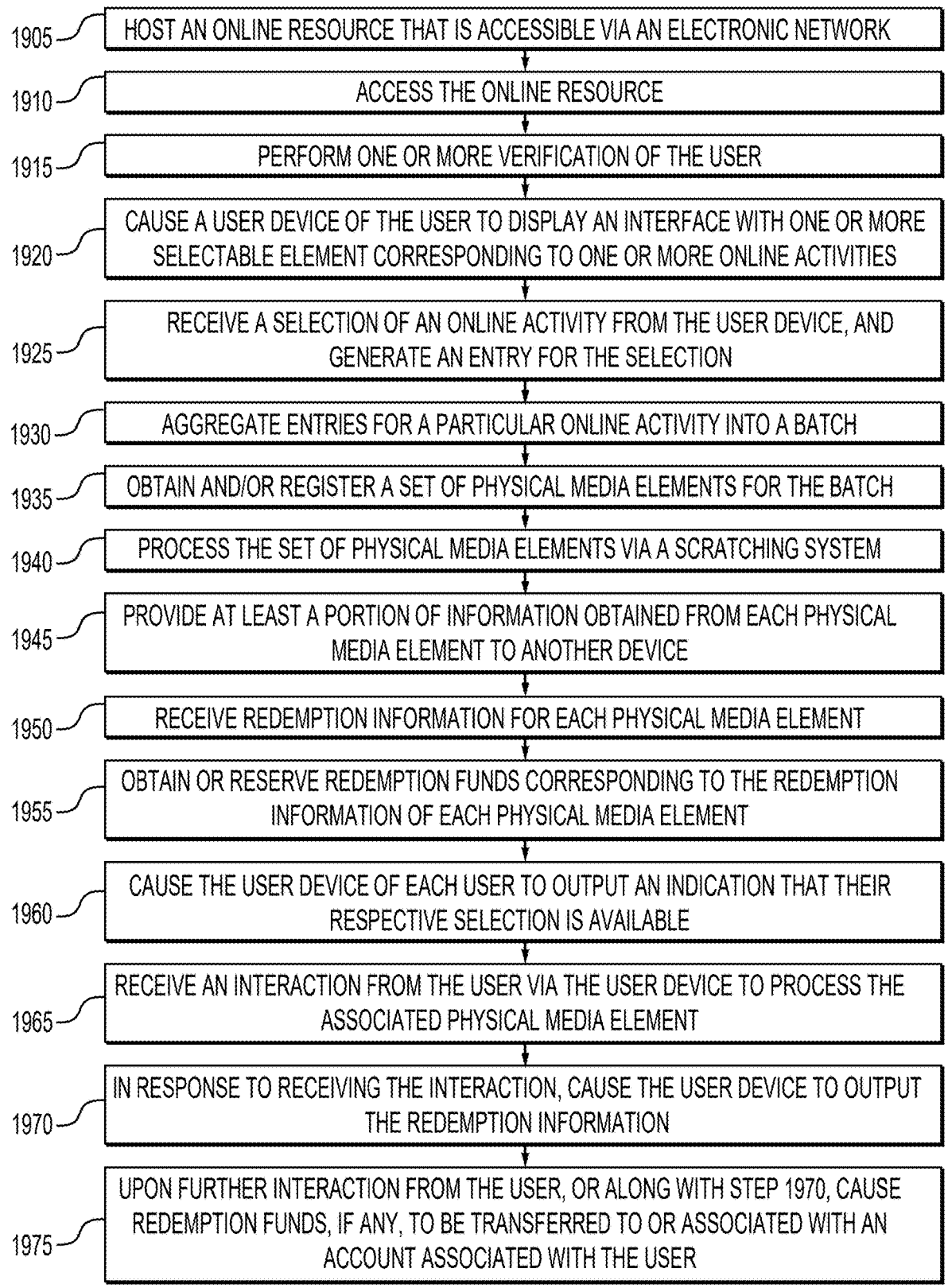
FIG. 19 depicts a flow diagram of an exemplary embodiment of a method of operating an online activity.

FIG. 19 depicts a flow diagram of an exemplary embodiment of a method of operating an online activity such as a game of chance. A provider 135 may desire to operate an online activity, such as a game of chance like a lottery. At step 1905, a provider 135, e.g., via a provider system 110 may host an online resource, e.g., a web application, platform, website, or the like that is accessible via an electronic network 125. At step 1910, a user 130, e.g., via a user device 105, may access the online resource, e.g., using a web browser, mobile application, or the like.

At step 1915, the provider system 110 may perform one or more verification of the user 130. For example, the provider system 110 may access user data, location data, historical data, or the like from the user device, a database of user information, a third party system 120, or the like, to verify one or more of an age of the user 130 (e.g., relative to a threshold age), a location of the user (e.g., relative to a geo-fenced participation region), a user account status of the user 130, a financial account status of the user 130, etc.

At step 1920, the online resource may cause the user device 105 to display an interface with one or more selectable element corresponding to one or more online activities. For example, the online resource may provide multiple different games of chance that the user 130 may select from. In some embodiments, the selectable elements made available on the user device 105 are based on the one or more verification. For example, a particular state lottery may only be available within a geo-fenced region corresponding to that state.

At step 1925, the online resource may receive a selection of an online activity such as a game of chance from the user device 105, and in response to receiving the selection, may generate an entry for the selection, e.g., with a status of "ORDERED" or the like.

At step 1930, the online resource may aggregate entries for a particular online activity, e.g., game of chance, into a batch, and may, for example, set the status of the aggregated entries to "BATCHED" or the like. In various embodiments, a batch may correspond to a predetermined number of entries, a sub-set of entries received over a predetermined period of time, from a predetermined region, from a predetermined number of user, or any other suitable criteria. In an example, the online resource may aggregate entries until a predetermined number have been collected or until a threshold period of time has passed, whichever occurs first.

At step 1935, a set of physical media elements, e.g., tickets, for the batch may be obtained and/or registered. For example, a set of tickets equal in number to the number of entries in the batch may be obtained. In some embodiments, identifying information for a first and last ticket in the set may be obtained, e.g., via a scanner or the like, in order to identify endpoints of the set, confirm a sufficient number of tickets are available for the set (e.g. by comparing ticket numbers), confirm that the tickets in the set all pertain to the selected activity, or the like. In some embodiments, images and/or identifiers or other information for each ticket in the set may be obtained. Such data may be matched to (e.g., associated with) a respective one of the entries.

At step 1940, the set may be processed by a scratching system 140. As noted above, in some embodiments, such processing, e.g., scratching, of the tickets may occur after a user 130 has selected (e.g., purchased) an entry in a game, but before an option for the user 130 to "scratch" their ticket has been provided by their user device 105. In one aspect, this order of operation may ensure that information regarding the scratched ticket is readily available, e.g., in real time or near-real time, when a request to scratch the ticket is actually received.

In some embodiments, processing the tickets via the scratching system 140 includes obtaining or re-obtaining identifier information or other information from each ticket during the processing, e.g., to facilitate tracking the status of the ticket. Such data may be matched with a corresponding entry, and may be compared against prior-obtained data, e.g., to check for consistency or identify anomalies. In some embodiments, the information obtained from each ticket may include information (e.g., an image, text, barcode, or any other suitable data) revealed via the processing.

At step 1945, at least a portion of the information from each physical media element may be provided to another device, e.g., a terminal system 115. For example, information revealed via the processing may be transmitted to the terminal system 115 in order to obtain redemption information for each ticket, e.g., whether each ticket is a winner and for how much.

At step 1950, redemption information for each physical media element may be received, g., from the terminal system 115 or another suitable device that may be in communication with the terminal system 115 such as the provider system 110 or the like. In some embodiments, the received redemption information may be associated with the corresponding entry/ticket. In some embodiments, the redemption information is obtained by scanning a physical printout from the terminal system 115 or the like. In some embodiments, the redemption information is obtained by capturing an image of visual output of the terminal system 115. In some embodiments, the redemption information is obtained via an electronic message or the like. In some embodiments, the redemption information may be stored, e.g., as an image. In some embodiments, the redemption information may be parsed, e.g., processed via object-character recognition, and stored as text or data or the like.

At step 1955, the online service or the like may obtain or reserve redemption funds corresponding to the redemption information of each physical media element.

At step 1960, the online service may cause the user device 105 of each user 130 to output an indication that their respective selection is available (e.g., "Ready to Scratch!").

At step 1965, the online service may receive an interaction from the user 130 via the user device 105, the interaction including a request to process, e.g., "scratch" the associated physical media element. In some embodiments, the interaction includes selection of a UI element, such as a "Scratch Now" button or the like. It should be understood that, in embodiments, during the time at which such a button is available to the user 130, the ticket may already have been processed, and the redemption information may already have been obtained and/or parsed.

At step 1970, in response to receiving the interaction, the online service may cause the user device to output the redemption information, e.g., reveal the result of the processing of the ticket. In an example, the user device 105 may be caused to output an image of a scratched portion of the ticket, a visual representation of the redemption information, the redemption funds, or the like.

At step 1975, upon further interaction from the user 130, e.g., via a "Redeem Now" button, or along with the response to the previous interaction, the online service may cause the redemption funds, if any, to be transferred to or associated with an account associated with the user 130.

Figure 20:
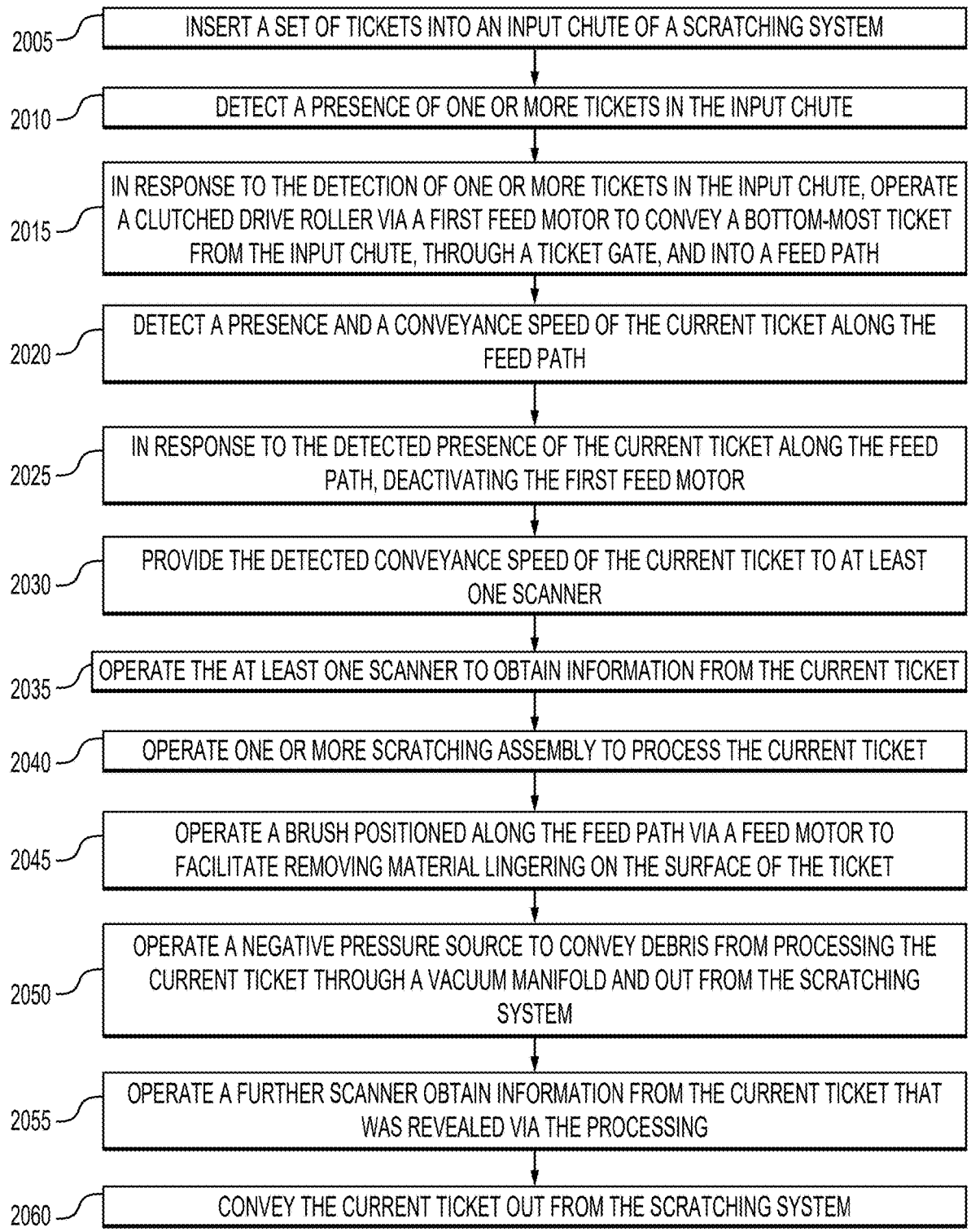
FIG. 20 depicts a flow diagram of an exemplary methodology for processing a set of media elements via a scratching system.

FIG. 20 depicts a flow diagram of an exemplary methodology for processing a set of tickets for a batch of entries via a scratching system 140. At step 2005, a set of tickets for a batch of entries may be inserted into an input chute 505.

At step 2010, a presence sensor 555 may detect a presence of one or more tickets in the input chute 505.

At step 2015, in response to the detection of one or more tickets in the input chute 505, a first feed motor 545 may operate a clutched drive roller 550 to convey a bottom-most ticket from the input chute 505, through a ticket gate 535 configured to limit flow to one ticket at a time, and into a feed path 510 defined by at least one pair of plates 580 that include one or more sets of apertures 590 that provide access to the feed path 510. In embodiments, at least one further feed motor 560 may operate one or more further drive roller 656 to continue conveyance of the ticket along the feed path 510. Such rollers 550, 656, etc., may be positioned to access the feed path via one or more of the apertures 540.

At step 2020, a speed sensor 610 may detect a presence and a conveyance speed of the ticket along the feed path 510.

At step 2025, in response to the detected presence of the ticket along the feed path 510, the first feed motor 545 may be deactivated, e.g., to prevent conveying a further ticket until the current ticket has cleared the entry into the feed path 510. A clutched roller 550 may enable the current ticket to finish exiting the input chute 505, e.g., via conveyance of the further feed motor 560, despite the halted operation of the first feed motor 545.

At step 2030, the detected conveyance speed of the ticket may be provided to at least one scanner 615.

At step 2035, the scanner 615 may be operated to obtain information from the current ticket. In embodiments, the scanner 615 may be operated with reference to the determined conveyance speed. Such information may include, for example, imaging of top and/or bottom surfaces of the ticket as it passes by. In some embodiments, the operation of the scanner 615 may be triggered in response to a presence detection of the ticket by one or more further presence sensors along the feed path 510, e.g., a fork sensor positioned proximate to and upstream of the scanner 615. In various embodiments, the scanner 615, presence sensors, etc. may be positioned to access the feed path via one of the apertures 540.

In some embodiments, the feed path 510 may include separate pairs of plates for various stages of processing, e.g., a first pair for removal from the input chute 505, a second pair for scanning the ticket, etc. Different presence sensors positioned at an upstream location of different pairs of plates may be used to control or operate feed motors associated with that pair of plates.

At step 2040, one or more scratching assembly 865 may operate to process the current ticket. In an example, one or more scratching assembly 865, e.g., positioned in series along the feed path 510, may be configured to scrape a layer of material off from the current ticket as it is conveyed past. An adjustable roller 1110 may be configured to press a passing ticket toward a stationary roller 1105 that includes a scraper 1120 or the like, whereby rotation of the stationary roller 1105 by a cutter motor 1117 may cause a scraper 1120 to scrape away material from a surface of the ticket. In some embodiments, a direction of rotation of the stationary roller 1105 may configured to be opposite to the rotation of the driver roller(s) 920 conveying the ticket along the feed path 510. In various embodiments, subsequent scraper mechanisms may scrape different portions of a ticket, and/or may re-scrape previous portions, e.g., to reduce a risk of missing material that is desirably scraped away. In some embodiments, the scraper 1120 may include, for example, one or more knurled scraper members 1130 coiled around a cylinder 1125, e.g., so that transverse force, lateral force, and combinations thereof are applied to scrape material off a passing ticket.

At step 2045, a brush 930 positioned along the feed path 510 may be operated, e.g., via a feed motor 910 or the like, to facilitate removing material lingering on the surface of the ticket.

At step 2050, a negative pressure source may be operated to convey debris from scraping the ticket through a vacuum manifold 870 and out from the scratching system 140.

At step 2055, a further scanner 1780 may be operated, e.g., in response to detection of the ticket by a further presence sensor 1770, to obtain information from the ticket that was revealed via the processing.

At step 2060, the current ticket may be conveyed out from the scratching system 140, e.g., via an exit ramp 1785.

Figure 21:
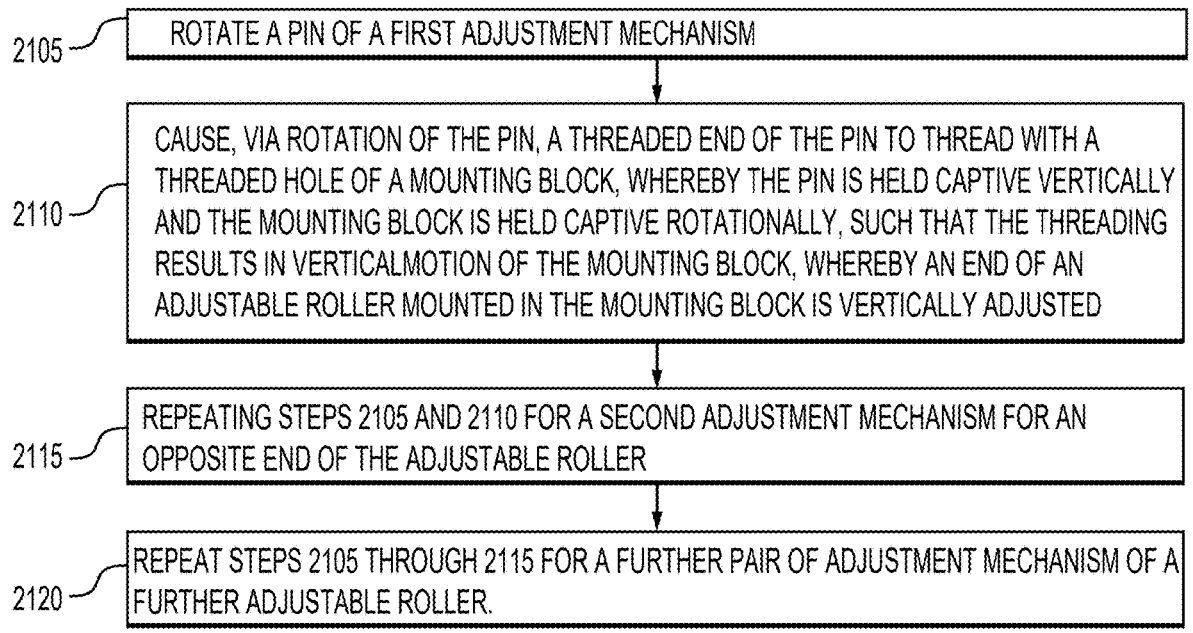
FIG. 21 depicts a flow diagram of an exemplary methodology 2100 for adjusting a pressure profile of a scratching assembly of a scratching system.

FIG. 21 depicts a flow diagram of an exemplary methodology for adjusting a pressure profile of an adjustable roller 1110 for exerting pressure on input media as the media passes between the adjustable roller 1110 and a stationary roller 1105. At step 2105, a pin 1230 of a first adjustment mechanism 1115a may be rotated. In some embodiments, such rotation may be achieved by rotating a knob 1215 affixed to a top of the pin 1230. In some embodiments, the knob is configured to provide discrete increments of rotation, e.g., to make discrete adjustments in the height of, and thus pressure exerted by the adjustable roller 1110.

As step 2110, the rotation of the pin 1230 may cause a threaded end 1270 of the pin 1230 to thread into or out from, accordingly, a threaded hole 1262 of a mounting block 1225. The pin 1230 may be held captive vertically, and the mounting block 1225 may be held captive rotationally, e.g., by an adjustment block 1220 housing the pin 1230 and the mounting block 1225, such that the rotation of threading of the pin 1230 with the threaded hole 1262 causes a corresponding vertical motion of the mounting block 1225. An end of the adjustable roller 1110 may be mounted on the mounting block 1225, such that the vertical motion of the mounting block 1225 results in vertical adjustment of the end of the adjustable roller.

As step 2115, the process above may be repeated for a second adjustment mechanism 1115b, e.g., to adjust the opposite end of the adjustable roller 1110.

At step 2120, the process above may be repeated for a further pair of adjustment mechanisms.

In some embodiments, the pin 1230 may be operatively connected to an electronically controlled actuator or the like. For example, in some embodiments, one or more cutter motor 1117 may transmit operating condition data to a controller portion 875, e.g., voltage, speed, temperature, etc. The controller portion 875 may operate such an electronically controlled actuator to adjust the pressure of one or more ends of the adjustable roller 1110, e.g., to even out a load or wear on the cutter motors 1117, regulate operation of the cutter motor(s) 1117, etc. In some embodiments, the controller portion 875 may operate the electronically controlled actuator to adjust the adjustable roller 1110 so as to be configured for operation for a particular type of input media. In other words, media of different thicknesses, materials, scratchable portions, etc., may correspond to different settings of the adjustment mechanism(s) 1115, e.g., that may be preset and/or selected via the interface 840.

In an exemplary embodiment, a resistance (e.g., current) on each cutter motor 1117 may be measured in real time. Such readings or measurements may be displayed in real time on the display 842. Further, notification messages may be transmitted (e.g., pushed) to a further device (e.g., of an operator or the like. The readings may be displayed as a graph, in an example. In other examples, the indicator 846 may turn on or off indicating that a resistance measurement is too low or too high relative to a predetermined threshold or relative to other cutter motors 1117. In some embodiments, a machine-learning model or the like may be used to adjust the operation of the cutter motors 117 and or adjustment mechanisms 1115. For example, such a model may be trained to learn how the cutter motors 1117 are worn over time, how the load or load balance across multiple cutter motors 1117 or scraper 1120 affects the accuracy, completeness, or efficiency of scratching tickets, or the like. Such a trained model may thus be operated to optimize and/or control for such factors.

It should be understood that the examples above are illustrative only, and that various embodiments may omit certain features of an embodiment, combine features from multiple embodiments, and/or include modifications of one or more features from one or more embodiments. In an example, a scratching mechanism may be formed as a unitary device rather than a device formed from a plurality of separable modules. In another example, fewer or additional scanners, scrapers, adjustment mechanisms, feed motors, drive rollers, etc., may be included in various embodiments. In some embodiments, the scratching mechanism may be isolated from an electronic network. In some embodiments, the controller portion of the scratching mechanism may be remotely hosted and/or may cooperate with a remote device for operation.

In general, any process or operation discussed in this disclosure that is understood to be computer-implementable may be performed by one or more processors of a computer system, such any of the systems or devices in the computing environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 22:
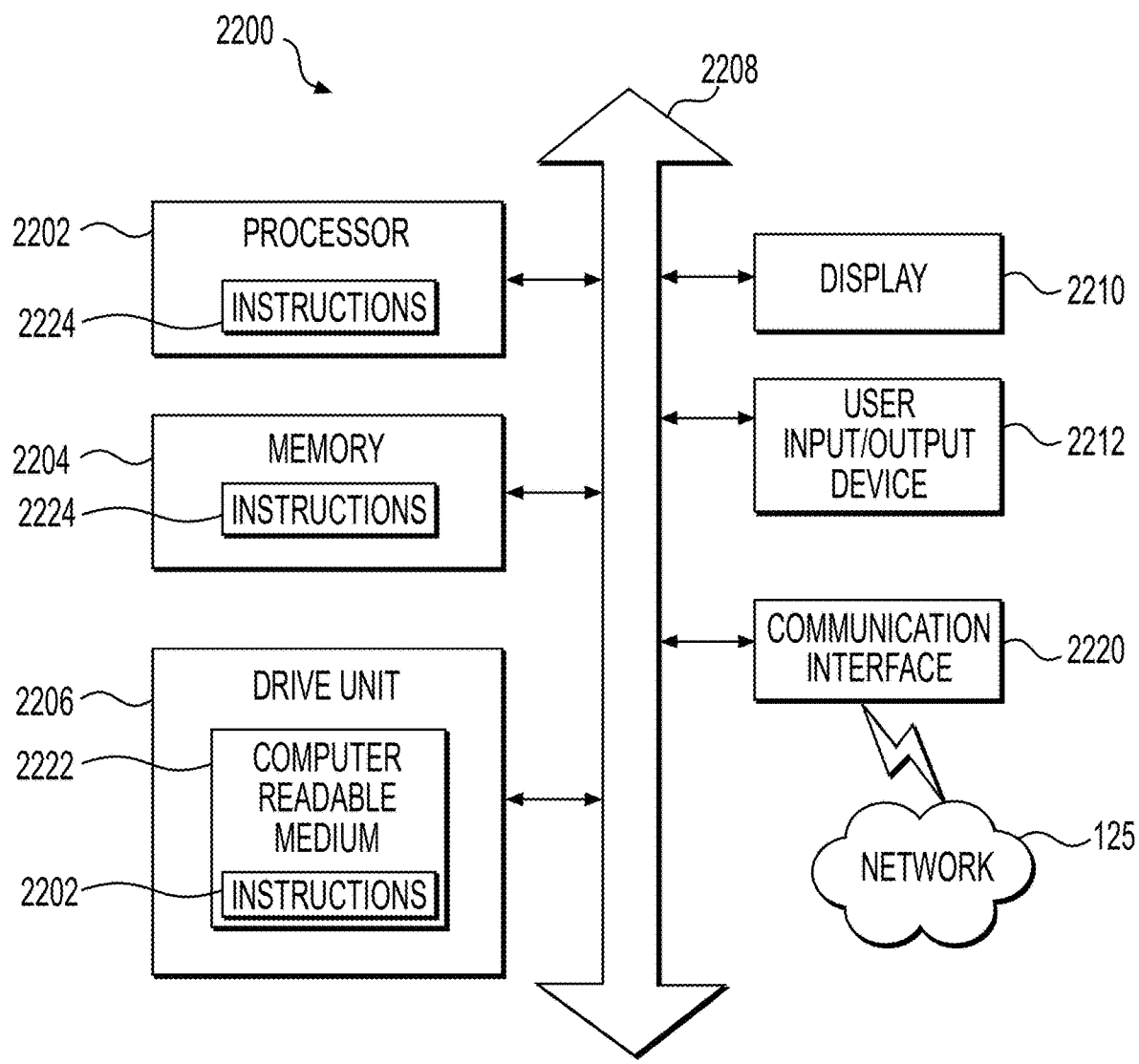
FIG. 22 depicts a functional block diagram of a computer, according to one or more embodiments.

FIG. 22 is a simplified functional block diagram of a computer 2200 that may be configured as a device for executing methods according to exemplary embodiments of the present disclosure, e.g., as the provider system 110, the scratching system 140 or the controller portion 875 thereof, or the like, or combinations thereof according to exemplary embodiments of the present disclosure. In various embodiments, any of the systems herein may be an assembly of hardware including, for example, a data communication interface 2220 for packet data communication. The computer 2100 also may include a central processing unit ("CPU") or processor 2202, in the form of one or more processors, for executing program instructions. The computer 2200 may include an internal communication bus 2108, and a storage unit 2206 (such as ROM, HDD, SDD, etc.) that may store data on a computer readable medium 2222, although the computer 2200 may receive programming and data via network communications. The computer 2200 may also have a memory 2204 (such as RAM) storing instructions 2224 for executing techniques presented herein, although the instructions 2224 may be stored temporarily or permanently within other modules of computer 2200 (e.g., processor 2202 and/or computer readable medium 2222). The computer 2200 also may include input and output ports 2212 and/or a display 2210 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Further aspects of various embodiments according to this disclosure may be appreciated through the following clauses.

Clause 1. An adjustable roller system comprising: a first adjustment mechanism; a second adjustment mechanism; and an adjustable roller, including: a first end operatively connected to the first adjustment mechanism; and a second end operatively connected to the second adjustment mechanism; wherein: the first adjustment mechanism is operable to independently adjust a first height of the first end of the adjustable roller; and the second adjustment mechanism is operable to independently adjust a second height of the second end of the adjustable roller.

Clause 2. The adjustable roller system of clause 1, further comprising: a stationary roller including a scraper, wherein:

the adjustable roller is operatively engaged with the stationary roller and configured to press an input media against the scraper; the first adjustment mechanism is configured to adjust a first pressure applied by the adjustable roller to the input media; and the second adjustment mechanism is configured to adjust a second pressure applied by the adjustable roller to the input media.

Clause 3. The adjustable roller system of clause 2, wherein the scraper is configured to scrape a layer of material disposed on a surface of the input media.

Clause 4. The adjustable roller system of clause 2, wherein each of the first and second adjustment mechanisms is configured to be automatically operated based on feedback from one or more motor driving the stationary roller.

Clause 5. The adjustable roller system of clause 1, wherein each of the first and second adjustment mechanisms includes: a rotating member; a vertically movable member; and a stationary member configured to convert rotation of the rotating member into vertical motion of the vertically movable member.

Clause 6. The adjustable roller system of clause 1, wherein each of the first and second adjustment mechanisms includes: an adjustment block having a cavity, a slot, and a vertical channel extending from the slot to the cavity; a mounting block received in the cavity such that rotation of the mounting block is inhibited by the adjustment block, the mounting block configured to rotationally support a respective end of the adjustable roller; and a pin positioned in the vertical channel and engaged with the mounting block via a threaded connection, a top portion of the pin keyed into the slot of the adjustment block so that the pin is held vertically captive in the adjustment block, such that the threaded connection between the pin and the mounting block is configured to translate rotation of the pin into vertical motion of the mounting block to adjust a height of the respective end of the adjustable roller.

Clause 7. The adjustable roller system of clause 6, wherein each of the first and second adjustment mechanisms includes: a knob, a bottom surface of the knob having a plurality of circumferentially distributed notches, and a center of the bottom surface affixed to a top of the pin; and a spring plunger positioned on the adjustment block facing toward the bottom surface of the knob and configured to releasably engage a respective one of the plurality of circumferentially distributed notches as the knob is rotated so as to align the spring plunger with the respective notch, each notch corresponding to an incremental adjustment in height for a respective end of the adjustable roller.

Clause 8. The adjustable roller system of clause 1, wherein each of the first and second adjustment mechanisms is configured to be manually operated.

Clause 9. An adjustment mechanism for independently adjusting a height of at least one end of an adjustable roller, comprising: an adjustment block including a cavity, a slot, and a vertical channel extending from the slot to the cavity; a mounting block received in the cavity such that rotation of the mounting block is inhibited by the adjustment block, the mounting block including a mount configured to rotationally support a respective end of the adjustable roller; and a pin positioned in the vertical channel and engaged with the mounting block via a threaded connection, the adjustment block configured to hold the pin vertically captive in the vertical channel, such that the threaded connection between the pin and the mounting block is configured to translate rotation of the pin into vertical motion of the mounting block to adjust a height of the mount for supporting the respective end of the adjustable roller.

Clause 10. The adjustment mechanism of clause 9, wherein each of the adjustment mechanisms is configured to be manually operated.

Clause 11. The adjustment mechanism of clause 10, further comprising: a knob, a bottom surface of the knob having a plurality of circumferentially distributed notches, and a center of the bottom surface affixed to a top of the pin; and a spring plunger positioned on the adjustment block facing toward the bottom surface of the knob and configured to releasably engage a respective one of the plurality of circumferentially distributed notches as the knob is rotated so as to align the spring plunger with the respective notch.

Clause 12. The adjustment mechanism of clause 11, wherein each notch corresponds to an incremental adjustment in height for a respective end of the mount.

Clause 13. The adjustment mechanism of clause 9, further comprising: an actuator operable to drive rotation of the pin; and a controller configured to operate the actuator based on feedback from one or more motor.

Clause 14. The adjustment mechanism of clause 9, wherein the mount includes a rotational bearing configured to receive an end of the adjustable roller.

Clause 15. The adjustment mechanism of clause 9, further comprising: a spring disposed in the cavity and configured to bias the mounting block towards the vertical channel.

Clause 16. A scraper system for scraping an input media, the scraper system comprising: two or more adjustable roller mechanisms operatively connected in series, each adjustable roller mechanism respectively including: a stationary roller including a scraper; a first adjustment mechanism; a second adjustment mechanism; and an adjustable roller operatively engaged with the stationary roller and configured to press an input media against the scraper, the adjustable roller including: a first end operatively connected to the first adjustment mechanism; and a second end operatively connected to the second adjustment mechanism; wherein: the first adjustment mechanism is operable to independently adjust a first height of the first end of the adjustable roller relative to a first end of the stationary roller, thereby adjusting a first pressure applied by the adjustable roller to the input media; and the second adjustment mechanism is operable to independently adjust a second height of the second end of the adjustable roller relative to a second end of the stationary roller, thereby adjusting a second pressure applied by the adjustable roller to the input media.

Clause 17. The scraper system of clause 16, wherein each scraper of the two or more adjustable roller mechanisms is configured to scrape one or more layers of material disposed on different portions of a surface of the input media.

Clause 18. The scraper system of clause 16, wherein the two or more adjustable roller mechanisms includes three adjustable roller mechanisms.

Clause 19. The scraper system of clause 16, further comprising: a roller brush positioned downstream of the two or more adjustable roller mechanisms.

Clause 20. The scraper system of clause 16, wherein each adjustment mechanism further respectively includes: a rotating member; a vertically movable member configured to rotationally support a respective end of the adjustable roller; and a stationary member configured to convert rotation of the rotating member into vertical motion of the vertically movable member.

Clause 21. A ticket tracking system for tracking tickets conveyed by a ticket-processing device, comprising: an encoder roller configured to rotate with a ticket as the ticket is conveyed past the encoder roller, and to determine a conveyance speed of the ticket based on a rotational speed of the rotation of the encoder roller; and at least one scanner configured to scan a surface of the ticket, as the ticket is conveyed past the at least one scanner, at a rate based on the determined conveyance speed of the ticket.

Clause 22. The ticket tracking system of clause 21, wherein: at least a first scanner of the at least one scanner is positioned upstream of a processing region for processing the ticket by the ticket-processing device; and at least a second scanner of the at least one scanner is positioned downstream of the processing region.

Clause 23. The ticket tracking system of clause 22, wherein: the first scanner and a third scanner are positioned upstream of the processing region; and the first and third scanners are configured to scan opposite surfaces of the ticket.

Clause 24. The ticket tracking system of clause 21, wherein the at least one scanner includes at least one barcode scanner.

Clause 25. The ticket tracking system of clause 21, further comprising: at least one fork sensor positioned along a path of the conveyance of the ticket in the ticket-processing device; wherein the at least one scanner is configured to activate based on a detection of a presence of the ticket by the at least one fork sensor.

Clause 26. The ticket tracking system of clause 21, further comprising: a further encoder roller, wherein: the encoder roller is positioned upstream of a processing region for processing the ticket by the ticket-processing device; and the further encoder roller is positioned downstream of the processing region.

Clause 27. The ticket tracking system of clause 21, further comprising: a memory operatively connected to the at least one scanner and configured to store scan data generated by the at least one scanner.

Clause 28. The ticket tracking system of clause 21, further comprising: a communication component configured to transmit scan data from the at least one scanner to a computer system.

Clause 29. A computer-implemented method of tracking a ticket conveyed by a ticket-processing device, comprising: determining, via an encoder roller, a conveyance speed of the ticket based on a rotational speed of the encoder roller, the encoder roller configured to rotate as a ticket is conveyed past the encoder roller; and operating at least one scanner to scan a surface of the ticket as the ticket is conveyed past the at least one scanner at a rate based on the determined conveyance speed of the ticket.

Clause 30. The computer-implemented method of clause 29, wherein: at least a first scanner of the at least one scanner is operated to scan the surface of the ticket prior to a processing of the ticket by the ticket-processing device; and at least a second scanner of the at least one scanner is operated to scan the surface after the processing of the ticket.

Clause 31. The computer-implemented method of clause 30, wherein: a third scanner is operated to scan the ticket prior to the processing of the ticket; and the first and third scanners are configured to scan opposite surfaces of the ticket.

Clause 32. The computer-implemented method of clause 29, wherein the at least one scanner includes at least one barcode scanner.

Clause 33. The computer-implemented method of clause 29, wherein the at least one scanner is operated in response to detection, via at least one fork sensor positioned along a path of the conveyance of the ticket in the ticket-processing device, of a presence of the ticket.

Clause 34. A ticket-processing device, comprising: an encoder roller configured to rotate with a ticket as the ticket is conveyed past the encoder roller, and to determine a conveyance speed of the ticket based on a rotational speed of the rotation of the encoder roller; and at least one scanner configured to scan a surface of the ticket, as the ticket is conveyed past the at least one scanner, at a rate based on the determined conveyance speed of the ticket.

Clause 35. The ticket-processing device of clause 34, further comprising: a ticket processing assembly, wherein: at least a first scanner of the at least one scanner is positioned upstream of the ticket processing assembly; and at least a second scanner of the at least one scanner is positioned downstream of the ticket processing assembly.

Clause 36. The ticket-processing device of clause 35, wherein: the first scanner and a third scanner are positioned upstream of the ticket processing assembly; and the first and third scanners are configured to scan opposite surfaces of the ticket.

Clause 37. The ticket-processing device of clause 34, further comprising: at least one fork sensor positioned along a path of the conveyance of the ticket in the ticket-processing device; wherein the at least one scanner is configured to activate based on a detection of a presence of the ticket by the at least one fork sensor.

Clause 38. The ticket-processing device of clause 35, further comprising: a further encoder roller, wherein: the encoder roller is positioned upstream of the ticket processing assembly; and the further encoder roller is positioned downstream of the ticket processing assembly.

Clause 39. The ticket-processing device of clause 34, further comprising: a memory operatively connected to the at least one scanner and configured to store scan data generated by the at least one scanner.

Clause 40. The ticket-processing device of clause 34, further comprising: a communication component configured to transmit scan data from the at least one scanner to a computer system.

Clause 41. A scraper system, comprising: a first module that includes a roller scraper mechanism configured to process media items; a second module that is configured to receive a batch of the media items and serially convey the media items to the first module; and a third module configured to receive processed media items from the first module; wherein the second and third modules are removably connected to the first module.

Clause 42. The scraper system of clause 41, wherein: the second module and the third module each include one or more alignment pins; and the first module includes: one or more alignment hole configured to receive the one or more alignment pins of the second module; and one or more second alignment hole configured to receive the one or more alignment pins of the third module.

Clause 43. The scraper system of clause 41, wherein: each of the second module and the third module includes a communication pin set; the first module includes a first communication pin set and a second communication pin set; and the first communication pin set and the second communication pin set are configured to form contact-based communication pairs with the communication pin sets of the second module and the third module, respectively, wherein, with the second and third modules removably connected to the first module, the contact-based communication pairs are configured to enable data transmission between adjacent modules.

Clause 44. The scraper system of clause 41, wherein each of the second module and the third module includes at least one locking mechanism; wherein the first module includes at least one first locking structure configured to operatively engage with the at least one locking mechanism of the second module, and at least one second locking structure configured to operatively engage with the at least one locking mechanism of the third module, and wherein the at least one locking mechanisms of the second and third modules are configured to releasably affix the second and third modules to the first module, respectively.

Clause 45. The scraper system of clause 44, wherein the locking mechanism of each of the second and third module includes one or more latch assembly including a latch, a handle, and a mount.

Clause 46. The scraper system of clause 45, wherein the latch is operatively connected to the handle such that the latch is configured to move between a locked position and an unlocked position in which the latch is at least partially rotated in toward the first module.

Clause 47. The scraper system of clause 45, wherein the first and second locking structures of the first module include keyways shaped such that the latch of the second and third modules is configured to latch onto one of the respective keyways in a closed position.

Clause 48. The scraper system of clause 45, wherein: the at least one locking mechanism of the second module is configured to move between a locked position and an unlocked position, and the at least one locking mechanism of the second module and the first locking structure of the first module are configured such that moving the locking mechanism toward the locked position draws the first module and the second module toward each other.

Clause 49. The scraper system of clause 45, wherein: the at least one locking mechanism of the third module is configured to move between a locked position and an unlocked position, and the at least one locking mechanism of the third module and the first locking structure of the first module are configured such that moving the locking mechanism toward the locked position draws the first module and the third module toward each other.

Clause 50. The scraper system of clause 41, wherein the first, second, and third modules each include a respective portion of a feed path for processing input media that, with the modules connected together, are aligned with each other.

Clause 51. A system for processing physical media representing entries into a game of chance, the system comprising: a plurality of modules aligned to convey a physical media therethrough, the plurality of modules including: at least one module configured to remove a first physical media from a set of one or more physical media in an input area, at least one module configured to remove material from the physical media using a scratching assembly, and at least one module configured to capture information revealed by removing material from the physical media.

Clause 52. The system of clause 51 wherein the plurality of modules are further configured to share power and/or data between the modules.

Clause 53. The system of clause 51, wherein the modules are configured to releasably lock to one another using one or more locking mechanisms.

Clause 54. The system of clause 51, wherein the modules are configured to align with one another such that an inlet of a feed path of an upstream module is aligned with an outlet of a feed path of the module immediately downstream.

Clause 55. A system for obtaining evaluation information on a ticket for a game of chance, the system including: an input module configured to remove a single ticket from an input area; a scratching module configured to remove a layer of material from the single ticket, the scratching module being downstream of the input module and configured to receive a ticket from the input module; and a scanning module configured to scan information on the ticket revealed by the scratching module, the scanning module being downstream of the scratching module and configured to receive a ticket from the scratching module, wherein each module further comprises a motor operatively connected to at least one roller for conveying a ticket through a feed path of the respective module.

Clause 56. The system of clause 55, wherein: the scratching module includes a first inlet having an angled mouth leading into a feed path, the first inlet configured to funnel the conveyed ticket from the input module into the scratching module, and the scanning module includes a second inlet having an angled mouth leading into a feed path, the second inlet configured to funnel the conveyed ticket from the scratching module into the scanning module.

Clause 57. The system of clause 55, wherein one of the input module and the scratching module includes a locking mechanism operable to fix the input module to the scratching module, and wherein one of the scanning module and the scratching module includes a locking mechanism operable to fix the scanning module to the scratching module.

Clause 58. The system of clause 55, wherein one of the input module and the scratching module includes an alignment pin for engagement with an alignment hole, wherein the alignment pin and the alignment hole align an outlet of the feed path of the input module with an inlet of the feed path of the scratching module.

Clause 59. The system of clause 55, wherein one of the scanning module and the scratching module includes an alignment pin for engagement with an alignment hole, wherein the alignment pin and the alignment hole align an outlet of the feed path of the scratching module with an inlet of the feed path of the scanning module.

Clause 60. The system of clause 55, wherein the input module, the scratching module, and the scanning module each have cooperating electronic contacts for transferring data and/or power between the input module, the scratching module, and the scanning module.

Clause 61. A roller scraper, comprising: a cylindrical roller configured to rotate about a roller axis; a first scraper that is positioned on a surface of the cylindrical roller and that has a shape that spirals about the roller axis in a first direction over a first portion of an axial extent of the cylindrical roller; and a second scraper that is positioned on the surface of the cylindrical roller and that has a shape that spirals about the roller axis in a second direction, opposite to the first direction, over a second portion of the axial extent of the cylindrical roller.

Clause 62. The roller scraper of clause 61, wherein the first scraper and the second scraper each have a cross-section, viewed along a respective spiral direction, such that rotation of the cylindrical roller about the roller axis causes each of the first and second scrapers to apply lateral scraping force, axial scraping force, and combinations thereof.

Clause 63. The roller scraper of clause 61, wherein the first scraper and the second scraper each have a knurled surface.

Clause 64. The roller scraper of clause 61 further comprising: a drive motor configured to drive rotation of the cylindrical roller about the roller axis.

Clause 65. The roller scraper of clause 61, further comprising: a further roller that is configured to rotate along an axis that is parallel to the roller axis of the cylindrical roller, and that is positioned such that a surface of the further roller is operationally engaged with the first and second scrapers to scrape media conveyed between the cylindrical roller and the further roller.

Clause 66. The roller scraper of clause 65, wherein at least a portion of the surface of the further roller is formed from a compliant material.

Clause 67. The roller scraper of clause 65, wherein at least the surface of the further roller is formed from rubber.

Clause 68. The roller scraper of clause 65, wherein the further roller is configured to apply pressure to the media as it is conveyed between the cylindrical roller and the further roller, such that the media is biased toward conforming around the first and second scrapers.

Clause 69. The roller scraper of clause 68, wherein the further roller is vertically adjustable relative to the cylindrical roller to adjust an amount of the pressure applied to the media.

Clause 70. A method of producing a roller scraper, comprising: wrapping a first linear member in a spiral shape around a first axial portion of a cylinder; and wrapping a second linear member in a spiral shape around a second axial portion of the cylinder, a direction of the spiral shape of the second linear member being opposite to a direction of the spiral shape of the first linear member.

Clause 71. The method of clause 70, further comprising: knurling a surface of the first linear member and a surface of the second linear member.

Clause 72. The method of clause 70, further comprising: operatively connecting the cylinder to a drive motor; and operatively engaging a further roller with the cylinder such that a surface of the further roller is operationally engaged with the spiral shapes of the first and second linear members to scrape media conveyed between the cylinder and the further roller.

Clause 73. The method of clause 72, wherein operatively engaging the further roller with the cylinder includes mounting each axial end of the further roller to be axially rotatable on a vertically movable member of a respective adjustment mechanism.

Clause 74. The method of clause 73, wherein: the respective adjustment mechanism further includes a rotating member and a stationary member; and the stationary member is configured to convert rotation of the rotating member into vertical motion of the vertically movable member.

Clause 75. The method of clause 74, wherein the rotating member is configured to rotate in discrete increments, each increment of rotation corresponding to an increment of vertical movement of the vertically movable member.

Clause 76. The method of clause 72, wherein: the cylinder, the first linear member, and the second linear member are formed from rigid material; and the further roller is formed from compliant material.

Clause 77. The method of clause 72, wherein the drive motor is operatively connected to the cylinder via a drive belt or chain.

Clause 78. A method of operating a roller scraper, comprising: rotating a cylinder of the roller scraper about a roller axis, such that a first scraper and a second scraper of the roller scraper are configured to scrape a surface off from media passing by the roller scraper, wherein: the first scraper is positioned on a surface of the cylinder and has a shape that spirals about the roller axis in a first direction over a first portion of an axial extent of the cylinder; and the second scraper is positioned on the surface of the cylinder and has a shape that spirals about the roller axis in a second direction, opposite to the first direction, over a second portion of the axial extent of the cylinder.

Clause 79. The method of clause 78, further comprising: operatively engaging a further roller with the cylinder such that a surface of the further roller is operationally engaged with the first and second scrapers, the further roller including a compliant surface such that media passing between the further roller and the roller scraper is biased toward conforming around the first and second scrapers.

Clause 80. The method of clause 79, wherein operatively engaging the further roller with the cylinder includes adjusting a height of the further roller relative to the cylinder so as to adjust a pressure that the further roller and the roller scraper are configured to exert on the media.

Clause 81. A roller scraper, comprising: a cylindrical roller configured to rotate about a roller axis; a scraping surface that extends over at least a portion of an axial extent of the cylindrical roller and about a circumference of the cylindrical roller, wherein the scraping surface includes a knurled surface formed by a plurality of protrusions.

Clause 82. The roller scraper of clause 81, wherein the plurality of protrusions are arranged in a spiral pattern around the cylindrical roller, such that rotation of the cylindrical roller about the roller axis causes the scraping surface to apply lateral scraping force, axial scraping force, and combinations thereof.

Clause 83. The roller scraper of clause 81, wherein each of the protrusions of the plurality of protrusions has a frustum-like shape.

Clause 84. The roller scraper of clause 81, wherein the plurality of protrusions have a pitch that is approximately three times a magnitude of a depth of the plurality of protrusions.

Clause 85. The roller scraper of clause 81, wherein the plurality of protrusions have a pitch of about 1.5 mm and a depth of about 0.5 mm.

Clause 86. The roller scraper of clause 81 further comprising: a drive motor configured to drive rotation of the cylindrical roller about the roller axis.

Clause 87. The roller scraper of clause 81, further comprising: a further roller that is configured to rotate along an axis that is parallel to the roller axis of the cylindrical roller, and that is positioned such that a surface of the further roller is operationally engaged with the scraping surface to scrape media conveyed between the cylindrical roller and the further roller.

Clause 88. The roller scraper of clause 86, wherein at least a portion of the surface of the further roller is formed from a compliant material.

Clause 89. The roller scraper of clause 86, wherein at least the surface of the further roller is formed from rubber.

Clause 90. The roller scraper of clause 87, wherein the further roller is configured to apply pressure to the media as it is conveyed between the cylindrical roller and the further roller, such that the media is biased toward conforming around the plurality of protrusions of the scraping surface.

Clause 91. The roller scraper of clause 90, wherein the further roller is vertically adjustable relative to the cylindrical roller to adjust an amount of the pressure applied to the media.

Clause 92. The roller scraper of clause 81, wherein the roller scraper is formed from a high-speed steel material.

Clause 93. A method of producing a roller scraper, comprising: knurling a surface of a cylinder to form a plurality of protrusions that define a scraping surface of the cylinder; wherein the scraping surface extends over at least a portion of an axial extent of the cylinder and about a circumference of the cylinder.

Clause 94. The method of clause 93, further comprising: applying a surface-hardening treatment to at least the scraping surface.

Clause 95. The method of clause 93, further comprising: operatively connecting the cylinder to a drive motor; and operatively engaging a further roller with the cylinder such that a surface of the further roller is operationally engaged with the scraping surface to scrape media conveyed between the cylinder and the further roller, wherein: the cylinder and the plurality of protrusions are formed from rigid material; and the further roller is formed from compliant material.

Clause 96. The method of clause 93, wherein the plurality of protrusions are arranged in a spiral pattern about the cylinder.

Clause 97. The method of clause 93, wherein each of the plurality of protrusions has a frustum-like shape.

Clause 98. A method of operating a roller scraper, comprising: rotating a cylinder of the roller scraper about a roller axis, such that a scraping surface of the cylinder formed by a plurality of protrusions is configured to scrape a surface off from media passing by the roller scraper, wherein: the scraping surface extends over at least a portion of an axial extent of the cylinder and about a circumference of the cylinder; and the plurality of protrusions are arranged in a spiral pattern about the cylinder.

Clause 99. The method of clause 98, further comprising: operatively engaging a further roller with the cylinder such that a surface of the further roller is operationally engaged with the scraping surface, the further roller including a compliant surface such that media passing between the further roller and the roller scraper is biased toward conforming around the plurality of protrusions.

Clause 100. The method of clause 99, wherein operatively engaging the further roller with the cylinder includes adjusting a height of the further roller relative to the cylinder so as to adjust a pressure that the further roller and the roller scraper are configured to exert on the media.

Clause 101. A vacuum manifold for a scraping system, comprising: a chamber that includes: an open end configured to operatively engage with a bottom surface of a feed plate of the scraping system, the feed plate having at least one aperture exposing at least one scraping portion of the scraping system, the open end configured to receive debris from the at least one scraping portion; and an aperture configured to connect to a negative pressure source and covey the debris out from the scraping system.

Clause 102. The vacuum manifold of clause 101, further comprising: at least one isolation member traversing across the open end of the chamber, the at least one isolation member configured to isolate at least one portion of the scraping system from the debris and from the negative pressure source.

Clause 103. The vacuum manifold of clause 102, wherein the vacuum manifold is shaped to isolate at least one portion of the scraping system that includes at least one feed roller configured to convey media through the scraping system.

Clause 104. The vacuum manifold of clause 103, wherein the at least one isolation member includes a concave trough configured to fit around at least a portion of the at least one feed roller.

Clause 105. The vacuum manifold of clause 101, wherein the chamber is operatively engaged with the bottom surface of the feed plate via a fastener-less connection.

Clause 106. The vacuum manifold of clause 101, further comprising: at least one magnet positioned on a periphery of the open end of the chamber, the at least one magnet configured to removably mount the vacuum manifold to the bottom surface of the feed plate.

Clause 107. The vacuum manifold of clause 101, wherein a bottom surface of the chamber is concave.

Clause 108. The vacuum manifold of clause 107, wherein the aperture is positioned at a nadir of the bottom surface.

Clause 109. The vacuum manifold of clause 101, wherein the aperture is configured to connect with a vacuum hose.

Clause 110. The vacuum manifold of clause 109, wherein the aperture is oriented so as to laterally connect the vacuum hose to the vacuum manifold.

Clause 111. A method of operating a vacuum manifold of a scraping system, comprising: receiving debris from a scraping assembly of the scraping system via an open end of a chamber of the vacuum manifold, wherein the open end is operatively engaged with a bottom surface of a feed plate of the scraping assembly, the feed plate having at least one aperture exposing at least one scraping portion of the scraping assembly; and operating a negative pressure source operatively connected to an aperture in the chamber so as to convey the debris out from the scraping system.

Clause 112. The method of clause 111, further comprising: operatively connecting the vacuum manifold to the bottom surface of the feed plate.

Clause 113. The method of clause 112, wherein a connection between the vacuum manifold and the feed plate is formed between one or more magnets affixed to the chamber and a metal material of the feed plate.

Clause 114. The method of clause 111, further comprising: operatively connecting the negative pressure source to the aperture.

Clause 115. The method of clause 111, wherein the aperture is located at a nadir of the chamber and opens laterally.

Clause 116. The method of clause 111, wherein the vacuum manifold includes at least one isolation member traversing across the open end of the chamber, the at least one isolation member configured to isolate at least one portion of the scraping assembly from the debris and from the negative pressure source.

Clause 117. The method of clause 116, wherein: the at least one portion of the scraping assembly isolated by the at least one isolation member includes at least one feed roller configured to convey media through the scraping system; and the at least one isolation member includes a concave trough configured to fit around at least a portion of the at least one feed roller.

Clause 118. A scraping system, comprising: a scraper assembly that includes a feed plate and at least one feed roller, the feed plate having at least one aperture exposing at least one scraping portion of the scraper assembly; and a vacuum manifold that includes a chamber having: an open end configured to operatively engage with a bottom surface of the feed plate, the open end configured to receive debris from the at least one scraping portion; and an aperture configured to connect to a negative pressure source and covey the debris out from the scraping system.

Clause 119. The scraping system of clause 118, wherein the vacuum manifold includes at least one isolation member traversing across the open end of the chamber, the at least one isolation member configured to isolate at least one portion of the scraper assembly from the debris and from the negative pressure source.

Clause 120. The scraping system of clause 119, wherein: the isolated portion of the scraper assembly includes the at least one feed roller; and the at least one isolation member includes a concave trough configured to fit around at least a portion of the at least one feed roller.

Clause 121. A feed system for processing discrete media elements, comprising: a pair of plates that, in a processing region: are at least substantially parallel with each other and define a feed path for the media elements therebetween; and include at least one set of apertures that provide access into the feed path; an inlet that leads into the feed path and that is formed by an angled mouth leading into the feed path; and at least one set of rollers positioned so as to operatively engage with media elements in the feed path via the at least one set of apertures.

Clause 122. The feed system of clause 121, further comprising: at least one feed motor, wherein the at least one set of rollers includes a set of feed rollers operatively connected to the at least one feed motor and configured to convey the media elements along the feed path.

Clause 123. The feed system of clause 122, wherein the at least one set of rollers further includes a set of idler rollers configured to guide the media elements along the feed path.

Clause 124. The feed system of clause 123, wherein the set of feed rollers are positioned opposite the set of idler rollers, with the feed path passing therebetween.

Clause 125. The feed system of clause 124, further comprising: a set of roller springs configured to bias the set of idler rollers toward the set of feed rollers, such that media elements are pressed against the feed rollers as they pass therebetween.

Clause 126. The feed system of clause 121, wherein downstream edges of the at least one set of apertures include flanges turned out from the feed path.

Clause 127. The feed system of clause 121, wherein the at least one set of apertures includes a set of cutter roller apertures and a set of pressure roller apertures positioned opposite each other with the feed path therebetween.

Clause 128. The feed system of clause 121, wherein the at least one set of apertures includes a brush aperture configured to provide a brush access to the feed path.

Clause 129. The feed system of clause 121, wherein: the pair of plates includes at least one sensor mount; and the at least one set of apertures includes at least one sensor aperture.

Clause 130. The feed system of clause 121, further comprising: a manifold configured to capture debris from the media elements exiting the feed path via the at least one set of apertures.

Clause 131. The feed system of clause 130, wherein the manifold is shaped so as to isolate a set of roller apertures from debris exiting the feed path via a set of cutter apertures.

Clause 132. A method of operating a feed system for processing discrete media elements, comprising: serially introducing discrete media elements into an inlet formed by an angled mouth that leads into a feed path formed between a pair of at least substantially parallel plates; and conveying the discrete media elements along the feed path by operating at least one set of rollers positioned so as to operatively engage with media elements in the feed path via at least one set of apertures in the pair of plates that provide access into the feed path.

Clause 133. The method of clause 132, wherein operating the at least one set of rollers includes operating at least one feed motor operatively connected to at least one set of feed rollers configured to convey the media elements along the feed path.

Clause 134. The method of clause 133, wherein the at least one set of rollers further includes a set of idler rollers configured to guide the media elements along the feed path.

Clause 135. The method of clause 134, wherein the set of feed rollers are positioned opposite the set of idler rollers, with the feed path passing therebetween.

Clause 136. The method of clause 135, wherein the feed system further includes a set of roller springs configured to bias the set of idler rollers toward the set of feed rollers, such that media elements are pressed against the feed rollers as they pass therebetween.

Clause 137. The method of clause 132, wherein downstream edges of the at least one set of apertures include flanges turned out from the feed path.

Clause 138. The method of clause 132, wherein the at least one set of apertures includes a set of cutter roller apertures and a set of pressure roller apertures positioned opposite each other with the feed path therebetween.

Clause 139. The method of clause 132, further comprising: operating a brush positioned to operationally engage with media elements via a brush aperture.

Clause 140. A scraper system for processing discrete media elements, comprising: a feed system that includes: a pair of plates that, in a processing region: are at least substantially parallel with each other and define a feed path for the media elements therebetween; and include at least one set of apertures that provide access into the feed path; an inlet that leads into the feed path and that is formed by an angled mouth leading into the feed path; and at least one set of rollers positioned so as to operatively engage with media elements in the feed path via the at least one set of apertures; a scraper assembly that includes at least one scraper operable to scrape a layer of material off from the media elements, the at least one scraper configured to operatively engage with the media elements via the at least one set of apertures; and a manifold configured to capture debris scraped away from the media elements and exiting the feed path via the at least one set of apertures.

Clause 141. A feed system for processing discrete media elements, comprising: a first presence sensor configured to detect a presence of a media element at an inlet of a feed path; at least one roller operable to convey a next media element located at the inlet into the feed path; at least one feed motor configured to operate the at least one roller in response to detection of the presence of the media element at the inlet via the first presence sensor; at least one cutter mechanism operable to scrape a layer of material off of a conveyed media element in the feed path; at least one cutter motor configured to operate the at least one cutter mechanism in response to the detection of the presence of the media element at the inlet via the first presence sensor; and a second presence sensor configured to detect a presence of a media element at a location near to and downstream of a first cutter mechanism of the at least one cutter mechanism; wherein the at least one cutter motor and the at least one feed motor are configured to continue operating the at least one cutter mechanism and the at least one roller until after the presence of the media element at the location near to and downstream of the first cutter mechanism is no longer detected by the second presence sensor.

Clause 142. The feed system of clause 141, wherein the at least one cutter motor and the at least one feed motor are configured to continue operating the at least one cutter mechanism and the at least one roller for a predetermined period of time after the presence of the media element at the location near to and downstream of the first cutter mechanism is no longer detected by the second presence sensor.

Clause 143. The feed system of clause 141, wherein a first roller along the feed path is a clutched roller configured to prevent further media elements from entering the feed path while a next media element is entering the feed path via the inlet.

Clause 144. The feed system of clause 141, wherein the second presence sensor includes a roller sensor.

Clause 145. The feed system of clause 144, further comprising: at least one scanner, wherein: the roller sensor is an encoder roller configured to determine a conveyance speed of media elements; and the at least one scanner is configured to operate with reference to the roller sensor.

Clause 146. The feed system of clause 141, wherein the second presence sensor is one of an infrared sensor, a pressure sensor, a thru-beam sensor, or a fork sensor.

Clause 147. A feed assembly for moving discrete media through a module of a scratching system, the feed assembly comprising: a first motor; a first roller; and a first presence sensor, wherein the first presence sensor is configured to detect a presence of discrete media at a first position withing the module, and wherein the first motor is configured to operate the first roller in response to detection of discrete media by the first presence sensor to move the discrete media through a feed path of the module.

Clause 148. The feed assembly of clause 147, wherein the feed assembly further includes a controller operatively connected to at least the first motor and the first presence sensor.

Clause 149. The feed assembly of clause 147, wherein the first presence sensor is one of an infrared sensor, a pressure sensor, a thru-beam sensor, or a fork sensor.

Clause 150. The feed assembly of clause 147, wherein: the module includes an input chute for receiving a stack of discrete media, wherein the first presence sensor is positioned at a bottom of the input chute; and the first motor and the first roller are configured to move a bottom-most discrete media of the stack of discrete media.

Clause 151. The feed assembly of clause 147, further including an encoder downstream of the first presence sensor and configured to determine a conveyance speed of the discrete media along the feed path.

Clause 152. The feed assembly of clause 151, wherein the encoder is configured to cause the first motor to halt such that a bottom-most discrete media of a stack of discrete media is removed from an input chute without conveying a next discrete media.

Clause 153. The feed assembly of clause 151, wherein the encoder further operates as a second presence sensor to detect the presence of discrete media within the feed path.

Clause 154. The feed assembly of clause 151, wherein the encoder is a roller encoder that rolls along with the discrete media.

Clause 155. The feed assembly of clause 154, further including a scanner configured to activate based on a speed of the discrete media detected by the roller encoder.

Clause 156. The feed assembly of clause 147, wherein the feed assembly further includes: a second feed motor; and a second roller; wherein the second feed motor is configured to operate the second roller in response to detection of discrete media by the first presence sensor to convey the discrete media along the feed path.

Clause 157. A scratching system for processing discrete media, the scratching system comprising: a plurality of modules; one or more motors within each module; one or more rollers within each module operatively connected to at least one of the one or more motors within each respective module; and one or more presence sensors within each module operatively connected to at least one of the one or more motors within each respective module, the one or more presence sensors being configured to detect the presence of discrete media, wherein the one or more presence sensors are configured to operate at least one of the one or more motors in the respective modules in response to detection of discrete media within the respective modules.

Clause 158. The scratching system of clause 157, further including a second presence sensor in at least one of the plurality of modules configured to detect a position of the discrete media within the respective module and deactivate the one or more motors within the respective module.

Clause 159. The scratching system of clause 157, further including an encoder within at least one of the plurality of modules, the encoder configured to determine a conveyance speed of the discrete media within the respective module.

Clause 160. The scratching system of clause 159, further including a scanner within at least one of the plurality of modules, the scanner configured to activate based on the conveyance speed of the discrete media detected by the encoder.

Clause 161. A method of operating a scratching system, comprising: conveying a ticket, one at a time, from an input area of the scratching system into a feed path of the scratching system; operating a plurality of scratching assemblies positioned in series along the feed path to scratch off a layer of material from the ticket, wherein each scratching assembly includes a scraper roller and a pressure roller, the pressure roller and scraper roller configured to rotate parallel to each other in opposite directions, with the feed path positioned therebetween; and operating a scanner to obtain information revealed on the ticket after scratching the ticket.

Clause 162. The method of clause 161, further comprising: detecting a presence of one or more tickets in the input area; and activating a motor in response to detecting the presence of one or more tickets from an input area, the motor configured to operate a roller to remove the ticket from the input area.

Clause 163. The method of clause 161, further comprising: detecting a presence of one or more tickets in the feed path; and activating a motor in response to detecting the presence of the ticket within the feed path, the motor configured to operate a roller to convey the ticket along the feed path.

Clause 164. The method of clause 161, further comprising: detecting a conveyance speed of the ticket along the feed path; transmitting the conveyance speed to one or more of the scanner or a second scanner positioned along the feed path upstream of the scratching of the ticket; and operating the one or more of the scanner or the second scanner with reference to the conveyance speed.

Clause 165. The method of clause 161, wherein the scraper roller includes a dual helix scraper.

Clause 166. The method of clause 161, further comprising: operating a brush positioned along the feed path via a motor to remove one or more of debris or material from the ticket.

Clause 167. The method of clause 161, further comprising: operating a negative pressure source to convey debris out from the feed path and through a vacuum manifold.

Clause 168. A method for processing a ticket for an entry into a game of chance by a scratching system having a plurality of modules, the method comprising: separating, by a first module, the ticket from a set of tickets in an input area of the first module; processing, by a second module, the ticket to reveal information on the ticket; and obtaining, by a third module, information revealed on the ticket.

Clause 169. The method of clause 168, wherein: the first module includes at least a first motor operably connected to at least a first roller, the first motor and the first roller configured to convey the ticket through the first module, the second module includes at least a second motor operably connected to at least a second roller, the second motor and the second roller being configured to convey the ticket through the second module; and the third module includes at least a third motor operably connected to at least a third roller, the third motor and the third roller being configured to convey the ticket through the third module.

Clause 170. The method of clause 168, wherein the first module is configured to operate a roller via a motor to separate the ticket from the set of tickets in response to detecting a presence of the set of tickets in the input area by a presence sensor.

Clause 171. The method of clause 168, further comprising: detecting, via the first module, a presence and a conveyance speed of the ticket along a feed path of the first module, wherein: the first module is configured to deactivate a first motor in response to detecting the presence of the ticket within the feed path; and the first module is configured to operate a scanner with reference to the conveyance speed to obtain ticket information prior to the ticket entering the second or third modules.

Clause 172. The method of clause 168, wherein the processing by the second module includes operating a scratching assembly configured to scrape a layer of material from the ticket as it is conveyed.

Clause 173. The method of clause 172, wherein the scratching assembly includes a first roller having a scraper.

Clause 174. The method of clause 173, wherein the scraper is configured to rotate in a first direction opposite to a second direction of a second roller configured to exert pressure on the ticket against the first roller.

Clause 175. The method of clause 168, further comprising: operating, via the second module, a brush positioned along a feed path of the second module to remove material on a surface of the ticket.

Clause 176. The method of clause 168, further comprising: operating a vacuum source connected to the second module to convey material removed from the ticket out of the scratching system.

Clause 177. The method of clause 168, wherein a scanner within the third module is configured to obtain the information on the ticket in response to detection of the ticket by a presence sensor.

Clause 178. A method of obtaining a ticket for an entry into a game of chance, the method comprising: separating the ticket from a set of tickets by using a first roller operatively attached to a first motor to convey the ticket through a gate configured to limit a flow of tickets to one ticket; scraping material off the ticket using a scraper attached to a second roller operatively attached to a second motor; and scanning information on the ticket.

Clause 179. The method of clause 178, wherein separating the ticket from the set of tickets occurs in response to sensing the set of tickets in an input area.

Clause 180. The method of clause 178, wherein the scanning of the information on the ticket is performed by a first scanner prior to the scraping of material off the ticket, and additional information on the ticket is scanned by a second scanner after being revealed by the scraping of material off from the ticket.

Clause 181. A method for adjusting a pressure profile exerted on input media by a scratching assembly, the method comprising: rotating a pin of an adjustment mechanism; wherein the adjustment mechanism is configured so that rotation of the pin causes a threaded end of the pin to thread into or out from a threaded hole of a mounting block connected to an end of a roller, such that rotation of the pin causes a corresponding vertical motion of the mounting block and results in a vertical adjustment of the end of the roller, the vertical adjustment adjusting a pressure profile exerted by the roller on the input media.

Clause 182. The method of clause 181, wherein the method is repeated for a second adjustment mechanism connected to a second end of the roller.

Clause 183. The method of clause 182, wherein the method is repeated for a further pair of adjustment mechanisms connected to a further roller.

Clause 184. The method of clause 181, wherein the adjustment mechanism includes an adjustment block including a cavity, a slot, and a vertical channel extending from the slot to the cavity, wherein the pin positioned in the vertical channel, wherein the pin has a top end having a shape corresponding to the slot, and wherein the mounting block is retained within the cavity.

Clause 185. The method of clause 184, wherein the adjustment mechanism further includes: a knob, a bottom surface of the knob having a plurality of circumferentially distributed notches, and a center of the bottom surface affixed to a top of the pin; and a spring plunger positioned on the adjustment block facing toward the bottom surface of the knob and configured to releasably engage a respective one of the plurality of circumferentially distributed notches as the knob is rotated so as to align the spring plunger with the respective notch.

Clause 186. The method of clause 185, wherein each notch corresponds to an incremental adjustment in height for a respective end of the roller.

Clause 187. The method of clause 185, wherein rotating the pin causes the spring plunger to disengage a first one of the plurality of circumferentially distributed notches and engages a second one of the plurality of circumferentially distributed notches to incremental adjustment of a height of the mounting block.

Clause 188. The method of clause 181, wherein the pin is held captive vertically by the adjustment mechanism, and the mounting block is held captive rotationally by the adjustment mechanism.

Clause 189. The method of clause 181, wherein the pin is operatively connected to an electronically controlled actuator operable to rotate the pin.

Clause 190. The method of clause 181, further comprising: transmitting operating condition data of a motor operatively connected to the roller to a controller, wherein the controller is configured to cause a display to output at least a portion of the operating condition data indicative of one or more of motor load, motor wear, or motor operational lifetime.

Clause 191. A method for adjusting a pressure profile of a scratching mechanism having a roller for exerting pressure on input media, the method comprising: rotating a rotating member of a first adjustment mechanism operatively connected to a first end of the roller to adjust a vertical position of the first end of the roller; and rotating a rotating member of a second adjustment mechanism operatively connected to a second end of the roller to adjust a vertical position of the second end of the roller, wherein, the first adjustment mechanism and second adjustment mechanism further include: a vertically movable member connected to a respective end of the roller; and a stationary member configured to convert rotation of the rotating member into vertical motion of the vertically movable member.

Clause 192. The method of clause 191, wherein the first end of the roller is adjusted to a first height, and the second end of the roller is adjusted to a second height.

Clause 193. The method of clause 191, wherein one or more of the first adjustment mechanism or the second adjustment mechanisms is configured to be manually operated.

Clause 194. The method of clause 191, wherein an electronically controlled actuator rotates the rotating member of one or more of the first adjustment mechanism or the second adjustment mechanism.

Clause 195. The method of clause 191, wherein the rotating member of one or more of the first adjustment mechanism or the second adjustment mechanism is configured to rotate based on feedback from one or more motor driving a stationary roller positioned such that the input media passes between the roller and the stationary roller.

Clause 196. A method of removing material from input media passing through a scraping assembly, the method comprising: independently positioning a first end of an adjustable roller of at least one of a plurality of scratching mechanisms to a first position relative to a respective stationary roller; independently positioning a second end of the adjustable roller to a second position relative to the respective stationary roller; and conveying the input media between the adjustable roller and the stationary roller of each of the plurality of scratching mechanisms, the plurality of scratching mechanisms positioned in series and configured, via the independent positioning of the respective ends of the respective adjustable rollers, to scratch different portions of the input media to thereby remove the material from the input media.

Clause 197. The method of clause 196, wherein the first end of the adjustable roller of each of the plurality of scratching mechanisms is connected to a respective adjustment mechanism, and the second end of the adjustable roller of each of the plurality of scratching mechanisms is connected to a respective further adjustment mechanism.

Clause 198. The method of clause 197, wherein each respective adjustment mechanism and respective further adjustment mechanism includes one or more presets corresponding to a pressure profile for a type of input media.

Clause 199. The method of clause 198, wherein each respective adjustment mechanism and respective further adjustment mechanism includes markings identifying different heights or pressure settings.

Clause 200. The method of clause 196, wherein: at least one of the plurality of scratching mechanisms further includes a motor operatively connected to the stationary roller of the at least one of the plurality of scratching mechanisms, the motor is configured to transmit operating condition data to a controller configured to output at least a portion of the operating condition data via a display.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects.

Furthermore, while some embodiments described herein include some but not other features included in other embodiments, combinations of features of different embodiments are meant to be within the scope of the invention, and form different embodiments, as would be understood by those skilled in the art.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure.

What is claimed is:

1. A ticket tracking system for tracking tickets conveyed by a ticket-processing device, comprising:
    an encoder roller configured to rotate with a ticket as the ticket is conveyed past the encoder roller, and to determine a conveyance speed of the ticket based on a rotational speed of the rotation of the encoder roller; and
    at least one scanner configured to scan a surface of the ticket, as the ticket is conveyed past the at least one scanner, at a rate based on the determined conveyance speed of the ticket;
    wherein:
        at least a first scanner of the at least one scanner is positioned upstream of a processing region for processing the ticket by the ticket-processing device; and
        at least a second scanner of the at least one scanner is positioned downstream of the processing region.

2. The ticket tracking system of claim 1, wherein:
    the first scanner and a third scanner are positioned upstream of the processing region; and
    the first scanner and the third scanner are configured to scan opposite surfaces of the ticket.

3. The ticket tracking system of claim 1, wherein the at least one scanner includes at least one barcode scanner.

4. The ticket tracking system of claim 1, further comprising:
    a memory operatively connected to the at least one scanner and configured to store scan data generated by the at least one scanner.

5. The ticket tracking system of claim 1, further comprising:
    a communication component configured to transmit scan data from the at least one scanner to a computer system.

6. A ticket tracking system for tracking tickets conveyed by a ticket-processing device, comprising:
    an encoder roller configured to rotate with a ticket as the ticket is conveyed past the encoder roller, and to determine a conveyance speed of the ticket based on a rotational speed of the rotation of the encoder roller;
    at least one scanner configured to scan a surface of the ticket, as the ticket is conveyed past the at least one scanner, at a rate based on the determined conveyance speed of the ticket; and at least one fork sensor positioned along a path of the conveyance of the ticket in the ticket-processing device;

wherein the at least one scanner is configured to activate based on a detection of a presence of the ticket by the at least one fork sensor.

7. The ticket tracking system of claim 6, further comprising:
a memory operatively connected to the at least one scanner and configured to store scan data generated by the at least one scanner.

8. The ticket tracking system of claim 6, further comprising:
a communication component configured to transmit scan data from the at least one scanner to a computer system.

9. A ticket tracking system for tracking tickets conveyed by a ticket-processing device, comprising:
an encoder roller configured to rotate with a ticket as the ticket is conveyed past the encoder roller, and to determine a conveyance speed of the ticket based on a rotational speed of the rotation of the encoder roller;
at least one scanner configured to scan a surface of the ticket, as the ticket is conveyed past the at least one scanner, at a rate based on the determined conveyance speed of the ticket; and
a further encoder roller, wherein:
the encoder roller is positioned upstream of a processing region for processing the ticket by the ticket-processing device; and
the further encoder roller is positioned downstream of the processing region.

10. The ticket tracking system of claim 9, further comprising:
a memory operatively connected to the at least one scanner and configured to store scan data generated by the at least one scanner.

11. A computer-implemented method of tracking a ticket conveyed by a ticket-processing device, comprising:
determining, via an encoder roller, a conveyance speed of the ticket based on a rotational speed of the encoder roller, the encoder roller configured to rotate as the ticket is conveyed past the encoder roller; and
operating at least one scanner to scan a surface of the ticket as the ticket is conveyed past the at least one scanner at a rate based on the determined conveyance speed of the ticket;
wherein:
at least a first scanner of the at least one scanner is operated to scan the surface of the ticket prior to a processing of the ticket by the ticket-processing device; and
at least a second scanner of the at least one scanner is operated to scan the surface after the processing of the ticket.

12. The computer-implemented method of claim 11, wherein:
a third scanner is operated to scan the ticket prior to the processing of the ticket; and the first scanner and the third scanner are configured to scan opposite surfaces of the ticket.

13. The computer-implemented method of claim 11, wherein the at least one scanner includes at least one barcode scanner.

14. The computer-implemented method of claim 11, wherein the at least one scanner is operated in response to detection, via at least one fork sensor positioned along a path of the conveyance of the ticket in the ticket-processing device, of a presence of the ticket.

15. A ticket-processing device, comprising:
an encoder roller configured to rotate with a ticket as the ticket is conveyed past the encoder roller, and to determine a conveyance speed of the ticket based on a rotational speed of the rotation of the encoder roller;
at least one scanner configured to scan a surface of the ticket, as the ticket is conveyed past the at least one scanner, at a rate based on the determined conveyance speed of the ticket; and
a memory operatively connected to the at least one scanner and configured to store scan data generated by the at least one scanner.

16. The ticket-processing device of claim 15, further comprising:
a ticket processing assembly, wherein:
at least a first scanner of the at least one scanner is positioned upstream of the ticket processing assembly; and
at least a second scanner of the at least one scanner is positioned downstream of the ticket processing assembly.

17. The ticket-processing device of claim 16, wherein:
the first scanner and a third scanner are positioned upstream of the ticket processing assembly; and
the first scanner and the third scanner are configured to scan opposite surfaces of the ticket.

18. The ticket-processing device of claim 16, further comprising:
a further encoder roller, wherein:
the encoder roller is positioned upstream of the ticket processing assembly; and
the further encoder roller is positioned downstream of the ticket processing assembly.

19. The ticket-processing device of claim 15, further comprising:
at least one fork sensor positioned along a path of the conveyance of the ticket in the ticket-processing device;
wherein the at least one scanner is configured to activate based on a detection of a presence of the ticket by the at least one fork sensor.

20. The ticket-processing device of claim 15, further comprising:
a communication component configured to transmit scan data from the at least one scanner to a computer system.

* * * * *